United States Patent
Ma et al.

(10) Patent No.: US 12,402,131 B2
(45) Date of Patent: Aug. 26, 2025

(54) HYBRID AUTOMATIC REPEAT REQUEST (HARQ) CODEBOOK DESIGN

(71) Applicant: QUALCOMM Incorporated, San Diego, CA (US)

(72) Inventors: Liangping Ma, San Diego, CA (US); Xiao Feng Wang, San Diego, CA (US); Alberto Rico Alvarino, San Diego, CA (US); Ayan Sengupta, San Diego, CA (US); Peter Gaal, San Diego, CA (US); Huilin Xu, Temecula, CA (US); Jun Ma, San Diego, CA (US); Bharat Shrestha, San Diego, CA (US); Umesh Phuyal, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 647 days.

(21) Appl. No.: 17/451,745

(22) Filed: Oct. 21, 2021

(65) Prior Publication Data
US 2022/0132547 A1    Apr. 28, 2022

Related U.S. Application Data

(60) Provisional application No. 63/104,429, filed on Oct. 22, 2020.

(51) Int. Cl.
*H04W 72/21* (2023.01)
*H04L 1/1607* (2023.01)
(Continued)

(52) U.S. Cl.
CPC ............ *H04W 72/21* (2023.01); *H04L 1/1678* (2013.01); *H04L 1/1812* (2013.01); *H04L 5/0055* (2013.01)

(58) Field of Classification Search
CPC .................... H04W 728/21; H04L 1/1678
(Continued)

(56) References Cited

U.S. PATENT DOCUMENTS

2019/0158250 A1\*   5/2019   Ang ................. H04L 5/0046

FOREIGN PATENT DOCUMENTS

| CN | 113839757 A | \* | 12/2021 | ........... H04B 7/0632 |
| WO | 2020065530 A1 | | 4/2020 | |

OTHER PUBLICATIONS

International Search Report and Written Opinion—PCT/US2021/056256—ISA/EPO—Feb. 14, 2022.

\* cited by examiner

*Primary Examiner* — Sibte H Bukhari
(74) *Attorney, Agent, or Firm* — Patterson+ Sheridan, L.L.P.

(57) ABSTRACT

Certain aspects of the present disclosure are directed to techniques for hybrid automatic repeat request (HARQ) codebook design. For example, a user equipment (UE) configured for feedback processing may comprise a memory and a processor configured to receive, from a base station (BS), a first indication of a first feedback process type for providing feedback to the BS for a plurality of feedback processes of the UE. The memory and the processor may also be configured to receive one or more first downlink transmissions from the BS associated with at least one feedback process of the plurality of feedback processes. The memory and the processor may also be configured to transmit feedback or withhold transmission of feedback to the BS regarding decoding of the one or more first downlink transmissions according to the first feedback process type.

30 Claims, 20 Drawing Sheets

(51) Int. Cl.
*H04L 1/1812* (2023.01)
*H04L 5/00* (2006.01)

(58) Field of Classification Search
USPC .......................................................... 370/336
See application file for complete search history.

HYBRID AUTOMATIC REPEAT REQUEST (HARQ) CODEBOOK DESIGN

CROSS-REFERENCE TO RELATED APPLICATION(S)

This application claims benefit of and priority to U.S. Provisional Application No. 63/104,429, filed Oct. 22, 2020, which is hereby assigned to the assignee hereof and hereby expressly incorporated by reference herein in its entirety as if fully set forth below and for all applicable purposes.

BACKGROUND

Field of the Disclosure

Aspects of the present disclosure relate to wireless communications, and more particularly, to techniques for a hybrid automatic repeat request (HARQ) process codebook configuration.

Description of Related Art

Wireless communication systems are widely deployed to provide various telecommunication services such as telephony, video, data, messaging, broadcasts, etc. These wireless communication systems may employ multiple-access technologies capable of supporting communication with multiple users by sharing available system resources (e.g., bandwidth, transmit power, etc.). Examples of such multiple-access systems include 3rd Generation Partnership Project (3GPP) Long Term Evolution (LTE) systems, LTE Advanced (LTE-A) systems, code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems, to name a few.

These multiple access technologies have been adopted in various telecommunication standards to provide a common protocol that enables different wireless devices to communicate on a municipal, national, regional, and even global level. New radio (e.g., 5G NR) is an example of an emerging telecommunication standard. NR is a set of enhancements to the LTE mobile standard promulgated by 3GPP. NR is designed to better support mobile broadband Internet access by improving spectral efficiency, lowering costs, improving services, making use of new spectrum, and better integrating with other open standards using OFDMA with a cyclic prefix (CP) on the downlink (DL) and on the uplink (UL). To these ends, NR supports beamforming, multiple-input multiple-output (MIMO) antenna technology, and carrier aggregation.

However, as the demand for mobile broadband access continues to increase, there exists a need for further improvements in NR and LTE technology. Preferably, these improvements should be applicable to other multi-access technologies and the telecommunication standards that employ these technologies.

SUMMARY

The systems, methods, and devices of the disclosure each have several aspects, no single one of which is solely responsible for its desirable attributes. Without limiting the scope of this disclosure as expressed by the claims which follow, some features will now be discussed briefly. After considering this discussion, and particularly after reading the section entitled "Detailed Description" one will understand how the features of this disclosure provide advantages that include desirable spectral efficiencies for uplink and/or downlink channels in connection with a feedback process.

Certain aspects of the disclosure are directed to a user equipment (UE) configured for feedback processing, the UE comprising a memory; and a processor coupled to the memory. In some examples, the processor and the memory are configured to receive, from a base station (BS), a first indication of a first feedback process type for providing feedback to the BS for a plurality of feedback processes of the UE. In some examples, the processor and the memory are configured to receive one or more first downlink transmissions from the BS associated with at least one feedback process of the plurality of feedback processes. In some examples, the processor and the memory are configured to transmit feedback or withhold transmission of feedback to the BS regarding decoding of the one or more first downlink transmissions according to the first feedback process type.

Certain aspects are directed to a user equipment (UE) configured for feedback processing, the UE comprising a memory and a processor coupled to the memory. In some examples, the processor and the memory are configured to receive, from a base station (BS), an indication of a maximum number of downlink transmissions on a number of downlink transmission occasions within a time period, wherein feedback processes for the number of downlink transmission occasions are feedback enabled type processes. In some examples, the processor and the memory are configured to receive one or more first downlink transmissions from the BS during at least one of the number of downlink transmission occasions. In some examples, the processor and the memory are configured to transmit feedback to the BS regarding decoding of the one or more first downlink transmissions based on a decoding outcome of the one or more first downlink transmissions.

Certain aspects are directed to a method for feedback processing performed by a user equipment (UE). In some examples, the method includes receiving, from a base station (BS), a first indication of a first feedback process type for providing feedback to the BS for a plurality of feedback processes of the UE. In some examples, the method includes receiving one or more first downlink transmissions from the BS associated with at least one feedback process of the plurality of feedback processes. In some examples, the method includes selectively transmitting feedback to the BS regarding decoding of the one or more first downlink transmissions according to the first feedback process type.

Certain aspects are directed to a method for feedback processing performed by a user equipment (UE). In some examples, the method includes receiving, from a base station (BS), an indication of a maximum number of downlink transmissions on a number of downlink transmission occasions within a time period, wherein feedback processes for the number of downlink transmission occasions are feedback enabled type processes. In some examples, the method includes receiving one or more first downlink transmissions from the BS during at least one of the number of downlink transmission occasions. In some examples, the method includes transmitting feedback to the BS regarding decoding of the one or more first downlink transmissions based on a decoding outcome of the one or more first downlink transmissions.

Certain aspects are directed to a user equipment (UE). In some examples, the UE includes means for receiving, from a base station (BS), a first indication of a first feedback process type for providing feedback to the BS for a plurality of feedback processes of the UE. In some examples, the UE includes means for receiving one or more first downlink transmissions from the BS associated with at least one feedback process of the plurality of feedback processes. In some examples, the UE includes means for selectively transmitting feedback to the BS regarding decoding of the one or more first downlink transmissions according to the first feedback process type.

Certain aspects are directed to a user equipment (UE). In some examples, the UE includes means for receiving, from a base station (BS), an indication of a maximum number of downlink transmissions on a number of downlink transmission occasions within a time period, wherein feedback processes for the number of downlink transmission occasions are feedback enabled type processes. In some examples, the UE includes means for receiving one or more first downlink transmissions from the BS during at least one of the number of downlink transmission occasions. In some examples, the UE includes means for transmitting feedback to the BS regarding decoding of the one or more first downlink transmissions based on a decoding outcome of the one or more first downlink transmissions.

Certain aspects are directed to a non-transitory computer-readable medium having instructions stored thereon that, when executed by a user equipment (UE), cause the UE to perform operations. In some examples, the operations include receiving, from a base station (BS), a first indication of a first feedback process type for providing feedback to the BS for a plurality of feedback processes of the UE. In some examples, the operations include receiving one or more first downlink transmissions from the BS associated with at least one feedback process of the plurality of feedback processes. In some examples, the operations include selectively transmitting feedback to the BS regarding decoding of the one or more first downlink transmissions according to the first feedback process type.

Certain aspects are directed to a non-transitory computer-readable medium having instructions stored thereon that, when executed by a user equipment (UE), cause the UE to perform operations. In some examples, the operations include receiving, from a base station (BS), an indication of a maximum number of downlink transmissions on a number of downlink transmission occasions within a time period, wherein feedback processes for the number of downlink transmission occasions are feedback enabled type processes. In some examples, the operations include receiving one or more first downlink transmissions from the BS during at least one of the number of downlink transmission occasions. In some examples, the operations include transmitting feedback to the BS regarding decoding of the one or more first downlink transmissions based on a decoding outcome of the one or more first downlink transmissions.

Certain aspects of the subject matter described in this disclosure can be implemented in a method for wireless communication by a user equipment (UE). The method generally includes receiving, from a base station (BS), an indication of a default feedback process type for providing feedback to the BS for a plurality of feedback processes of the UE. The method generally includes receiving, from the BS, an indication of a second feedback process type for providing feedback to the BS for one or more feedback processes of the plurality of feedback processes. The method generally includes receiving one or more first downlink transmissions from the BS associated with the one or more feedback processes. The method generally includes receiving one or more second downlink transmissions from the BS associated with at least one feedback process of the plurality of feedback processes other than the one or more feedback processes. The method generally includes selectively providing feedback to the BS regarding decoding of the one or more first downlink transmissions according to the second feedback process type. The method generally includes selectively providing feedback to the BS regarding decoding of the one or more second downlink transmissions according to the default feedback process type.

Certain aspects of the subject matter described in this disclosure can be implemented in a method for wireless communication by a user equipment (UE). The method generally includes receiving, from a base station (BS), an indication of a subset of time periods of a plurality of time periods that occur periodically for communication of downlink transmissions, the indication of the subset of time periods indicating that feedback processes are enabled for the subset of time periods. The method generally includes receiving one or more first downlink transmissions from the BS during at least one of the subset of time periods. The method generally includes providing feedback to the BS regarding decoding of the one or more first downlink transmissions based on a decoding outcome of the one or more first downlink transmissions.

Certain aspects of the subject matter described in this disclosure can be implemented in a method for wireless communication by a user equipment (UE). The method generally includes receiving, from a base station (BS), an indication of a maximum number of downlink transmissions on a number of downlink transmission occasions within a time period, wherein feedback processes are enabled for the number of downlink transmission occasions. The method generally includes receiving one or more first downlink transmissions from the BS during at least one of the number of downlink transmission occasions. The method generally includes providing feedback to the BS regarding decoding of the one or more first downlink transmissions based on a decoding outcome of the one or more first downlink transmissions.

Certain aspects of the subject matter described in this disclosure can be implemented in a method for wireless communication by a user equipment (UE). The method generally includes receiving one or more first downlink assignment indexes (DAIs) for one or more first feedback processes of a plurality of feedback processes of the UE, the one or more first feedback processes being of a feedback enabled type. The method generally includes receiving one or more second downlink assignment indexes (DAIs) for one or more second feedback processes of the plurality of feedback processes of the UE, the one or more second feedback processes being of a feedback disabled type. The method generally includes transmitting one or more statistics to a base station (BS) based on the one or more first DAIs and the one or more second DAIs.

Certain aspects of the subject matter described in this disclosure can be implemented in a method for wireless communication by a user equipment (UE). The method generally includes receiving, from a base station (BS), an indication of a maximum number of downlink transmissions on a number of feedback processes of the UE within a time period, wherein feedback is enabled for the number of feedback processes. The method generally includes receiving a one-shot feedback request from the BS. The method generally includes providing one-shot feedback to the BS for the time period compressed into less than a number of bits.

Certain aspects of the subject matter described in this disclosure can be implemented in a method for wireless communication by a user equipment (UE). The method generally includes receiving, from a base station (BS), an indication of a maximum number of downlink transmissions on a number of feedback processes of the UE within a time period, wherein feedback is enabled for the number of feedback processes. The method generally includes receiving a one-shot feedback request from the BS. The method generally includes providing one-shot feedback to the BS for the time period compressed into less than a number of bits.

Certain aspects of the subject matter described in this disclosure can be implemented in an apparatus for wireless communication. The apparatus generally includes a processor and a memory communicatively coupled to the processor. The processor and the memory are configured to receive, from a base station (BS), an indication of a default feedback process type for providing feedback to the BS for a plurality of feedback processes of the UE. The processor and the memory are configured to receiving, from the BS, an indication of a second feedback process type for providing feedback to the BS for one or more feedback processes of the plurality of feedback processes. The processor and the memory are configured to receive one or more first downlink transmissions from the BS associated with the one or more feedback processes. The processor and the memory are configured to receiving one or more second downlink transmissions from the BS associated with at least one feedback process of the plurality of feedback processes other than the one or more feedback processes. The processor and the memory are configured to selectively providing feedback to the BS regarding decoding of the one or more first downlink transmissions according to the second feedback process type. The processor and the memory are configured to selectively providing feedback to the BS regarding decoding of the one or more second downlink transmissions according to the default feedback process type.

Certain aspects of the subject matter described in this disclosure can be implemented in an apparatus for wireless communication. The apparatus generally includes a memory and a processor communicatively coupled to the processor. The processor and the memory configured to receive, from a base station (BS), an indication of a subset of time periods of a plurality of time periods that occur periodically for communication of downlink transmissions, the indication of the subset of time periods indicating that feedback processes are enabled for the subset of time periods. The processor and the memory configured to receive one or more first downlink transmissions from the BS during at least one of the subset of time periods. The processor and the memory configured to provide feedback to the BS regarding decoding of the one or more first downlink transmissions based on a decoding outcome of the one or more first downlink transmissions.

Certain aspects of the subject matter described in this disclosure can be implemented in an apparatus for wireless communication. The apparatus generally includes a memory and a processor communicatively coupled to the memory. The memory and the processor configured to receive, from a base station (BS), an indication of a maximum number of downlink transmissions on a number of downlink transmission occasions within a time period, wherein feedback processes are enabled for the number of downlink transmission occasions. The memory and the processor configured to receive one or more first downlink transmissions from the BS during at least one of the number of downlink transmission occasions. The memory and the processor configured to provide feedback to the BS regarding decoding of the one or more first downlink transmissions based on a decoding outcome of the one or more first downlink transmissions.

Certain aspects of the subject matter described in this disclosure can be implemented in an apparatus for wireless communication. The apparatus generally includes a memory and a processor communicatively coupled to the memory. The memory and the processor configured to receive one or more first downlink assignment indexes (DAIs) for one or more first feedback processes of a plurality of feedback processes of the UE, the one or more first feedback processes being of a feedback enabled type. The memory and the processor configured to receive one or more second downlink assignment indexes (DAIs) for one or more second feedback processes of the plurality of feedback processes of the UE, the one or more second feedback processes being of a feedback disabled type. The memory and the processor configured to transmit one or more statistics to a base station (BS) based on the one or more first DAIs and the one or more second DAIs.

Certain aspects of the subject matter described in this disclosure can be implemented in an apparatus for wireless communication. The apparatus generally includes a memory and a processor communicatively coupled to the memory. The memory and the processor configured to receive, from a base station (BS), an indication of a maximum number of downlink transmissions on a number of feedback processes of the UE within a time period, wherein feedback is enabled for the number of feedback processes. The memory and the processor configured to receive a one-shot feedback request from the BS. The memory and the processor configured to provide one-shot feedback to the BS for the time period compressed into less than a number of bits.

Certain aspects of the subject matter described in this disclosure can be implemented in an apparatus for wireless communication. The apparatus generally includes means for receiving, from a base station (BS), an indication of a maximum number of downlink transmissions on a number of downlink transmission occasions within a time period, wherein feedback processes are enabled for the number of downlink transmission occasions. The apparatus generally includes means for receiving one or more first downlink transmissions from the BS during at least one of the number of downlink transmission occasions. The apparatus generally includes means for providing feedback to the BS regarding decoding of the one or more first downlink transmissions based on a decoding outcome of the one or more first downlink transmissions.

Certain aspects of the subject matter described in this disclosure can be implemented in an apparatus for wireless communication. The apparatus generally includes means for receiving one or more first downlink assignment indexes (DAIs) for one or more first feedback processes of a plurality of feedback processes of the UE, the one or more first feedback processes being of a feedback enabled type. The apparatus generally includes means for receiving one or more second downlink assignment indexes (DAIs) for one or more second feedback processes of the plurality of feedback processes of the UE, the one or more second feedback processes being of a feedback disabled type. The apparatus generally includes means for transmitting one or more statistics to a base station (BS) based on the one or more first DAIs and the one or more second DAIs.

Certain aspects of the subject matter described in this disclosure can be implemented in an apparatus for wireless communication. The apparatus generally includes means for receiving, from a base station (BS), an indication of a maximum number of downlink transmissions on a number of feedback processes of the UE within a time period, wherein feedback is enabled for the number of feedback processes. The apparatus generally includes means for receiving a one-shot feedback request from the BS. The apparatus generally includes means for providing one-shot feedback to the BS for the time period compressed into less than a number of bits.

Certain aspects of the subject matter described in this disclosure can be implemented in an apparatus for wireless communication. The apparatus generally includes means for receiving, from a base station (BS), an indication of a default feedback process type for providing feedback to the BS for a plurality of feedback processes of the UE. The apparatus generally includes means for receiving, from the BS, an indication of a second feedback process type for providing feedback to the BS for one or more feedback processes of the plurality of feedback processes. The apparatus generally includes means for receiving one or more first downlink transmissions from the BS associated with the one or more feedback processes. The apparatus generally includes means for receiving one or more second downlink transmissions from the BS associated with at least one feedback process of the plurality of feedback processes other than the one or more feedback processes. The apparatus generally includes means for selectively providing feedback to the BS regarding decoding of the one or more first downlink transmissions according to the second feedback process type. The apparatus generally includes means for selectively providing feedback to the BS regarding decoding of the one or more second downlink transmissions according to the default feedback process type.

Certain aspects of the subject matter described in this disclosure can be implemented in an apparatus for wireless communication. The apparatus generally includes means for receiving, from a base station (BS), an indication of a subset of time periods of a plurality of time periods that occur periodically for communication of downlink transmissions, the indication of the subset of time periods indicating that feedback processes are enabled for the subset of time periods. The apparatus generally includes means for receiving one or more first downlink transmissions from the BS during at least one of the subset of time periods. The apparatus generally includes means for providing feedback to the BS regarding decoding of the one or more first downlink transmissions based on a decoding outcome of the one or more first downlink transmissions.

Certain aspects of the subject matter described in this disclosure can be implemented in a computer readable medium having instructions stored thereon that when executed by a UE cause the UE to perform a method of receiving, from a base station (BS), an indication of a default feedback process type for providing feedback to the BS for a plurality of feedback processes of the UE. The method also includes receiving, from the BS, an indication of a second feedback process type for providing feedback to the BS for one or more feedback processes of the plurality of feedback processes. The method also includes receiving one or more first downlink transmissions from the BS associated with the one or more feedback processes. The method also includes receiving one or more second downlink transmissions from the BS associated with at least one feedback process of the plurality of feedback processes other than the one or more feedback processes. The method also includes selectively providing feedback to the BS regarding decoding of the one or more first downlink transmissions according to the second feedback process type. The method also includes selectively providing feedback to the BS regarding decoding of the one or more second downlink transmissions according to the default feedback process type.

Certain aspects of the subject matter described in this disclosure can be implemented in a computer readable medium having instructions stored thereon that when executed by a UE cause the UE to perform a method of receiving, from a base station (BS), an indication of a subset of time periods of a plurality of time periods that occur periodically for communication of downlink transmissions, the indication of the subset of time periods indicating that feedback processes are enabled for the subset of time periods. The method also includes receiving one or more first downlink transmissions from the BS during at least one of the subset of time periods. The method also includes providing feedback to the BS regarding decoding of the one or more first downlink transmissions based on a decoding outcome of the one or more first downlink transmissions.

Certain aspects of the subject matter described in this disclosure can be implemented in a computer readable medium having instructions stored thereon that when executed by a UE cause the UE to perform a method of receiving, from a base station (BS), an indication of a maximum number of downlink transmissions on a number of downlink transmission occasions within a time period, wherein feedback processes are enabled for the number of downlink transmission occasions. The method also includes receiving one or more first downlink transmissions from the BS during at least one of the number of downlink transmission occasions. The method also includes providing feedback to the BS regarding decoding of the one or more first downlink transmissions based on a decoding outcome of the one or more first downlink transmissions.

Certain aspects of the subject matter described in this disclosure can be implemented in a computer readable medium having instructions stored thereon that when executed by a UE cause the UE to perform a method of receiving one or more first downlink assignment indexes (DAIs) for one or more first feedback processes of a plurality of feedback processes of the UE, the one or more first feedback processes being of a feedback enabled type. The method also includes receiving one or more second downlink assignment indexes (DAIs) for one or more second feedback processes of the plurality of feedback processes of the UE, the one or more second feedback processes being of a feedback disabled type. The method also includes transmitting one or more statistics to a base station (BS) based on the one or more first DAIs and the one or more second DAIs.

Certain aspects of the subject matter described in this disclosure can be implemented in a computer readable medium having instructions stored thereon that when executed by a UE cause the UE to perform a method of receiving, from a base station (BS), an indication of a maximum number of downlink transmissions on a number of feedback processes of the UE within a time period, wherein feedback is enabled for the number of feedback processes. The method also includes receiving a one-shot feedback request from the BS. The method also includes providing one-shot feedback to the BS for the time period compressed into less than a number of bits.

Certain aspects of the subject matter described in this disclosure are directed to a user equipment (UE) configured for feedback processing, wherein the UE comprises a memory and a processor coupled to the memory. In some examples, the processor and the memory are configured to receive, from a base station (BS), a first indication of a subset of time periods of a plurality of time periods that occur periodically for communication of downlink transmissions, the first indication of the subset of time periods indicating that feedback processes are enabled for the subset of time periods. In some examples, the processor and the memory are configured to receive one or more first downlink transmissions from the BS during at least one of the subset of time periods. In some examples, the processor and the memory are configured to transmit feedback to the BS regarding decoding of the one or more first downlink transmissions based on a decoding outcome of the one or more first downlink transmissions.

Certain aspects of the subject matter described in this disclosure are directed to method of wireless communication by a user equipment (UE). In some examples, the method includes receiving, from a base station (BS), a first indication of a subset of time periods of a plurality of time periods that occur periodically for communication of downlink transmissions, the first indication of the subset of time periods indicating that feedback processes are enabled for the subset of time periods. In some examples, the method includes receiving one or more first downlink transmissions from the BS during at least one of the subset of time periods. In some examples, the method includes transmitting feedback to the BS regarding decoding of the one or more first downlink transmissions based on a decoding outcome of the one or more first downlink transmissions.

Certain aspects of the subject matter described in this disclosure are directed to a user equipment (UE) configured for wireless communication. In some examples, the UE includes means for receiving, from a base station (BS), a first indication of a subset of time periods of a plurality of time periods that occur periodically for communication of downlink transmissions, the first indication of the subset of time periods indicating that feedback processes are enabled for the subset of time periods. In some examples, the UE includes means for receiving one or more first downlink transmissions from the BS during at least one of the subset of time periods. In some examples, the UE includes means for transmitting feedback to the BS regarding decoding of the one or more first downlink transmissions based on a decoding outcome of the one or more first downlink transmissions.

Certain aspects of the subject matter described in this disclosure can be implemented in a computer readable medium having instructions stored thereon that when executed by a UE cause the UE to perform a method of receiving, from a base station (BS), a first indication of a subset of time periods of a plurality of time periods that occur periodically for communication of downlink transmissions, the first indication of the subset of time periods indicating that feedback processes are enabled for the subset of time periods. In some examples, the method includes receiving one or more first downlink transmissions from the BS during at least one of the subset of time periods. In some examples, the method includes transmitting feedback to the BS regarding decoding of the one or more first downlink transmissions based on a decoding outcome of the one or more first downlink transmissions.

Aspects of the present disclosure provide means for, apparatus, processors, and computer-readable mediums for performing techniques and methods that may be complementary to the operations by the UE described herein, for example, by a BS.

To the accomplishment of the foregoing and related ends, the one or more aspects comprise the features hereinafter fully described and particularly pointed out in the claims. The following description and the appended drawings set forth in detail certain illustrative features of the one or more aspects. These features are indicative, however, of but a few of the various ways in which the principles of various aspects may be employed.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the drawings. It is to be noted, however, that the appended drawings illustrate only certain typical aspects of this disclosure and are therefore not to be considered limiting of its scope, for the description may admit to other equally effective aspects.

To facilitate understanding, identical reference numerals have been used, where possible, to designate identical elements that are common to the figures. It is contemplated that elements disclosed in one aspect may be beneficially utilized on other aspects without specific recitation.

DETAILED DESCRIPTION

Figure 1:
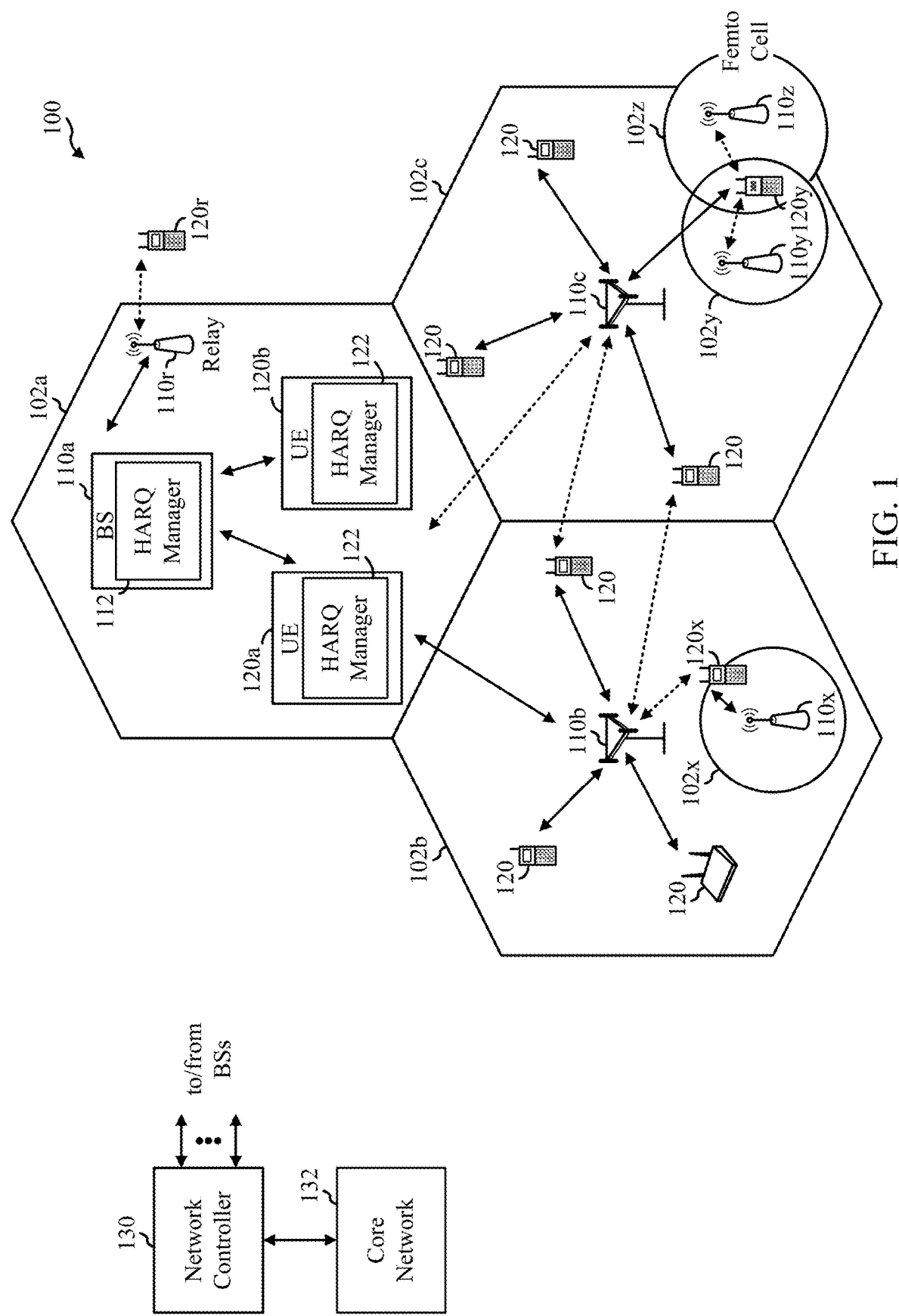
FIG. 1 is a block diagram conceptually illustrating an example wireless communication network, in accordance with certain aspects of the present disclosure.

Aspects of the present disclosure provide apparatus, methods, processing systems, and computer readable mediums for configuring a feedback process type at a device, such as a user equipment (UE). Certain aspects are described herein with respect to a hybrid automatic repeat request (HARQ) process for feedback, however, it should be noted that the techniques may be similarly applicable to other suitable feedback processes.

In certain aspects, a UE is configured to provide feedback to a transmitting device (e.g., a base station (BS)), indicating whether the UE has successfully received and decoded a transmission sent from the transmitting device. In certain aspects, the feedback is one or more of an acknowledgement (ACK) indicating the UE has successfully received and decoded the transmission and/or a negative ACK (NACK) indicating the UE has not successfully received and decoded the transmission. In certain aspects (e.g., for a HARQ process with feedback enabled as discussed herein), a UE transmits an ACK when it has successfully received and decoded the transmission and refrains from transmitting an ACK when it has not successfully received and decoded the transmission. In certain aspects (e.g., for a HARQ process with feedback enabled as discussed herein), a UE transmits a NACK when it has not successfully received and decoded the transmission and refrains from transmitting a NACK when it has successfully received and decoded the transmission. In certain aspects (e.g., for a HARQ process with feedback enabled as discussed herein), a UE transmits an ACK when it has successfully received and decoded the transmission and transmits a NACK when it has not successfully received and decoded the transmission.

In certain aspects, a UE is configured with one or more HARQ processes. Accordingly, in certain aspects, the UE maintains one or more buffers, each buffer corresponding to one of the one or more HARQ processes. Each HARQ process may be used for buffering data for a given downlink channel (e.g., control channel such as a physical downlink control channel (PDCCH) or a data channel such as a physical downlink shared channel (PDSCH)) at a time (e.g., per subframe, slot, etc.). In particular, as part of a HARQ process, the UE buffers data that is received even if it cannot successfully decode the data, and informs the BS that it could not decode the data for that channel for that time period. The BS may then resend the data to the UE, and the UE may then use both the previously received data and the resent data in combination (e.g., soft combining) to attempt to decode the data. Accordingly, different HARQ processes of the UE may be assigned to different downlink channels/downlink occasions at a time, and used to try and successfully receive and decode data. Each HARQ process may be identified by an identifier referred to as a HARQ ID, so that the receiver and transmitter are aware of which data belongs to which HARQ process.

In certain cases, the feedback for a HARQ process (e.g. associated with a particular downlink channel occasion) may be disabled. For example, in a non-terrestrial network (NTN) where a UE communicates with a BS that is a satellite, the round-trip-time/propagation delay for communicating between the UE and the BS may be large. Therefore, with HARQ feedback enabled, there may be long delays between communications between the UE and the BS, such as long delays between when a BS sends a transmission and when a BS receives feedback from the UE for the transmission. Such delays may cause a stop-and-wait problem, where the BS must wait for the UE to confirm it has decoded a first transmission before it can further send data for a second transmission, thereby causing a slow rate of data transfer between the BS and the UE. In certain aspects, it may be more beneficial to enable HARQ feedback for some transmissions (e.g., control channel transmissions such as medium access control (MAC) control element (MAC CE) transmissions to ensure reliability), while HARQ feedback may not be enabled for other transmissions.

Certain aspects herein provide for different feedback process types, such as different HARQ process types. Certain aspects provide a feedback enabled type, such as HARQ feedback enabled. If the feedback process type is feedback enabled type for a particular HARQ process, in certain aspects, the UE is configured to transmit HARQ feedback (e.g., ACK/NACK) to the transmitting device for the downlink channel the HARQ process is associated with, such as discussed. The transmitting device may then wait for such feedback and resend data as needed per the HARQ process.

Certain aspects provide a feedback disabled type, such as HARQ feedback disabled. If the feedback process type is feedback disabled type for a particular HARQ process, in certain aspects, the UE is configured to not transmit feedback to the transmitting device for the downlink channel the HARQ process is associated with. Accordingly, the transmitting device is not configured to wait for any such feedback, and may continue sending data to the UE.

In certain aspects, such as for conforming to legacy devices that expect feedback to be sent, even for a HARQ process configured as feedback disabled type for a UE, the UE is configured to always send a NACK to the transmitting device for the downlink channel the HARQ process is associated with, regardless of whether the data was successfully received or not. The transmitting device simply ignores such feedback and may not wait for such feedback and continue sending data to the UE, which differs from feedback enabled type.

In certain aspects, such as for conforming to legacy devices that expect feedback to be sent, even for a HARQ process configured as feedback disabled type for a UE, the UE is configured to send ACK or NACK to the transmitting device for the downlink channel the HARQ process is associated with, depending on whether the data was successfully received or not. The transmitting device, however, may not wait for such feedback, and may not even utilize such feedback in determining to resend data to the UE, and continues sending data to the UE, which differs from feedback enabled type.

Accordingly, certain aspects herein provide efficient techniques for configuring feedback process type for a feedback process. For example, certain aspects herein provide a first feedback process type to one or more UEs. In certain aspects, the first feedback process type is used as a "default" feedback process type, such that by default such a default feedback process type may be used for HARQ processes unless a different feedback process type is signaled for a HARQ process. Such use of a default feedback process type may beneficially reduce signaling overhead. Though certain aspects may be discussed with respect to a default feedback process type, such aspects may be applicable generally to a feedback process type indicated for a plurality (e.g., all) feedback processes of a UE.

Certain aspects herein provide signaling of a pattern of time periods (e.g., slots) as associated with a particular feedback process type (e.g., feedback enabled type). Accordingly, in certain aspects, downlink data transmissions (e.g., physical downlink shared channel (PDSCH) transmissions) received in the time periods indicated by the pattern are associated with the feedback process type.

Certain aspects herein provide maintaining downlink assignment indicators (DAIs) separately for different feedback process types.

The following description provides examples of feedback process type configuration in communication systems, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method which is practiced using other structure, functionality, or structure and functionality in addition to, or other than, the various aspects of the disclosure set forth herein. It should be understood that any aspect of the disclosure disclosed herein may be embodied by one or more elements of a claim. The word "exemplary" is used herein to mean "serving as an example, instance, or illustration." Any aspect described herein as "exemplary" is not necessarily to be construed as preferred or advantageous over other aspects.

In general, any number of wireless networks may be deployed in a given geographic area. Each wireless network may support a particular radio access technology (RAT) and may operate on one or more frequencies. A RAT may also be referred to as a radio technology, an air interface, etc. A frequency may also be referred to as a carrier, a subcarrier, a frequency channel, a tone, a subband, etc. Each frequency may support a single RAT in a given geographic area in order to avoid interference between wireless networks of different RATs.

The techniques described herein may be used for various wireless networks and radio technologies. While aspects may be described herein using terminology commonly associated with 3G, 4G, and/or new radio (e.g., 5G NR) wireless technologies, aspects of the present disclosure can be applied in other generation-based communication systems.

NR access may support various wireless communication services, such as enhanced mobile broadband (eMBB) targeting wide bandwidth (e.g., 80 MHz or beyond), millimeter wave (mmW) targeting high carrier frequency (e.g., 24 GHz to 53 GHz or beyond), massive machine type communications MTC (mMTC) targeting non-backward compatible MTC techniques, and/or mission critical targeting ultra-reliable low-latency communications (URLLC). These services may include latency and reliability requirements. These services may also have different transmission time intervals (TTI) to meet respective quality of service (QoS) requirements. In addition, these services may co-exist in the same subframe. NR supports beamforming and beam direction may be dynamically configured. MIMO transmissions with precoding may also be supported, as multi-layer transmissions. Aggregation of multiple cells may be supported.

FIG. 1 illustrates an example wireless communication network 100 in which aspects of the present disclosure may be performed. For example, the wireless communication network 100 may be an NR system (e.g., a 5G NR network).

As shown in FIG. 1, the BS 110a includes a HARQ manager 112 that may transmit signaling for feedback process type configuration of one or more HARQ processes of a UE (such as the UE 120a or 120b), in accordance with aspects of the present disclosure. The UE 120a includes a HARQ manager 122 that may receive signaling for feedback process type configuration of one or more HARQ processes and communicate feedback to the BS based on the feedback process type configuration, in accordance with aspects of the present disclosure. The UE 120b may also include a HARQ manager 122. In some examples, the HARQ manager 122 may be configured to perform one or more of the operations illustrated in FIGS. 7-11. In aspects, the BS 110a may transmit multicast/broadcast transmissions concurrently to the UEs 120a, 120b, for example. A common feedback process type configuration may be sent to the UEs 120a, 120b. While the transmissions between the BS 110a and UEs 120a, 120b are depicted as being separate transmissions to facilitate understanding, aspects of the present disclosure may also be applied to the same multicast/broadcast transmission being sent between the BS 110a and UEs 120a, 120b.

As illustrated in FIG. 1, the wireless communication network 100 may include a number of BSs 110a-z (each also individually referred to herein as BS 110 or collectively as BSs 110) and other network entities. A BS 110 may provide communication coverage for a particular geographic area, sometimes referred to as a "cell", which may be stationary or may move according to the location of a mobile BS 110. In some examples, the BSs 110 may be interconnected to one another and/or to one or more other BSs or network nodes (not shown) in wireless communication network 100 through various types of backhaul interfaces (e.g., a direct physical connection, a wireless connection, a virtual network, or the like) using any suitable transport network. In the example shown in FIG. 1, the BSs 110a, 110b and 110c may be macro BSs for the macro cells 102a, 102b and 102c, respectively. The BS 110x may be a pico BS for a pico cell 102x. The BSs 110y and 110z may be femto BSs for the femto cells 102y and 102z, respectively. A BS may support one or multiple cells.

The BSs 110 communicate with UEs 120a-y (each also individually referred to herein as UE 120 or collectively as UEs 120) in the wireless communication network 100. The UEs 120 (e.g., 120x, 120y, etc.) may be dispersed throughout the wireless communication network 100, and each UE 120 may be stationary or mobile. Wireless communication network 100 may also include relay stations (e.g., relay station 110r), also referred to as relays or the like, that receive a transmission of data and/or other information from an upstream station (e.g., a BS 110a or a UE 120r) and sends a transmission of the data and/or other information to a downstream station (e.g., a UE 120 or a BS 110), or that relays transmissions between UEs 120, to facilitate communication between devices.

A network controller 130 may be in communication with a set of BSs 110 and provide coordination and control for these BSs 110 (e.g., via a backhaul). In certain cases, the network controller 130 may include a centralized unit (CU) and/or a distributed unit (DU), for example, in a 5G NR system. In aspects, the network controller 130 may be in communication with a core network 132 (e.g., a 5G Core Network (5GC)), which provides various network functions such as access and mobility management, session management, user plane function, policy control function, authentication server function, unified data management, application function, network exposure function, network repository function, network slice selection function, etc.

Figure 2:
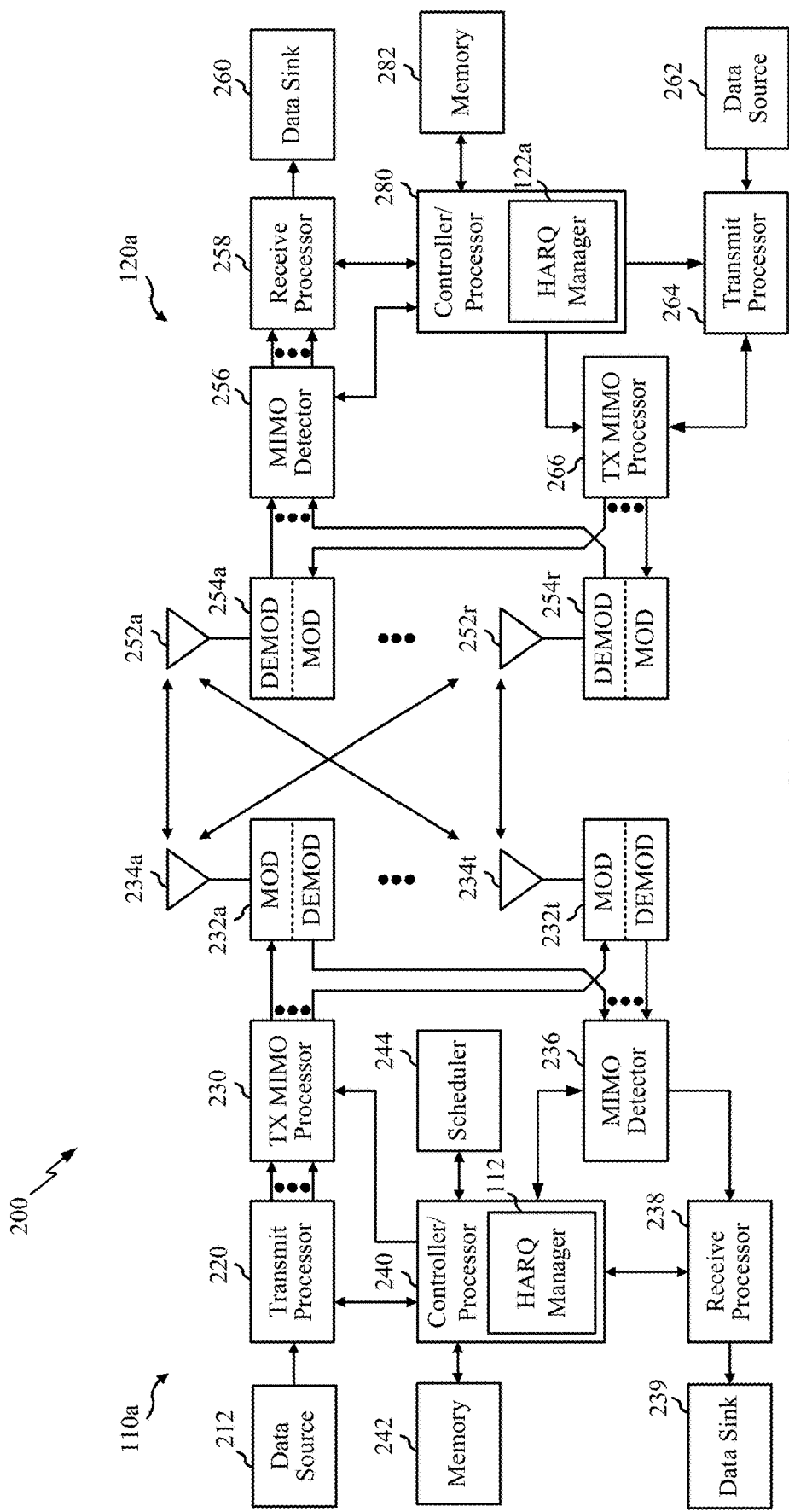
FIG. 2 is a block diagram conceptually illustrating a design of an example base station (B S) and user equipment (UE), in accordance with certain aspects of the present disclosure.

FIG. 2 illustrates example components of BS 110a and UE 120a (e.g., the wireless communication network 100 of FIG. 1), which may be used to implement aspects of the present disclosure.

At the BS 110a, a transmit processor 220 may receive data from a data source 212 and control information from a controller/processor 240. The control information may be for the physical broadcast channel (PBCH), physical control format indicator channel (PCFICH), physical hybrid ARQ indicator channel (PHICH), physical downlink control channel (PDCCH), group common PDCCH (GC PDCCH), etc. The data may be for the physical downlink shared channel (PDSCH), etc. A medium access control (MAC)-control element (MAC-CE) is a MAC layer communication structure that may be used for control command exchange between wireless nodes. The MAC-CE may be carried in a shared channel such as a physical downlink shared channel (PDSCH), a physical uplink shared channel (PUSCH), or a physical sidelink shared channel (PSSCH).

The processor 220 may process (e.g., encode and symbol map) the data and control information to obtain data symbols and control symbols, respectively. The transmit processor 220 may also generate reference symbols, such as for the primary synchronization signal (PSS), secondary synchronization signal (SSS), PBCH demodulation reference signal (DMRS), and channel state information reference signal (CSI-RS). A transmit (TX) multiple-input multiple-output (MIMO) processor 230 may perform spatial processing (e.g., precoding) on the data symbols, the control symbols, and/or the reference symbols, if applicable, and may provide output symbol streams to the modulators (MODs) in transceivers 232a-232t. Each modulator transceivers 232a-232t may process a respective output symbol stream (e.g., for OFDM, etc.) to obtain an output sample stream. Each modulator may further process (e.g., convert to analog, amplify, filter, and upconvert) the output sample stream to obtain a downlink signal. Downlink signals from modulators transceivers 232a-232t may be transmitted via the antennas 234a-234t, respectively.

At the UE 120a, the antennas 252a-252r may receive the downlink signals from the BS 110a and may provide received signals to the demodulators (DEMODs) in transceivers 254a-254r, respectively. Each demodulator in transceivers 254a-254r may condition (e.g., filter, amplify, downconvert, and digitize) a respective received signal to obtain input samples. Each demodulator may further process the input samples (e.g., for OFDM, etc.) to obtain received symbols. A MIMO detector 256 may obtain received symbols from all the demodulators in transceivers 254a-254r, perform MIMO detection on the received symbols if applicable, and provide detected symbols. A receive processor 258 may process (e.g., demodulate, deinterleave, and decode) the detected symbols, provide decoded data for the UE 120a to a data sink 260, and provide decoded control information to a controller/processor 280.

On the uplink, at UE 120a, a transmit processor 264 may receive and process data (e.g., for the physical uplink shared channel (PUSCH)) from a data source 262 and control information (e.g., for the physical uplink control channel (PUCCH) from the controller/processor 280. The transmit processor 264 may also generate reference symbols for a reference signal (e.g., for the sounding reference signal (SRS)). The symbols from the transmit processor 264 may be precoded by a TX MIMO processor 266 if applicable, further processed by the modulators (MODs) in transceivers 254a-254r (e.g., for SC-FDM, etc.), and transmitted to the BS 110a. At the BS 110a, the uplink signals from the UE 120a may be received by the antennas 234, processed by the modulators in transceivers 232a-232t, detected by a MIMO detector 236 if applicable, and further processed by a receive processor 238 to obtain decoded data and control information sent by the UE 120a. The receive processor 238 may provide the decoded data to a data sink 239 and the decoded control information to the controller/processor 240.

The memories 242 and 282 may store data and program codes for BS 110a and UE 120a, respectively. A scheduler 244 may schedule UEs for data transmission on the downlink and/or uplink.

Antennas 252, processors 266, 258, 264, and/or controller/processor 280 of the UE 120a and/or antennas 234, processors 220, 230, 238, and/or controller/processor 240 of the BS 110a may be used to perform the various techniques and methods described herein. For example, as shown in FIG. 2, the controller/processor 240 of the BS 110a has the HARQ manager 112, according to aspects described herein. As shown in FIG. 2, the controller/processor 280 of the UE 120a has the HARQ manager 122, according to aspects described herein. In some examples, the HARQ manager 122 may be configured to perform one or more of the operations illustrated in FIGS. 7-11. Although shown at the controller/processor, other components of the UE 120a and BS 110a may be used to perform the operations described herein.

While the UE 120a is described with respect to FIGS. 1 and 2 as communicating with a BS and/or within a network, the UE 120a may be configured to communicate directly with/transmit directly to another UE 120, or with/to another wireless communication device without relaying communications through a network. In some embodiments, the BS 110a illustrated in FIG. 2 and described above is an example of another UE 120.

NR may utilize orthogonal frequency division multiplexing (OFDM) with a cyclic prefix (CP) on the uplink and downlink. NR may support half-duplex operation using time division duplexing (TDD). OFDM and single-carrier frequency division multiplexing (SC-FDM) partition the system bandwidth into multiple orthogonal subcarriers, which are also commonly referred to as tones, bins, etc. Each subcarrier may be modulated with data. Modulation symbols may be sent in the frequency domain with OFDM and in the time domain with SC-FDM. The spacing between adjacent subcarriers may be fixed, and the total number of subcarriers may be dependent on the system bandwidth. The minimum resource allocation, called a resource block (RB), may be 12 consecutive subcarriers. The system bandwidth may also be partitioned into subbands. For example, a subband may cover multiple RBs. NR may support a base subcarrier spacing (SCS) of 15 KHz and other SCS may be defined with respect to the base SCS (e.g., 30 kHz, 60 kHz, 120 kHz, 240 kHz, etc.).

Figure 3:
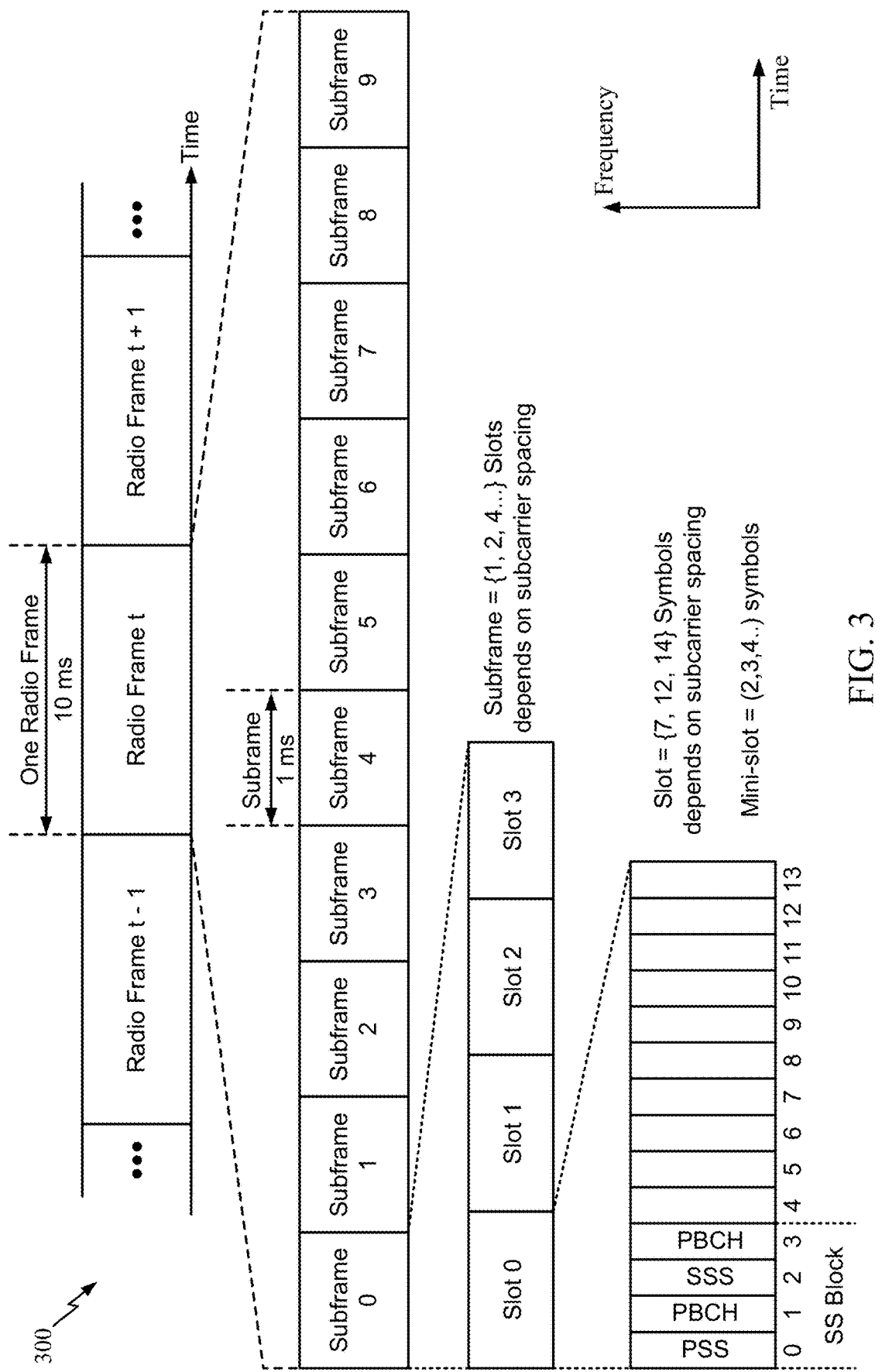
FIG. 3 is an example frame format for certain wireless communication systems (e.g., new radio (NR)), in accordance with certain aspects of the present disclosure.

FIG. 3 is a diagram showing an example of a frame format 300 for NR. The transmission timeline for each of the downlink and uplink may be partitioned into units of radio frames. Each radio frame may have a predetermined duration (e.g., 10 ms) and may be partitioned into 10 subframes, each of 1 ms, with indices of 0 through 9. Each subframe may include a variable number of slots (e.g., 1, 2, 4, 8, 16, . . . slots) depending on the SCS. Each slot may include a variable number of symbol periods (e.g., 7, 12, or 14 symbols) depending on the SCS. The symbol periods in each slot may be assigned indices. A mini-slot, which may be referred to as a sub-slot structure, refers to a transmit time interval having a duration less than a slot (e.g., 2, 3, or 4 symbols). Each symbol in a slot may indicate a link direction (e.g., downlink (DL), uplink (UL), or flexible) for data transmission and the link direction for each subframe may be dynamically switched. The link directions may be based on the slot format. Each slot may include DL/UL data as well as DL/UL control information.

In NR, a synchronization signal block (SSB) is transmitted. In certain aspects, SSBs may be transmitted in a burst where each SSB in the burst corresponds to a different beam direction for UE-side beam management (e.g., including beam selection and/or beam refinement). The SSB includes a PSS, a SSS, and a two symbol PBCH. The SSB can be transmitted in a fixed slot location, such as the symbols 0-3 as shown in FIG. 3. The PSS and SSS may be used by UEs for cell search and acquisition. The PSS may provide half-frame timing, the SS may provide the CP length and frame timing. The PSS and SSS may provide the cell identity. The PBCH carries some basic system information, such as downlink system bandwidth, timing information within radio frame, SS burst set periodicity, system frame number, etc. The SSBs may be organized into SS bursts to support beam sweeping. Further system information such as, remaining minimum system information (RMSI), system information blocks (SIBs), other system information (OSI) can be transmitted on a physical downlink shared channel (PDSCH) in certain subframes. The SSB can be transmitted up to sixty-four times, for example, with up to sixty-four different beam directions for mmWave. The multiple transmissions of the SSB are referred to as a SS burst set. SSBs in an SS burst set may be transmitted in the same frequency region, while SSBs in different SS bursts sets can be transmitted at different frequency regions.

Example Feedback Process Type Configuration

In certain cases, a wireless communication network may support transmission of data with hybrid automatic repeat request (HARQ) to provide forward error correction in addition to automatic re-transmission of corrupted data at a receiver. For example, a transmitter (e.g., the BS 110a) may send an initial transmission of data to a receiver (e.g., a UE), and if the data is corrupted at the receiver, the transmitter may send one or more retransmissions of the data (such as a transport block (TB), codeblock group (CBG), or one or more codeblocks) until the data is successfully decoded at the receiver, or the maximum number of retransmissions of the data has occurred, or some other termination condition is encountered.

As re-transmissions are received, the receiver may combine all of the received transmissions (including the initial transmission and re-transmissions) to attempt to decode the data. In certain cases, the receiver may send an acknowledgment (ACK) if the data is decoded successfully or a negative-ACK (NACK) if the data is decoded in error or unsuccessfully. The transmitter may send a re-transmission of the data if a NACK is received and may terminate transmission of the data if an ACK is received. In certain cases, the transmitter may send a re-transmission if the transmitter fails to receive an ACK within a certain period of time. The transmitter may process (e.g., encode and modulate) the data with forward error correction and/or redundancy information, which may be selected such that the data can be decoded successfully with a high probability. The data may also be referred to as a TB, a codeword, a data block, etc. In certain cases, a data transmission (e.g., a transport block) may be segmented into codeblocks (CBs), and re-transmissions may be triggered on a CBG basis (e.g., a group of codeblocks). In other words, a re-transmission may include a portion of the initial transmission, such as a codeblock group of a transport block.

As discussed, in certain aspects, a UE utilizes one or more HARQ processes for providing feedback for one or more transmissions of data (such as a transport block (TB), codeblock group (CBG), or one or more codeblocks). Certain aspects herein provide for configuring a feedback process type for the one or more HARQ processes.

In certain aspects, a UE (e.g., UE 120a of FIG. 1) is configured with a first feedback process type such as a "default feedback process type" for providing feedback to the BS 110a for a plurality of feedback processes of the UE. The default type may indicate a particular HARQ feedback type such as "HARQ feedback enabled" or "HARQ feedback disabled." Here, the HARQ feedback type may control whether the UE provides feedback to the BS 110a regarding decoding of one or more downlink transmissions from the BS. In some examples, if a downlink transmission is associated with a "HARQ feedback enabled" type, then the UE 120a may transmit HARQ feedback (e.g., ACK/NACK) according to a decoding outcome of the downlink transmission. Alternatively, if a downlink transmission is associated with a "HARQ feedback disabled" type, then the UE 120a may respond with one of several processes as described in more detail below. Thus, in some examples, if the UE 120a is configured with a default feedback process type, the UE 120a may generally perform HARQ feedback processes on received downlink transmissions according to the default type. In certain aspects, the BS 110a or another network node (e.g., core network) configures the UE 120a with the default feedback process type via radio resource control (RRC) signaling, such as in a RRC message, or broadcast messaging, such as in a system information block (SIB) message. In certain aspects, the BS 110a configures all UEs in a cell of the BS with the same first (e.g., default) feedback process type. In certain aspects, the BS 110a configures particular UEs with a particular default feedback process type.

The UE 120a may also be configured to respond to other feedback processes with one or more additional feedback process types that are different from the default feedback process type. That is, the UE 120a may be configured with a default feedback process type for providing feedback to the BS 110a for a plurality of feedback processes of the UE 120a, as well as another feedback process type (e.g., a second feedback process type) for providing feedback to the BS for one or more feedback processes of the plurality of feedback processes. Here, the BS 110a or another network node may configure the UE 120a with the second feedback process type via RRC signaling, medium access control (MAC) control element (CE), or downlink control information (DCI). In some examples, the second feedback process type may be identified by a HARQ process number or any other suitable identifier.

In some examples, the UE 120a may be initially configured with the default feedback process type prior to the second feedback process type. For example, the default feedback process type may be communicated to the UE 120a and any other additional UEs in the same cell via a broadcast message (e.g., SIB), while the second feedback process type can be communicated on a per-UE basis (e.g., the network may communicate the default feedback process type to less than all of the UEs of a cell, or the network may communicate different default feedback process types to each of one or more UEs in the cell) via RRC signaling.

In some examples, the default feedback process type may be one of the feedback enabled type or the feedback disabled type, whereas the second feedback process type is the other of the feedback enabled type and feedback disabled type. Thus, if the default feedback process type is a feedback enabled type, then providing feedback to a downlink transmission according to the default feedback process type may include transmitting an acknowledgement (ACK) or a negative acknowledgement (NACK) to the BS 110a based on a decoding outcome of the downlink transmission.

In contrast, if the default feedback process type is a feedback disabled type, then to provide feedback to the downlink transmission according to the default feedback process type, the UE 120a may be configured to perform one of the following processes. In certain aspects, if the default feedback process type is a feedback disabled type, then the UE 120a may provide feedback to a downlink transmission according to the feedback disabled type by transmitting an ACK or a NACK to the BS 110a based on a decoding outcome of the downlink transmission. In certain aspects, the UE 120a may provide feedback to the downlink transmission according to the feedback disabled type by transmitting a NACK to the BS 110a regardless of the decoding outcome of the downlink transmission. In certain aspects, the UE 120a may withhold feedback or refrain from providing feedback to the BS 110a regardless of a decoding outcome of the downlink transmission according to the feedback disabled type.

In certain aspects, the UE 120a is configured to monitor (e.g., receive and attempt to decode) signals on the candidate resources of a downlink control channel. The UE 120a may receive a downlink control channel in the search space that schedules (e.g., using a downlink grant, DCI, etc.) a downlink data channel (e.g., PDSCH) on one or more resources (e.g., time/frequency resources, such as resource blocks (RBs), resource elements (REs), etc.).

The UE 120a may then receive one or more downlink transmissions from the BS 110a associated with a feedback process that corresponds to one of the default feedback process type or the second feedback process type. The UE 120a may attempt to decode the one or more downlink transmissions, then selectively provide feedback (e.g., transmit feedback or withhold transmission of feedback) to the BS 110a regarding the decoding of the one or more downlink transmissions according to the corresponding default feedback process type or the other feedback process type.

Example Semistatic HARQ Codebook for HARQ Processes

In certain aspects, the UE 120a may receive an indication of a subset of time periods of a plurality of time periods that occur periodically for communication of downlink transmissions. For example, the UE 120a may receive signaling identifying a particular one or more slots or mini slots within a frame or subframe, wherein the signaling configures the UE 120a to identify those particular one or more slots in each subsequent frame or subframe. Although this example uses known durations of time (e.g., frame, subframe, slot, and mini slot), any suitable time period may be used, including time periods that are not generally recognized in wireless standards. In certain aspects, the BS 110a or another network node (e.g., core network) configures the UE 120a with the subset of time periods and the plurality of time periods via radio resource control (RRC) signaling, such as in a RRC message, or broadcast messaging, such as in a system information block (SIB) message.

In some examples, the indication of a subset of time periods indicates (e.g., explicit in the indication or implicitly based on communication of the indication itself) that the subset of time periods corresponds to a particular feedback process type, for example feedback enabled type of HARQ process. Thus, if the UE 120a receives one or more downlink transmissions from the BS 110a during any time period in such a subset, the UE 120a may provide feedback to the BS 110a indicating the decoding outcome of the one or more downlink transmissions. It should be noted that the feedback process type of the subset of time periods may be different from remaining time periods of the plurality of time periods.

Figure 4:
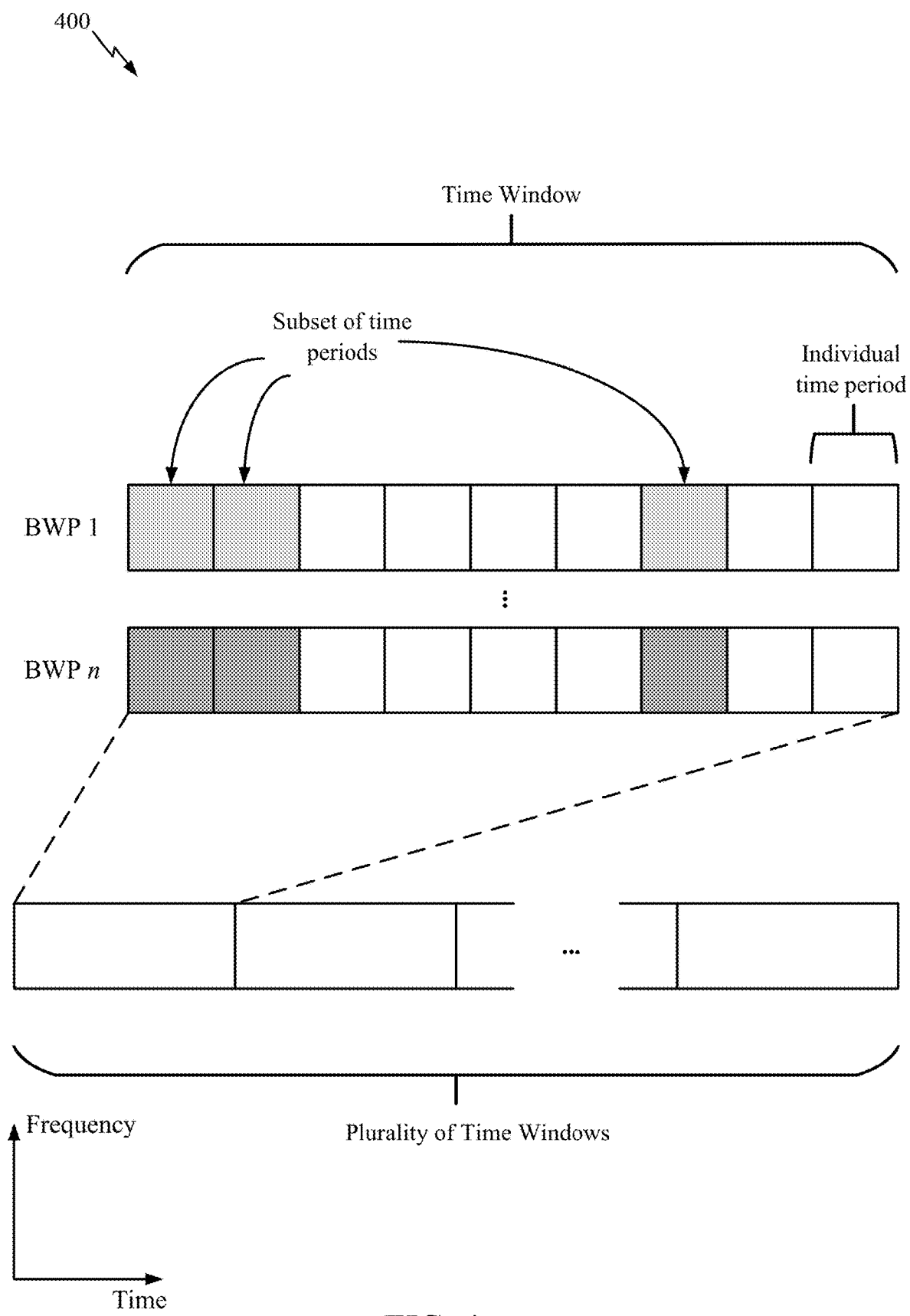
FIG. 4 is a block diagram illustrating an example pattern of a subset of time periods of a plurality of time periods (e.g., a time window segmented by time periods), according to certain aspects.

FIG. 4 is a block diagram illustrating an example pattern 400 of a subset of time periods of a plurality of time periods (e.g., a time window segmented by time periods). In this example, the subset of time periods is illustrated as the same three subsets across a first bandwidth part (BWP 1) and a second BWP (BWP n). Each of the three subsets are illustrated as shaded for identification purposes. Each individual time period may correspond to a frame, a subframe, a slot, a mini slot, or some other duration of time. Each individual time period may include one or more downlink transmission occasions (e.g., the UE 120a may have an opportunity to receive multiple downlink transmissions during a single time period).

In some examples, the UE 120a may be configured to identify the same subset of time periods in all subsequent time windows as corresponding to the feedback enabled type of HARQ process. Accordingly, the UE 120a will treat any downlink transmissions received during the subset of time periods as corresponding to the feedback enabled type of HARQ process, across a plurality of contiguous time windows. In such an example, the UE 120a may need to be reconfigured to change the time periods corresponding to the feedback enabled type of HARQ process. Alternatively, the UE 120a may be configured for the feedback enabled type of HARQ process for only the subset of time periods within a particular one or more time windows.

The UE 120a may receive one or more downlink transmissions from the BS 110a during at least one-time period that is not within the subset of time periods. In such a case, the UE 120a may refrain from providing feedback to the BS regarding decoding of the one or more downlink transmissions regardless of a decoding outcome of the one or more downlink transmissions. Alternatively, the UE 120a may provide feedback to the BS regarding decoding of the one or more downlink transmissions based on a decoding outcome of the one or more downlink transmissions, or the UE 120a may simply provide a NACK to the BS 110a regarding decoding of the one or more downlink transmissions regardless of a decoding outcome of the one or more downlink transmissions. In certain aspects, the BS 110a configures the UE 120a to utilize one of the described processes for providing feedback for feedback disabled type HARQ processes, such as using RRC signaling.

In certain aspects, the UE 120a may receive, from the BS 110a, an indication of a maximum number of downlink transmissions on a number of downlink transmission occasions within a time period, wherein feedback processes are enabled for the number of downlink transmission occasions. As discussed, a downlink transmission occasion relates to one or more resources (e.g., resource element (RE), resource block (RB), etc.) over which a downlink transmission can be received. Here, when the UE receives one or more downlink transmissions from the BS 110a during at least one of the number of downlink transmission occasions, the UE 120a may provide HARQ feedback to the BS 110a regarding decoding of the one or more downlink transmissions based on a decoding outcome of the one or more downlink transmissions.

The time window may be based on a downlink transmission to feedback timing indicator. For example, the UE 120a may derive the time window based on a PDSCH-to-HARQ_feedback timing indicator, or dl-DataToUL-ACK information element (IE).

The UE 120a may be configured to compress the HARQ feedback into a number of bits less than the number of downlink transmission occasions. For example, the UE may transmit HARQ feedback for one or more downlink transmissions received from the BS during a downlink transmission occasion having feedback processes enabled. However, the UE 120a may first encode or compress the feedback according to the following equation.

$$\left\lceil \log_2\left(1 + \sum_{i=0}^{M-1}\binom{N}{i}\right)\right\rceil \qquad \text{Equation 1}$$

Here, N is equal to the number of downlink transmission occasions in a given time period or time window, and M is equal to the maximum number of downlink transmissions. The UE 120a may generate a list of all possible HARQ feedback vectors (e.g., multi-bit binary vectors indicating: (i) a temporal position of one or more downlink transmissions, and (ii) whether the one or more downlink transmissions were received) including those with zero ACKs (e.g., "0000" for N=4) which comprise $$\binom{N}{0} = 1$$

vector, those with one ACK (e.g., "0100") which comprise $$\binom{N}{1} = N$$

vectors, and so on up to M−1 ACKs which comprise $$\binom{N}{M-1}$$

vectors. For the HARQ feedback vector with M ACKs, a single indicator suffices because the base station knows which of the M downlink transmission occasions were used and can determine based on the indicator that the transmissions on these M downlink transmission occasions were all correctly received. The UE 120a may then use the equation above to determine a number of bits that the HARQ feedback can be compressed to, and then map each of the HARQ feedback vectors to a bit sequence having the compressed number of bits (e.g., a number of bits less than the number of downlink transmission occasions).

In certain aspects, the UE 120a may receive one or more downlink transmissions from the BS 110a during at least one downlink transmission occasion within the time period that is not within the number of downlink transmission occasions for which feedback processes are enabled. In this case, the UE 120a may determine to perform one of three processes. First, the UE 120a may refrain from providing feedback to the BS 110a regarding decoding of the one or more downlink transmissions regardless of a decoding outcome. Second, the UE 120a may provide feedback to the BS 110a regarding decoding of the one or more downlink transmissions based on a decoding outcome. Or, third, the UE 120a may provide a NACK to the BS regarding decoding of the one or more downlink transmissions regardless of a decoding outcome. In certain aspects, the BS 110a configures the UE 120a to utilize one of the described processes for providing feedback for feedback disabled type HARQ processes, such as using RRC signaling.

Figure 5:
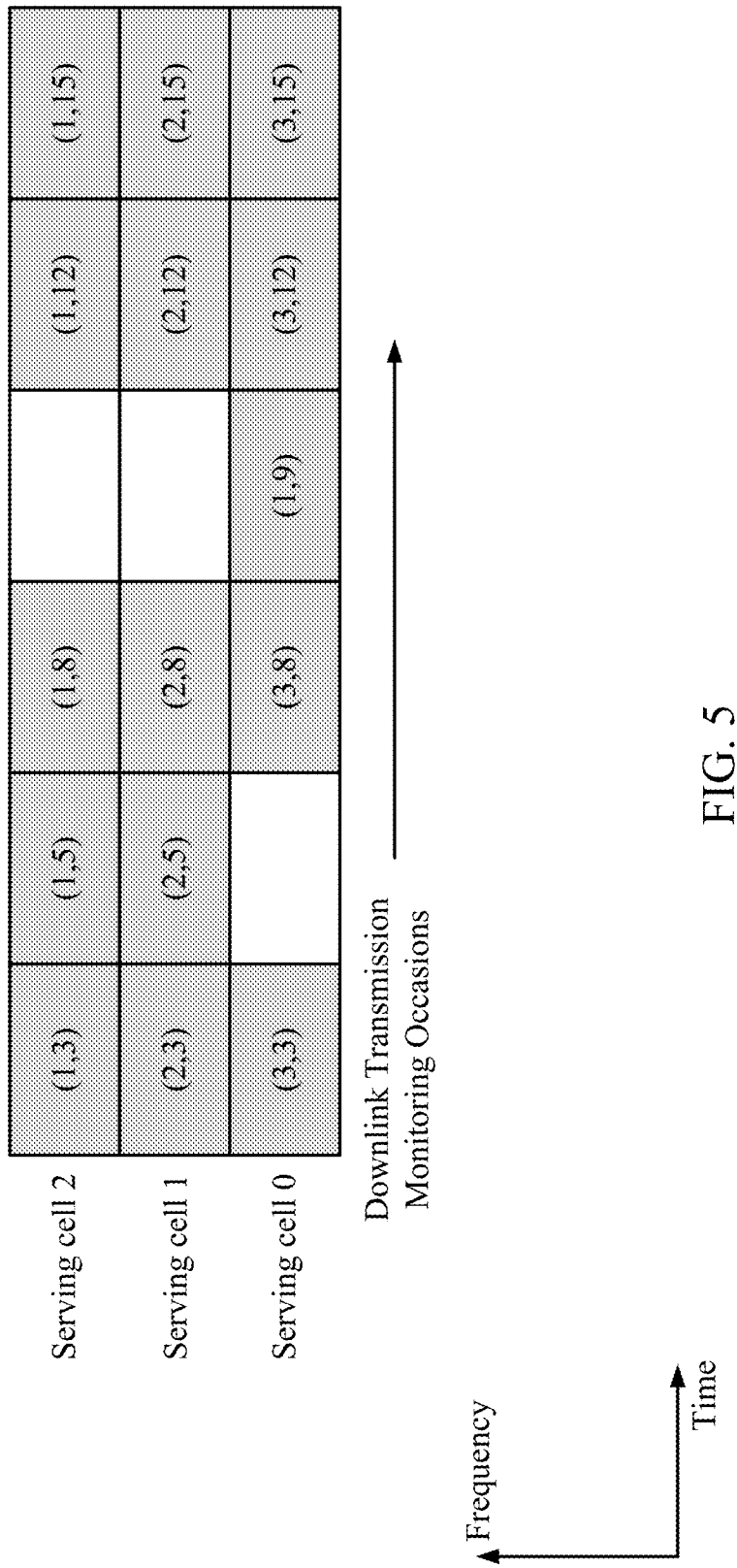
FIG. 5 is a block diagram illustrating the use of a downlink assignment indicator (DAI) counter and a DAI total in a downlink control information (DCI) message, in accordance with certain aspects of the present disclosure.

Example Downlink Assignment Indicator (DAI) Configuration for Disabled HARQ Feedback Process FIG. 5 is a block diagram illustrating the use of a DAI counter and a DAI total in a DCI message. Here, each block is indicative of a downlink transmission occasion (e.g., PDCCH/PDSCH) for a downlink transmission from one of three serving cells (e.g., Serving cell 2, Serving cell 1, and Serving cell 0). Each serving cell transmits on a BWP separate from the other serving cells, and each downlink transmission includes two DAI indicators: a counter DAI and a total DAI (e.g., (DAI_counter, DAI_total). Having the two DAI indicators provided in the DCI allows the UE to detect missed transmissions. In this example, the increments of the DAI indicators are performed within an ordered set of {serving cell, downlink transmission occasions}. As illustrated, a shaded block having a pair of DAI indicators indicates a downlink transmission occasion during which a downlink signal is transmitted.

Figure 6:
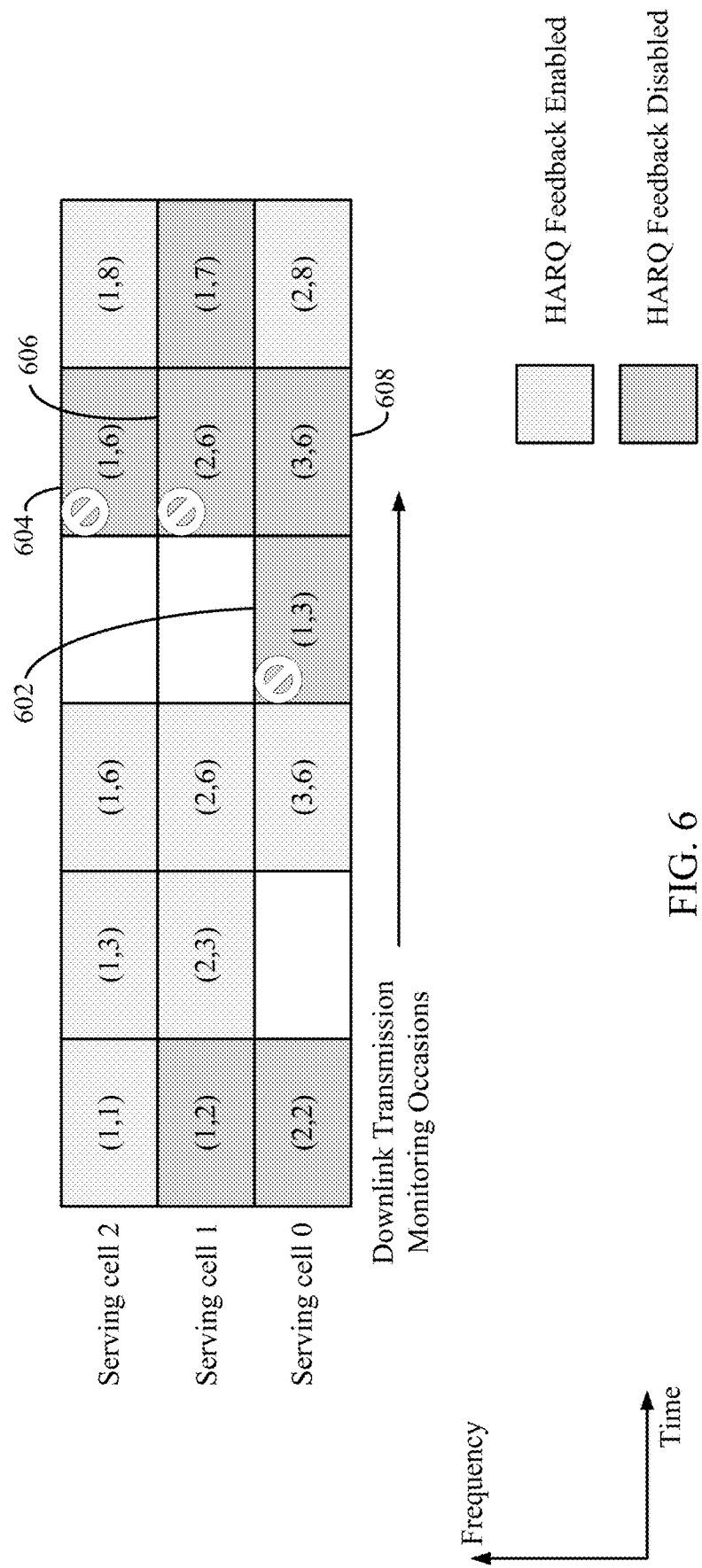
FIG. 6 is a block diagram illustrating the use of two separate DAI counters applied according to whether HARQ feedback is enabled or HARQ feedback is disabled for a particular downlink transmission occasion, in accordance with certain aspects of the present disclosure.

FIG. 6 is a block diagram illustrating the use of two separate DAI indicators applied according to whether HARQ feedback is enabled or HARQ feedback is disabled for a particular downlink transmission occasion. As illustrated, downlink transmission occasions with HARQ feedback enabled use a pair of DAI indicators that are separate from the pair of DAI indicators used by the downlink transmission occasions with HARQ feedback disabled, and increment independent of the other.

In this example, the UE 120a may receive one or more first DAIS for one or more first feedback processes of a plurality of feedback processes of the UE. In this case, the one or more first feedback processes are of a feedback enabled type. The UE 120a may also receive one or more second DAIs for one or more feedback disabled type processes of the UE. Having separate DAI counters allows the UE to transmit one or more statistics to the BS 110a based on the one or more first DAIs and the one or more second DAIs.

For example, as shown in FIG. 6, the BS 110a transmits downlink data over a first downlink transmission occasion 602, a second downlink transmission occasion 604, and a third downlink transmission occasion 606. However, the UE 120a is not able to receive the downlink data corresponding to any of these downlink transmission occasions. Upon receiving downlink data over a fourth downlink transmission occasion 608, the UE 120a is able to use the corresponding DAI indicator pair to determine that three downlink transmissions associated with HARQ feedback disabled downlink transmission occasions were not received. In response to determining that downlink data has been missed, the UE 120a may generate loss rate statistic information and transmit the statistics to the BS 110a. In some examples, the loss rate statistic information may include a number of determined lost downlink transmissions (e.g., a sum of the gaps in the counter DAIs).

It should be noted that although FIG. 6 illustrates an example where the UE 120a generates and transmits statistics relating to HARQ feedback disabled downlink transmission occasions, the UE 120a may also generate and transmit statistics for HARQ feedback enabled downlink transmission occasions.

Example One Shot HARQ Feedback Process

In certain aspects, the UE 120a may utilize an on-demand HARQ codebook (e.g., type-3 HARQ codebook) that corresponds to performance of the following steps: initially, the BS 110a transmits, via DCI, a one-shot HARQ feedback request to the UE 120a. In response, the UE 120a transmits a HARQ feedback for every transport block (TB), and for every code block group (CBG), if any, within a TB, and for each HARQ process on each cell/carrier.

In certain aspects, the on-demand codebook may correspond to feedback processes having mixed HARQ feedback types (e.g., HARQ feedback enabled and HARQ feedback disabled). In this case, the UE 120a may receive, from the BS 110a, an indication of a maximum number of downlink transmissions on a number of feedback processes of the UE within a time period. Here, the feedback may be enabled for the number of feedback processes. The UE 120a may then receive a one-shot feedback request from the BS 110a, and provide one-shot feedback to the BS 110a for the time period compressed into less than a number of bits. In some examples, the one-shot feedback may be compressed using equation 1 above. The indication is received in one of an RRC message, a MAC CE, or a DCI message.

In some examples, the time period is based on a difference between two consecutively received one-shot feedback requests from the BS 110a, however, the time period may also be explicitly provided in the indication.

In some examples, the number of bits is a maximum number of combination of code block groups, transport blocks, feedback processes, and cells for which feedback is provided in the one shot feedback. Accordingly, the UE 120a may encoding the one-shot feedback by generating a list of all possible feedback vectors for the maximum number of combination of code block groups, transport blocks, feedback processes, and cells for which feedback is provided in the one shot feedback. The UE 120a may then map all of the possible feedback vectors to bit sequences of a length less than the number of bits.

Figure 7:
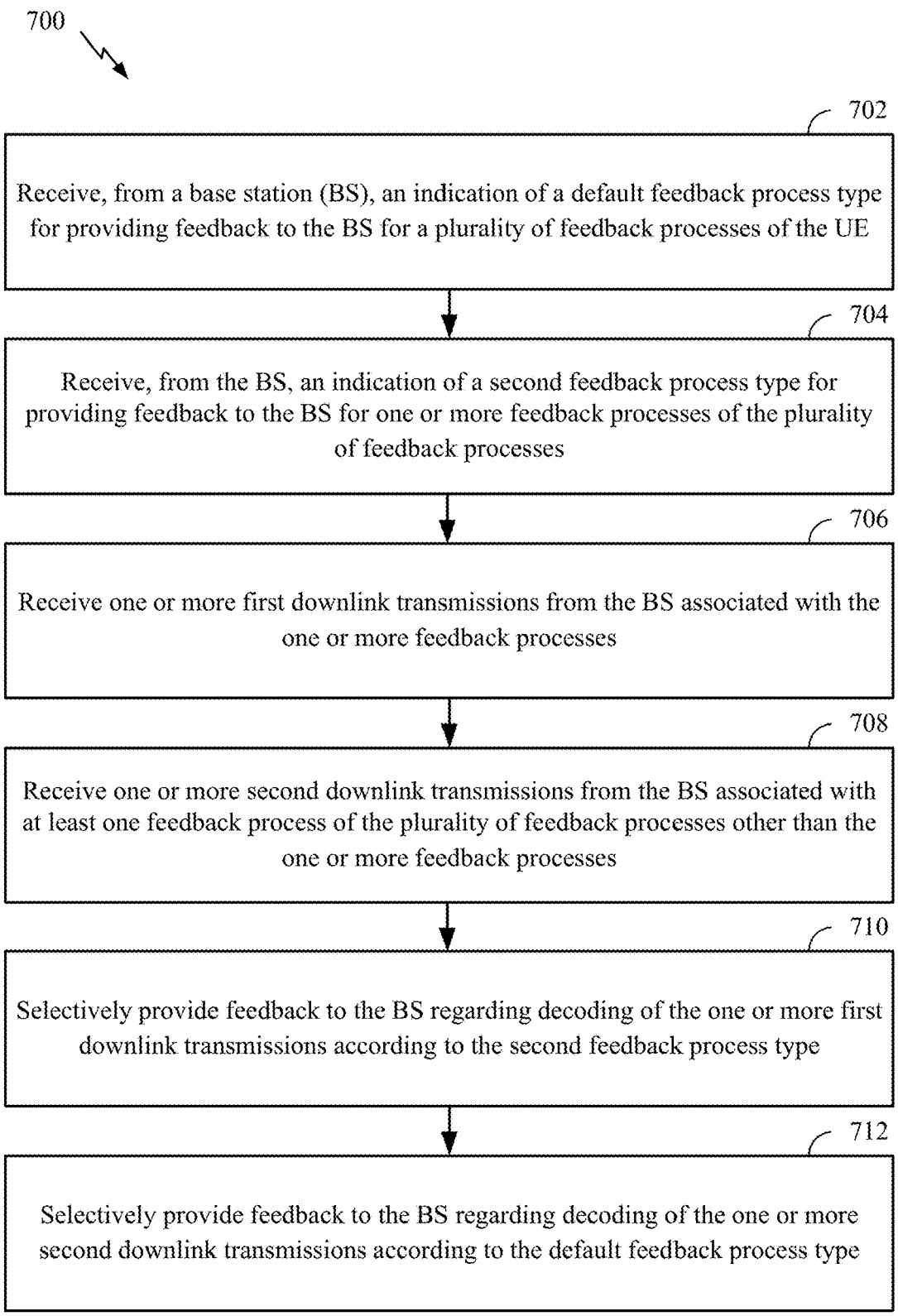
FIG. 7 is a flow diagram illustrating example operations for wireless communication by a network entity, in accordance with certain aspects of the present disclosure.

FIG. 7 is a flow diagram illustrating example operations 700 for wireless communication, in accordance with certain aspects of the present disclosure. The operations 700 may be performed, for example, by a UE (e.g., UE 120a in the wireless communication network 100). The operations 700 may be complimentary to operations performed by a BS (e.g., BS 110a in the wireless communication network 100). The operations 700 may be implemented as software components that are executed and run on one or more processors (e.g., controller/processor 280 of FIG. 2). Further, the transmission and reception of signals by the UE in the operations 700 may be enabled, for example, by one or more antennas (e.g., antennas 252 of FIG. 2). In certain aspects, the transmission and/or reception of signals by the UE may be implemented via a bus interface of one or more processors (e.g., controller/processor 280) obtaining and/or outputting signals.

The operations 700 may begin, at block 702, where the UE may receive, from a base station (BS), an indication of a default feedback process type for providing feedback to the BS for a plurality of feedback processes of the UE. At block 704, the UE may receive, from the BS, an indication of a second feedback process type for providing feedback to the BS for one or more feedback processes of the plurality of feedback processes. At block 706, the UE receiving one or more first downlink transmissions from the BS associated with the one or more feedback processes. At block 708, the UE may receive one or more second downlink transmissions from the BS associated with at least one feedback process of the plurality of feedback processes other than the one or more feedback processes. At block 710, the UE may selectively provide feedback to the BS regarding decoding of the one or more first downlink transmissions according to the second feedback process type. At block 712, the UE may selectively provide feedback to the BS regarding decoding of the one or more second downlink transmissions according to the default feedback process type.

In certain aspects, the plurality of feedback processes comprise a plurality of hybrid automatic repeat request (HARD) processes.

In certain aspects, the indication of the default feedback process type is received in one of a radio resource control (RRC) message, a broadcast message, or a system information block (SIB) message.

In certain aspects, the indication of the second feedback process type is received in one of a radio resource control (RRC) message, a medium access control (MAC) control element (MAC CE), or a downlink control information (DCI).

In certain aspects, the indication of the second feedback process type comprises one or more identifiers of the one or more feedback processes.

In certain aspects, the default feedback process type comprises one of a feedback enabled type and a feedback disabled type, and wherein the second feedback process type comprises the other of the feedback enabled type and a feedback disabled type.

In certain aspects, the default feedback process type comprises the feedback enabled type, and wherein selectively providing feedback according to the default feedback process type comprises transmitting an acknowledgement (ACK) or a negative acknowledgement (NACK) to the BS based on a decoding outcome of the one or more second downlink transmissions.

In certain aspects, the default feedback process type comprises the feedback disabled type, and wherein selectively providing feedback according to the default feedback process type comprises transmitting an acknowledgement (ACK) or a negative acknowledgement (NACK) to the BS based on a decoding outcome of the one or more second downlink transmissions.

In certain aspects, the default feedback process type comprises the feedback disabled type, and wherein selectively providing feedback according to the default feedback process type comprises transmitting a negative acknowledgement (NACK) to the BS regardless of a decoding outcome of the one or more second downlink transmissions.

In certain aspects, the default feedback process type comprises the feedback disabled type, and wherein selectively providing feedback according to the default feedback process type comprises refraining from providing feedback to the BS regardless of a decoding outcome of the one or more second downlink transmissions.

In certain aspects, further comprising receiving, from the BS, an indication of a second default feedback process type prior to receiving the indication of the default feedback process type, the second default feedback process type for providing feedback to the BS for a plurality of UEs, wherein the second default feedback process type is different than the default feedback process type.

Figure 8:
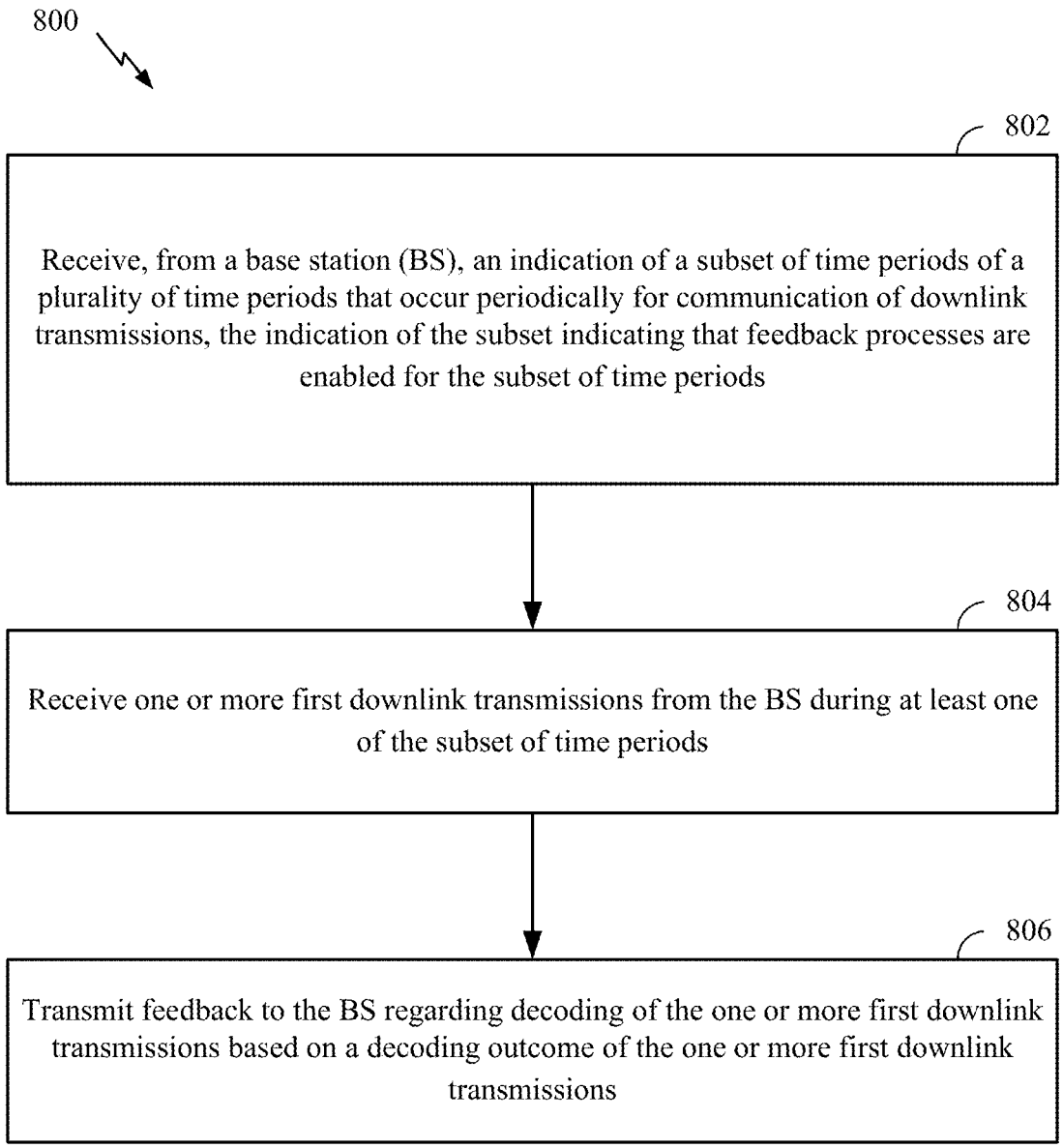
FIG. 8 is a flow diagram illustrating example operations for wireless communication by a network entity, in accordance with certain aspects of the present disclosure.

FIG. 8 is a flow diagram illustrating example operations 800 for wireless communication, in accordance with certain aspects of the present disclosure. The operations 800 may be performed, for example, by a UE (e.g., UE 120a in the wireless communication network 100). The operations 800 may be complimentary to operations performed by a BS (e.g., BS 110a in the wireless communication network 100). The operations 800 may be implemented as software components that are executed and run on one or more processors (e.g., controller/processor 280 of FIG. 2). Further, the transmission and reception of signals by the UE in the operations 800 may be enabled, for example, by one or more antennas (e.g., antennas 252 of FIG. 2). In certain aspects, the transmission and/or reception of signals by the UE may be implemented via a bus interface of one or more processors (e.g., controller/processor 280) obtaining and/or outputting signals.

The operations 800 may begin, at block 802, where the UE may receive, from a base station (BS), an indication of a subset of time periods of a plurality of time periods that occur periodically for communication of downlink transmissions, the indication of the subset of time periods indicating that feedback processes are enabled for the subset of time periods. At block 804, the UE may receive one or more first downlink transmissions from the BS during at least one of the subset of time periods. At block 806, providing feedback to the BS regarding decoding of the one or more first downlink transmissions based on a decoding outcome of the one or more first downlink transmissions.

In certain aspects, each of the plurality of time periods comprises a slot.

In certain aspects, operations 800 include enabling the feedback processes for the subset of time periods for a time window.

In certain aspects, operations 800 include enabling the feedback processes for the subset of time periods until the UE receives an indication of an updated subset of time periods of the plurality of time periods.

In certain aspects, operations 800 include receiving one or more second downlink transmissions from the BS during at least one of the time periods of the plurality of time periods other than the subset of time periods; and refraining from providing feedback to the BS regarding decoding of the one or more second downlink transmissions regardless of a decoding outcome of the one or more second downlink transmissions.

In certain aspects, operations 800 include receiving one or more second downlink transmissions from the BS during at least one of the time periods of the plurality of time periods other than the subset of time periods; and providing feedback to the BS regarding decoding of the one or more second downlink transmissions based on a decoding outcome of the one or more second downlink transmissions.

In certain aspects, operations 800 include receiving one or more second downlink transmissions from the BS during at least one of the time periods of the plurality of time periods other than the subset of time periods; and providing a negative acknowledgement (NACK) to the BS regarding decoding of the one or more second downlink transmissions regardless of a decoding outcome of the one or more second downlink transmissions.

Figure 9:
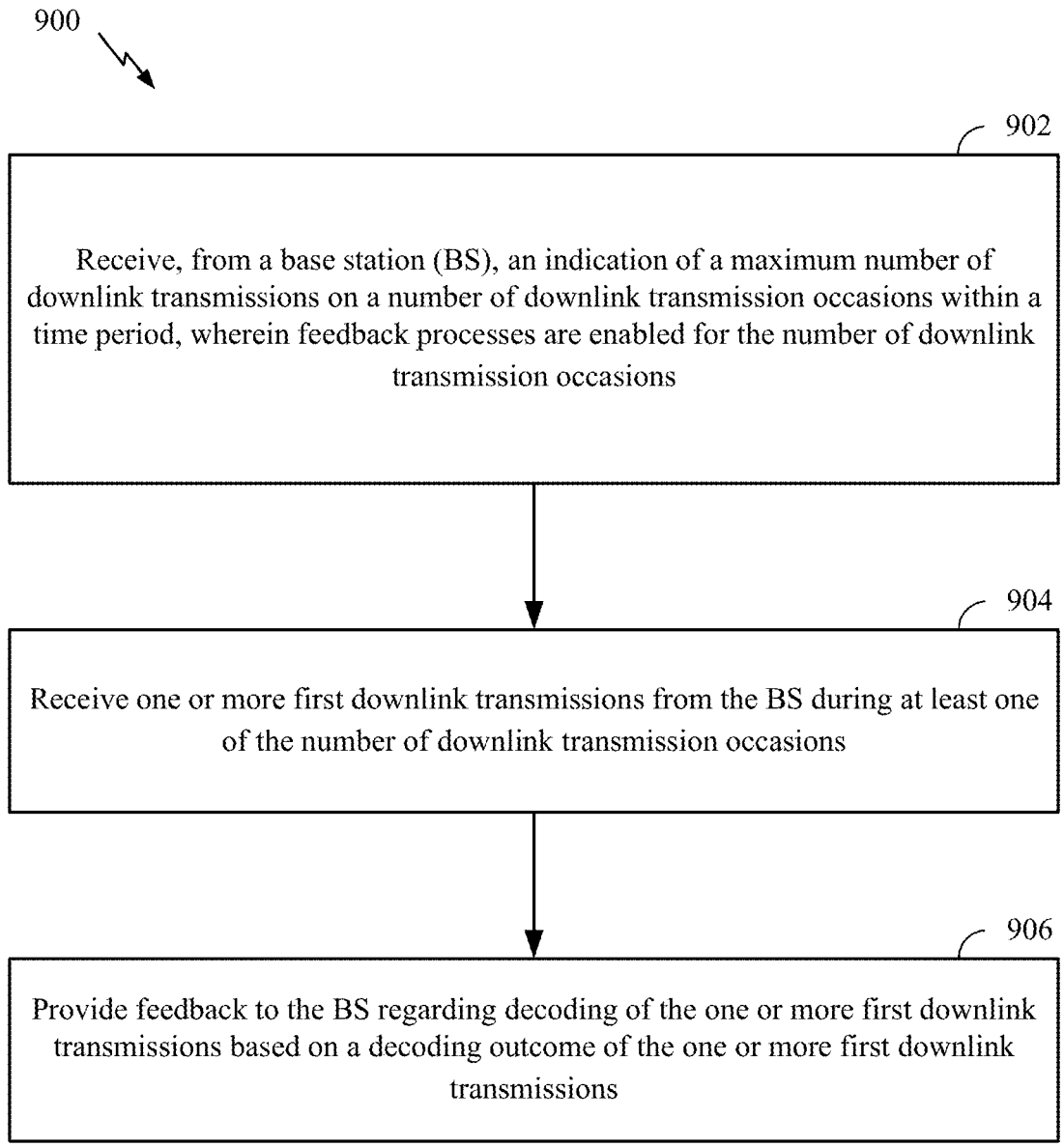
FIG. 9 is a flow diagram illustrating example operations for wireless communication by a network entity, in accordance with certain aspects of the present disclosure.

FIG. 9 is a flow diagram illustrating example operations 900 for wireless communication, in accordance with certain aspects of the present disclosure. The operations 900 may be performed, for example, by a UE (e.g., UE 120a in the wireless communication network 100). The operations 900 may be complimentary to operations performed by a BS (e.g., BS 110a in the wireless communication network 100). The operations 900 may be implemented as software components that are executed and run on one or more processors (e.g., controller/processor 280 of FIG. 2). Further, the transmission and reception of signals by the UE in the operations 900 may be enabled, for example, by one or more antennas (e.g., antennas 252 of FIG. 2). In certain aspects, the transmission and/or reception of signals by the UE may be implemented via a bus interface of one or more processors (e.g., controller/processor 280) obtaining and/or outputting signals.

The operations 900 may begin, at block 902, where the UE may receive, from a base station (BS), an indication of a maximum number of downlink transmissions on a number of downlink transmission occasions within a time period, wherein feedback processes are enabled for the number of downlink transmission occasions. At block 904, the UE may receive one or more first downlink transmissions from the BS during at least one of the number of downlink transmission occasions. At block 906, the UE may provide feedback to the BS regarding decoding of the one or more first downlink transmissions based on a decoding outcome of the one or more first downlink transmissions.

In certain aspects, the time period is based on a downlink transmission to feedback timing indicator.

In certain aspects, the feedback is encoded into a number of bits less than the number of downlink transmission occasions.

In certain aspects, encoding the feedback comprises: generating a list of all possible feedback vectors for the maximum number of downlink transmissions on the number of downlink transmission occasions within the time period; and mapping all of the possible feedback vectors to bit sequences of a length less than the number of downlink transmission occasions.

In certain aspects, operations 900 also include receiving one or more second downlink transmissions from the BS during at least one downlink transmission occasion within the time period other than the number of downlink transmission occasions; and refraining from providing feedback to the BS regarding decoding of the one or more second downlink transmissions regardless of a decoding outcome of the one or more second downlink transmissions.

In certain aspects, operations 900 also include receiving one or more second downlink transmissions from the BS during at least one downlink transmission occasion within the time period other than the number of downlink transmission occasions; and providing feedback to the BS regarding decoding of the one or more second downlink transmissions based on a decoding outcome of the one or more second downlink transmissions.

In certain aspects, operations 900 also include receiving one or more second downlink transmissions from the BS during at least one downlink transmission occasion within the time period other than the number of downlink transmission occasions; and providing a negative acknowledgement (NACK) to the BS regarding decoding of the one or more second downlink transmissions regardless of a decoding outcome of the one or more second downlink transmissions.

Figure 10:
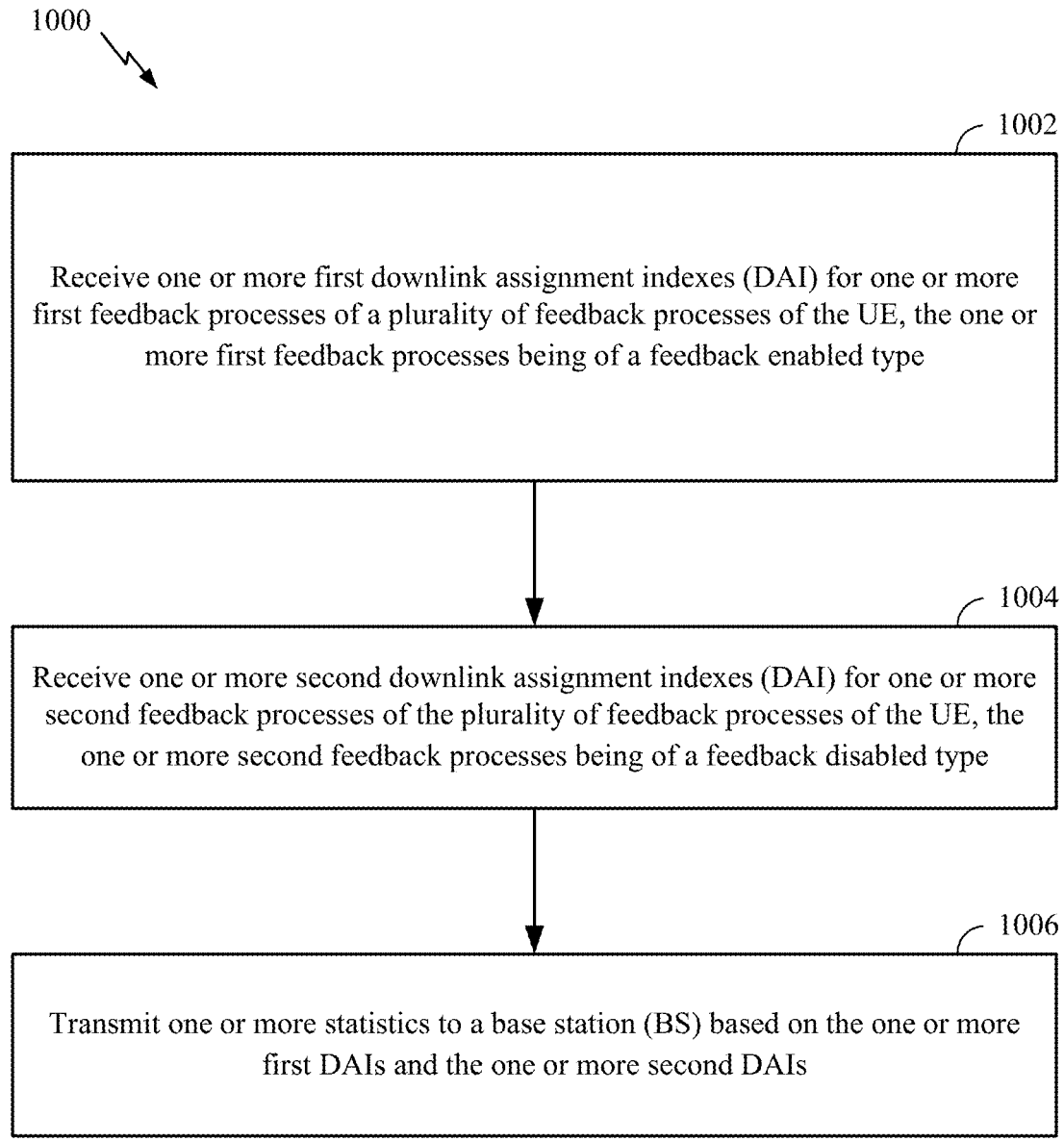
FIG. 10 is a flow diagram illustrating example operations for wireless communication by a network entity, in accordance with certain aspects of the present disclosure.

FIG. 10 is a flow diagram illustrating example operations 1000 for wireless communication, in accordance with certain aspects of the present disclosure. The operations 1000 may be performed, for example, by a UE (e.g., UE 120a in the wireless communication network 100). The operations 1000 may be complimentary to operations performed by a BS (e.g., BS 110a in the wireless communication network 100). The operations 1000 may be implemented as software components that are executed and run on one or more processors (e.g., controller/processor 280 of FIG. 2). Further, the transmission and reception of signals by the UE in the operations 1000 may be enabled, for example, by one or more antennas (e.g., antennas 252 of FIG. 2). In certain aspects, the transmission and/or reception of signals by the UE may be implemented via a bus interface of one or more processors (e.g., controller/processor 280) obtaining and/or outputting signals.

The operations 1000 may begin, at block 1002, where the UE may receive one or more first downlink assignment indexes (DAIs) for one or more first feedback processes of a plurality of feedback processes of the UE, the one or more first feedback processes being of a feedback enabled type. At block 1004, the UE may receive one or more second downlink assignment indexes (DAIs) for one or more second feedback processes of the plurality of feedback processes of the UE, the one or more second feedback processes being of a feedback disabled type. At block 1006, the UE may transmit one or more statistics to a base station (BS) based on the one or more first DAIs and the one or more second DAIs.

In certain aspects, a first set of the one or more first DAIs are received in a first downlink monitoring occasion from one or more serving cells, each of the first set of the one or more first DAIs indicating a first corresponding counter value of a downlink transmission associated with the one or more first feedback processes during the first downlink monitoring occasion and a total number of downlink transmissions in the first downlink monitoring occasion associated with the one or more first feedback processes and any other downlink monitoring occasions associated with the one or more first feedback processes in a time period.

In certain aspects, a second set of the one or more second DAIs are received in the first downlink monitoring occasion from one or more serving cells, each of the second set of the one or more second DAIs indicating a second corresponding counter value of a downlink transmission associated with the one or more second feedback processes during the first downlink monitoring occasion and the total number of downlink transmissions in the first downlink monitoring occasion associated with the one or more second feedback processes and any other downlink monitoring occasions associated with the one or more second feedback processes in the time period.

In certain aspects, the one or more statistics comprise a loss rate of downlink transmissions at the UE.

Figure 11:
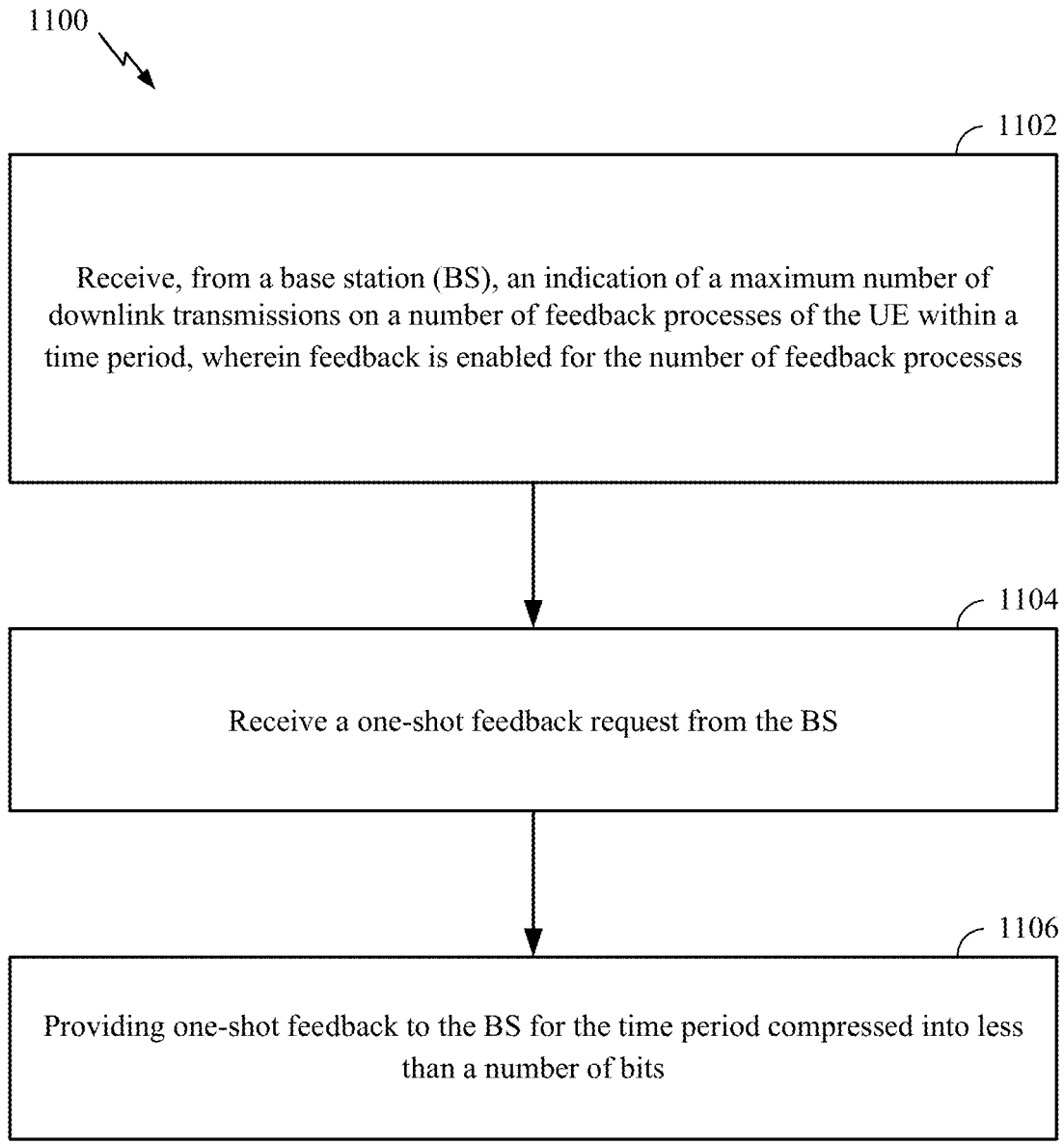
FIG. 11 is a flow diagram illustrating example operations for wireless communication by a network entity, in accordance with certain aspects of the present disclosure.

FIG. 11 is a flow diagram illustrating example operations 1100 for wireless communication, in accordance with certain aspects of the present disclosure. The operations 1100 may be performed, for example, by a UE (e.g., UE 120a in the wireless communication network 100). The operations 1100 may be complimentary to operations performed by a BS (e.g., BS 110a in the wireless communication network 100). The operations 1100 may be implemented as software components that are executed and run on one or more processors (e.g., controller/processor 280 of FIG. 2). Further, the transmission and reception of signals by the UE in the operations 1100 may be enabled, for example, by one or more antennas (e.g., antennas 252 of FIG. 2). In certain aspects, the transmission and/or reception of signals by the UE may be implemented via a bus interface of one or more processors (e.g., controller/processor 280) obtaining and/or outputting signals.

The operations 1100 may begin, at block 1102, where the UE may receive, from a base station (BS), an indication of a maximum number of downlink transmissions on a number of feedback processes of the UE within a time period, wherein feedback is enabled for the number of feedback processes. At block 1104, the UE may receive a one-shot feedback request from the BS. At block 1106, the UE may provide one-shot feedback to the BS for the time period compressed into less than a number of bits.

In certain aspects, the indication is received in one of a radio resource control (RRC) message, a medium access control (MAC) control element (MAC CE), or a downlink control information (DCI).

In certain aspects, the time period is based on a difference between two consecutively received one-shot feedback requests from the BS.

In certain aspects, the time period is indicated in the indication.

In certain aspects, the number of bits is a maximum number of combination of code block groups, transport blocks, feedback processes, and cells for which feedback is provided in the one shot feedback.

In certain aspects, encoding the one-shot feedback comprises: generating a list of all possible feedback vectors for the maximum number of combination of code block groups, transport blocks, feedback processes, and cells for which feedback is provided in the one shot feedback; and mapping all of the possible feedback vectors to bit sequences of a length less than the number of bits.

Figure 12:
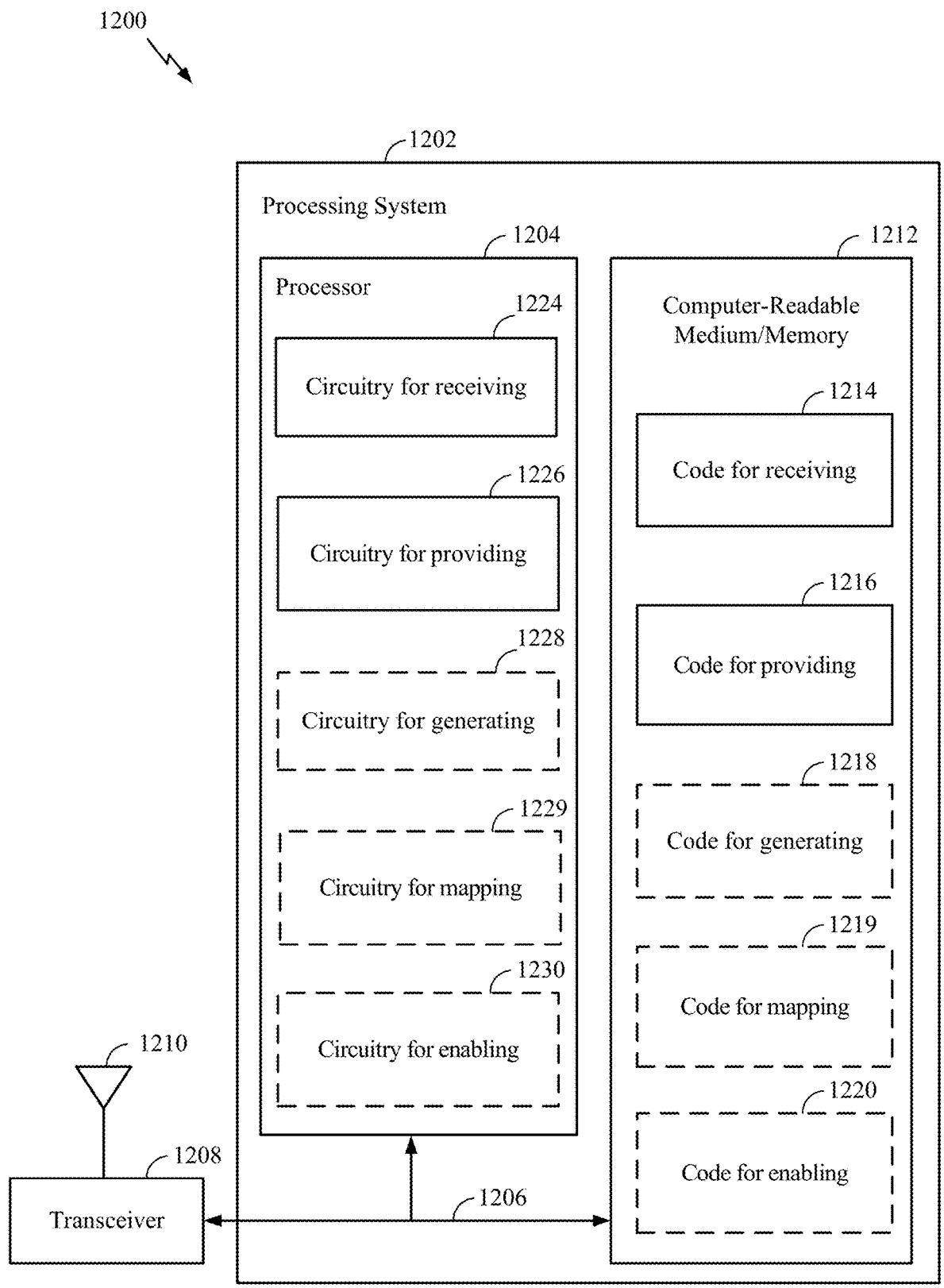
FIG. 12 illustrates a communications device (e.g., a UE) that may include various components configured to perform operations for the techniques disclosed herein in accordance with aspects of the present disclosure.

FIG. 12 illustrates a communications device 1200 (e.g., the UE 120a of FIG. 1) that may include various components (e.g., corresponding to means-plus-function components) configured to perform operations for the techniques disclosed herein, such as the operations illustrated in one or more of FIGS. 7-11. The communications device 1200 includes a processing system 1202 coupled to a transceiver 1208 (e.g., a transmitter and/or a receiver). The transceiver 1208 is configured to transmit and receive signals for the communications device 1200 via an antenna 1210, such as the various signals as described herein. The processing system 1202 may be configured to perform processing functions for the communications device 1200, including processing signals received and/or to be transmitted by the communications device 1200.

The processing system 1202 includes a processor 1204 coupled to a computer-readable medium/memory 1212 via a bus 1206. In certain aspects, the computer-readable medium/memory 1212 is configured to store instructions (e.g., computer-executable code) that when executed by the processor 1204, cause the processor 1204 to perform the operations illustrated in one or more of FIGS. 7-11, or other operations for performing the various techniques discussed herein for HARQ codebook design.

In certain aspects, computer-readable medium/memory 1212 stores code 1214 for one or more of receiving, from a base station (B S), an indication of a default feedback process type for providing feedback to the BS for a plurality of feedback processes of the UE; receiving, from the BS, an indication of a second feedback process type for providing feedback to the BS for one or more feedback processes of the plurality of feedback processes; receiving one or more first downlink transmissions from the BS associated with the one or more feedback processes; receiving one or more second downlink transmissions from the BS associated with at least one feedback process of the plurality of feedback processes other than the one or more feedback processes; and receiving, from the BS, an indication of a second default feedback process type prior to receiving the indication of the default feedback process type, the second default feedback process type for providing feedback to the BS for a plurality of UEs, wherein the second default feedback process type is different than the default feedback process type.

In certain aspects, computer-readable medium/memory 1212 stores the code 1214 for one or more of receiving, from a base station (BS), an indication of a subset of time periods of a plurality of time periods that occur periodically for communication of downlink transmissions, the indication of the subset of time periods indicating that feedback processes are enabled for the subset of time periods; receiving one or more first downlink transmissions from the BS during at least one of the subset of time periods; receiving one or more second downlink transmissions from the BS during at least one of the time periods of the plurality of time periods other than the subset of time periods; receiving one or more second downlink transmissions from the BS during at least one of the time periods of the plurality of time periods other than the subset of time periods; and receiving one or more second downlink transmissions from the BS during at least one of the time periods of the plurality of time periods other than the subset of time periods.

In certain aspects, computer-readable medium/memory 1212 stores the code 1214 for one or more of receiving, from a base station (BS), an indication of a maximum number of downlink transmissions on a number of downlink transmission occasions within a time period, wherein feedback processes are enabled for the number of downlink transmission occasions; receiving one or more second downlink transmissions from the BS during at least one downlink transmission occasion within the time period other than the number of downlink transmission occasions; receiving one or more second downlink transmissions from the BS during at least one downlink transmission occasion within the time period other than the number of downlink transmission occasions; receiving one or more second downlink transmissions from the BS during at least one downlink transmission occasion within the time period other than the number of downlink transmission occasions; and receiving one or more first downlink transmissions from the BS during at least one of the number of downlink transmission occasions.

In certain aspects, computer-readable medium/memory 1212 stores the code 1214 for one or more of receiving one or more first downlink assignment indexes (DAIs) for one or more first feedback processes of a plurality of feedback processes of the UE, the one or more first feedback processes being of a feedback enabled type; and receiving one or more second downlink assignment indexes (DAIs) for one or more second feedback processes of the plurality of feedback processes of the UE, the one or more second feedback processes being of a feedback disabled type.

In certain aspects, computer-readable medium/memory 1212 stores the code 1214 for one or more of receiving, from a base station (BS), an indication of a maximum number of downlink transmissions on a number of feedback processes of the UE within a time period, wherein feedback is enabled for the number of feedback processes; and receiving a one-shot feedback request from the BS.

In certain aspects, computer-readable medium/memory 1212 stores code 1216 for one or more of selectively providing feedback to the BS regarding decoding of the one or more first downlink transmissions according to the second feedback process type; selectively providing feedback to the BS regarding decoding of the one or more second downlink transmissions according to the default feedback process type; transmitting an acknowledgement (ACK) or a negative acknowledgement (NACK) to the BS based on a decoding outcome of the one or more second downlink transmissions; transmitting an acknowledgement (ACK) or a negative acknowledgement (NACK) to the BS based on a decoding outcome of the one or more second downlink transmissions; transmitting a negative acknowledgement (NACK) to the BS regardless of a decoding outcome of the one or more second downlink transmissions; and refraining from providing feedback to the BS regardless of a decoding outcome of the one or more second downlink transmissions.

In certain aspects, computer-readable medium/memory 1212 stores code 1216 for one or more of providing feedback to the BS regarding decoding of the one or more first downlink transmissions based on a decoding outcome of the one or more first downlink transmissions; refraining from providing feedback to the BS regarding decoding of the one or more second downlink transmissions regardless of a decoding outcome of the one or more second downlink transmissions; providing feedback to the BS regarding decoding of the one or more second downlink transmissions based on a decoding outcome of the one or more second downlink transmissions; and providing a negative acknowledgement (NACK) to the BS regarding decoding of the one or more second downlink transmissions regardless of a decoding outcome of the one or more second downlink transmissions.

In certain aspects, computer-readable medium/memory 1212 stores code 1216 for one or more of providing feedback to the BS regarding decoding of the one or more first downlink transmissions based on a decoding outcome of the one or more first downlink transmissions; refraining from providing feedback to the BS regarding decoding of the one or more second downlink transmissions regardless of a decoding outcome of the one or more second downlink transmissions; providing feedback to the BS regarding decoding of the one or more second downlink transmissions based on a decoding outcome of the one or more second downlink transmissions; and providing a negative acknowledgement (NACK) to the BS regarding decoding of the one or more second downlink transmissions regardless of a decoding outcome of the one or more second downlink transmissions.

In certain aspects, computer-readable medium/memory 1212 stores code 1216 for transmitting one or more statistics to a base station (BS) based on the one or more first DAIs and the one or more second DAIs.

In certain aspects, computer-readable medium/memory 1212 stores code 1216 for providing one-shot feedback to the BS for the time period compressed into less than a number of bits.

In certain aspects, computer-readable medium/memory 1212 stores code 1218 for one or more of generating a list of all possible feedback vectors for the maximum number of downlink transmissions on the number of downlink transmission occasions within the time period; and generating a list of all possible feedback vectors for the maximum number of combination of code block groups, transport blocks, feedback processes, and cells for which feedback is provided in the one shot feedback.

In certain aspects, computer-readable medium/memory 1212 stores code 1219 for one or more of mapping all of the possible feedback vectors to bit sequences of a length less than the number of downlink transmission occasions; and mapping all of the possible feedback vectors to bit sequences of a length less than the number of bits.

In certain aspects, computer-readable medium/memory 1212 stores code 1220 for one or more of enabling the feedback processes for the subset of time periods for a time window; enabling the feedback processes for the subset of time periods until the UE receives an indication of an updated subset of time periods of the plurality of time periods.

In certain aspects, the processor 1204 has circuitry 1224 for one or more of receiving, from a base station (BS), an indication of a default feedback process type for providing feedback to the BS for a plurality of feedback processes of the UE; receiving, from the BS, an indication of a second feedback process type for providing feedback to the BS for one or more feedback processes of the plurality of feedback processes; receiving one or more first downlink transmissions from the BS associated with the one or more feedback processes; receiving one or more second downlink transmissions from the BS associated with at least one feedback process of the plurality of feedback processes other than the one or more feedback processes; and receiving, from the BS, an indication of a second default feedback process type prior to receiving the indication of the default feedback process type, the second default feedback process type for providing feedback to the BS for a plurality of UEs, wherein the second default feedback process type is different than the default feedback process type.

In certain aspects, the processor 1204 has circuitry 1224 for one or more of receiving, from a base station (BS), an indication of a subset of time periods of a plurality of time periods that occur periodically for communication of downlink transmissions, the indication of the subset of time periods indicating that feedback processes are enabled for the subset of time periods; receiving one or more first downlink transmissions from the BS during at least one of the subset of time periods; receiving one or more second downlink transmissions from the BS during at least one of the time periods of the plurality of time periods other than the subset of time periods; receiving one or more second downlink transmissions from the BS during at least one of the time periods of the plurality of time periods other than the subset of time periods; and receiving one or more second downlink transmissions from the BS during at least one of the time periods of the plurality of time periods other than the subset of time periods.

In certain aspects, the processor 1204 has circuitry 1224 for one or more of receiving, from a base station (BS), an indication of a maximum number of downlink transmissions on a number of downlink transmission occasions within a time period, wherein feedback processes are enabled for the number of downlink transmission occasions; receiving one or more second downlink transmissions from the BS during at least one downlink transmission occasion within the time period other than the number of downlink transmission occasions; receiving one or more second downlink transmissions from the BS during at least one downlink transmission occasion within the time period other than the number of downlink transmission occasions; receiving one or more second downlink transmissions from the BS during at least one downlink transmission occasion within the time period other than the number of downlink transmission occasions; and receiving one or more first downlink transmissions from the BS during at least one of the number of downlink transmission occasions.

In certain aspects, the processor 1204 has circuitry 1224 for one or more of receiving one or more first downlink assignment indexes (DAIs) for one or more first feedback processes of a plurality of feedback processes of the UE, the one or more first feedback processes being of a feedback enabled type; and receiving one or more second downlink assignment indexes (DAIs) for one or more second feedback processes of the plurality of feedback processes of the UE, the one or more second feedback processes being of a feedback disabled type.

In certain aspects, the processor 1204 has circuitry 1224 for one or more of receiving, from a base station (BS), an indication of a maximum number of downlink transmissions on a number of feedback processes of the UE within a time period, wherein feedback is enabled for the number of feedback processes; and receiving a one-shot feedback request from the BS.

In certain aspects, the processor 1204 has circuitry 1226 for one or more of selectively providing feedback to the BS regarding decoding of the one or more first downlink transmissions according to the second feedback process type; selectively providing feedback to the BS regarding decoding of the one or more second downlink transmissions according to the default feedback process type; transmitting an acknowledgement (ACK) or a negative acknowledgement (NACK) to the BS based on a decoding outcome of the one or more second downlink transmissions; transmitting an acknowledgement (ACK) or a negative acknowledgement (NACK) to the BS based on a decoding outcome of the one or more second downlink transmissions; transmitting a negative acknowledgement (NACK) to the BS regardless of a decoding outcome of the one or more second downlink transmissions; and refraining from providing feedback to the BS regardless of a decoding outcome of the one or more second downlink transmissions.

In certain aspects, the processor 1204 has circuitry 1226 for one or more of providing feedback to the BS regarding decoding of the one or more first downlink transmissions based on a decoding outcome of the one or more first downlink transmissions; refraining from providing feedback to the BS regarding decoding of the one or more second downlink transmissions regardless of a decoding outcome of the one or more second downlink transmissions; providing feedback to the BS regarding decoding of the one or more second downlink transmissions based on a decoding outcome of the one or more second downlink transmissions; and providing a negative acknowledgement (NACK) to the BS regarding decoding of the one or more second downlink transmissions regardless of a decoding outcome of the one or more second downlink transmissions.

In certain aspects, the processor 1204 has circuitry 1226 for one or more of providing feedback to the BS regarding decoding of the one or more first downlink transmissions based on a decoding outcome of the one or more first downlink transmissions; refraining from providing feedback to the BS regarding decoding of the one or more second downlink transmissions regardless of a decoding outcome of the one or more second downlink transmissions; providing feedback to the BS regarding decoding of the one or more second downlink transmissions based on a decoding outcome of the one or more second downlink transmissions; and providing a negative acknowledgement (NACK) to the BS regarding decoding of the one or more second downlink transmissions regardless of a decoding outcome of the one or more second downlink transmissions.

In certain aspects, the processor 1204 has circuitry 1226 for transmitting one or more statistics to a base station (BS) based on the one or more first DAIs and the one or more second DAIs.

In certain aspects, the processor 1204 has circuitry 1226 for providing one-shot feedback to the BS for the time period compressed into less than a number of bits.

In certain aspects, the processor 1204 has circuitry 1228 for one or more of generating a list of all possible feedback vectors for the maximum number of downlink transmissions on the number of downlink transmission occasions within the time period; and generating a list of all possible feedback vectors for the maximum number of combination of code block groups, transport blocks, feedback processes, and cells for which feedback is provided in the one shot feedback.

In certain aspects, the processor 1204 has circuitry 1229 for mapping all of the possible feedback vectors to bit sequences of a length less than the number of downlink transmission occasions; and mapping all of the possible feedback vectors to bit sequences of a length less than the number of bits.

In certain aspects, the processor 1204 has circuitry 1230 for enabling the feedback processes for the subset of time periods for a time window; enabling the feedback processes for the subset of time periods until the UE receives an indication of an updated subset of time periods of the plurality of time periods.

Various components of communications device 1200 may provide means for performing the methods described herein, including with respect to FIGS. 7-11.

In some examples, means for transmitting or sending (or means for providing or outputting for transmission) may include the transceivers 254 and/or antenna(s) 252 of the UE 120*a* illustrated in FIG. 2 and/or transceiver 1208 and antenna 1210 of the communication device 1200 in FIG. 12.

In some examples, means for receiving (or means for obtaining) may include the transceivers 254 and/or antenna(s) 252 of the UE 120*a* illustrated in FIG. 2 and/or transceiver 1208 and antenna 1210 of the communication device 1200 in FIG. 12.

In some examples, means for generating, mapping, enabling, determining, performing, etc., may include various processing system components, such as: the one or more processors 1220 in FIG. 12, or aspects of the UE 120*a* depicted in FIG. 2, including receive processor 258, transmit processor 264, TX MIMO processor 266, and/or controller/processor 280 (including HARQ manager 112).

Notably, FIG. 12 is an example, and many other examples and configurations of communication device 1200 are possible.

Figure 13:
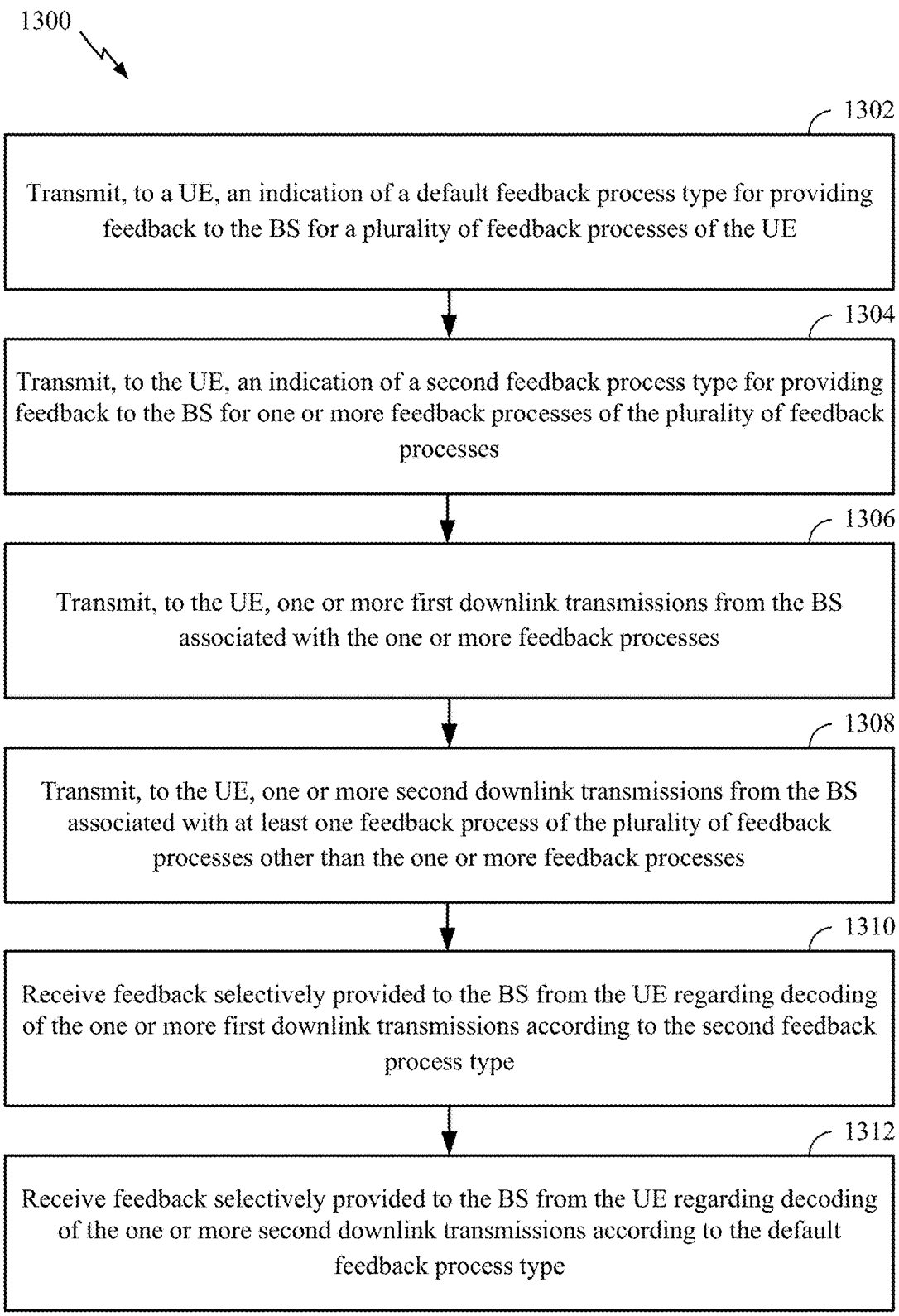
FIG. 13 is a flow diagram illustrating example operations for wireless communication by a network entity, in accordance with certain aspects of the present disclosure.

FIG. 13 is a flow diagram illustrating example operations 1300 for wireless communication, in accordance with certain aspects of the present disclosure. The operations 1300 may be performed, for example, by a BS (e.g., BS 110*a* in the wireless communication network 100). The operations 1300 may be complimentary to operations performed by a UE (e.g., UE 120*a* in the wireless communication network 100). The operations 1300 may be implemented as software components that are executed and run on one or more processors (e.g., controller/processor 240 of FIG. 2). Further, the transmission and reception of signals by the BS in the operations 1300 may be enabled, for example, by one or more antennas (e.g., antennas 234 of FIG. 2). In certain aspects, the transmission and/or reception of signals by the BS may be implemented via a bus interface of one or more processors (e.g., controller/processor 240) obtaining and/or outputting signals.

The operations 1300 may begin, at block 1302, where a BS may transmit, to a UE, an indication of a default feedback process type for providing feedback to the BS for a plurality of feedback processes of the UE. At block 1304, the BS may transmit, to the UE, an indication of a second feedback process type for providing feedback to the BS for one or more feedback processes of the plurality of feedback processes. At block 1306, the BS may transmit, to the UE, one or more first downlink transmissions from the BS associated with the one or more feedback processes. At block 1308, the BS may transmit, to the UE, one or more second downlink transmissions from the BS associated with at least one feedback process of the plurality of feedback processes other than the one or more feedback processes. At block 1310, the BS may receive feedback selectively provided to the BS from the UE regarding decoding of the one or more first downlink transmissions according to the second feedback process type. At block 1312, the BS may receive feedback selectively provided to the BS from the UE regarding decoding of the one or more second downlink transmissions according to the default feedback process type.

Figure 14:
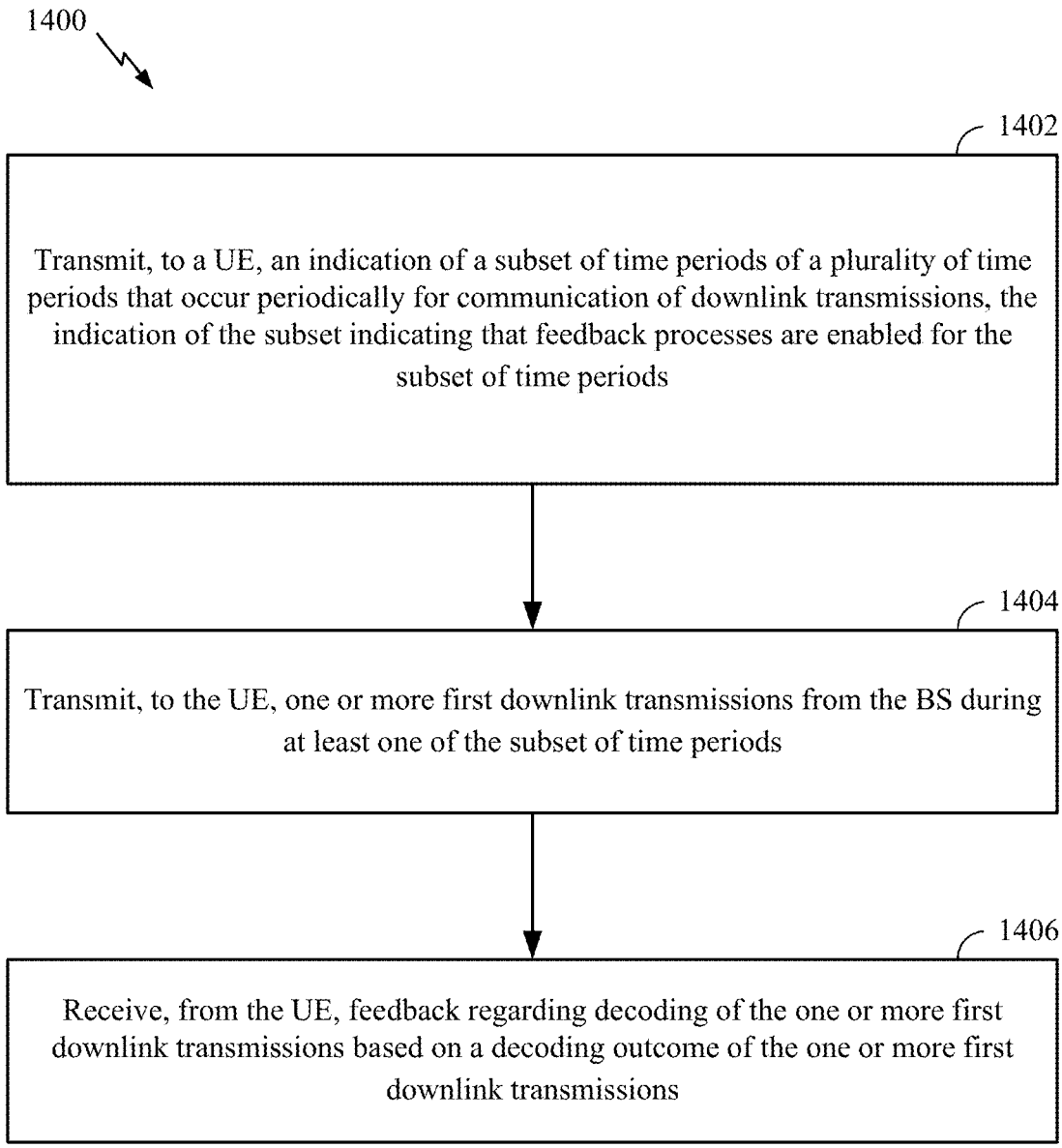
FIG. 14 is a flow diagram illustrating example operations for wireless communication by a network entity, in accordance with certain aspects of the present disclosure.

FIG. 14 is a flow diagram illustrating example operations 1400 for wireless communication, in accordance with certain aspects of the present disclosure. The operations 1400 may be performed, for example, by a BS (e.g., BS 110*a* in the wireless communication network 100). The operations 1400 may be complimentary to operations performed by a UE (e.g., UE 120*a* in the wireless communication network 100). The operations 1400 may be implemented as software components that are executed and run on one or more processors (e.g., controller/processor 240 of FIG. 2). Further, the transmission and reception of signals by the BS in the operations 1400 may be enabled, for example, by one or more antennas (e.g., antennas 234 of FIG. 2). In certain aspects, the transmission and/or reception of signals by the BS may be implemented via a bus interface of one or more processors (e.g., controller/processor 240) obtaining and/or outputting signals.

The operations 1400 may begin, at block 1402, where the BS transmits, to a UE, an indication of a subset of time periods of a plurality of time periods that occur periodically for communication of downlink transmissions, the indication of the subset of time periods indicating that feedback processes are enabled for the subset of time periods. At block 1404, the BS transmits, to the UE, one or more first downlink transmissions from the BS during at least one of the subset of time periods. At block 1406, the BS receives, from the UE, feedback regarding decoding of the one or more first downlink transmissions based on a decoding outcome of the one or more first downlink transmissions.

Figure 15:
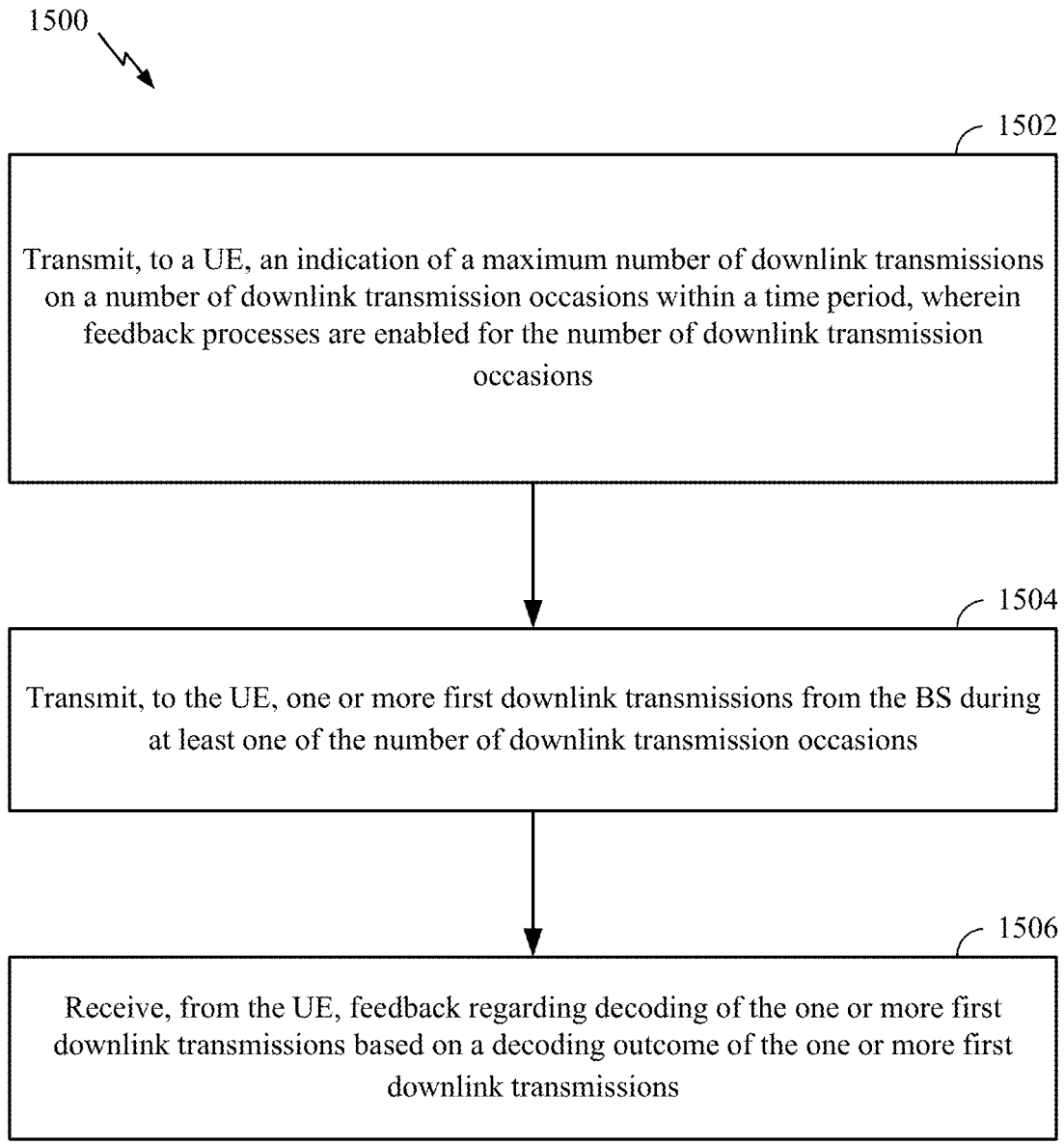
FIG. 15 is a flow diagram illustrating example operations for wireless communication by a network entity, in accordance with certain aspects of the present disclosure.

FIG. 15 is a flow diagram illustrating example operations 1500 for wireless communication, in accordance with certain aspects of the present disclosure. The operations 1500 may be performed, for example, by a BS (e.g., BS 110a in the wireless communication network 100). The operations 1500 may be complimentary to operations performed by a UE (e.g., UE 120a in the wireless communication network 100). The operations 1500 may be implemented as software components that are executed and run on one or more processors (e.g., controller/processor 240 of FIG. 2). Further, the transmission and reception of signals by the BS in the operations 1500 may be enabled, for example, by one or more antennas (e.g., antennas 234 of FIG. 2). In certain aspects, the transmission and/or reception of signals by the BS may be implemented via a bus interface of one or more processors (e.g., controller/processor 240) obtaining and/or outputting signals.

The operations 1500 may begin, at block 1502, where the BS may transmit, to a UE, an indication of a maximum number of downlink transmissions on a number of downlink transmission occasions within a time period, wherein feedback processes are enabled for the number of downlink transmission occasions. At block 1504, the BS transmit, to the UE, one or more first downlink transmissions from the BS during at least one of the number of downlink transmission occasions. At block 1506, the BS may receive, from the UE, feedback regarding decoding of the one or more first downlink transmissions based on a decoding outcome of the one or more first downlink transmissions.

Figure 16:
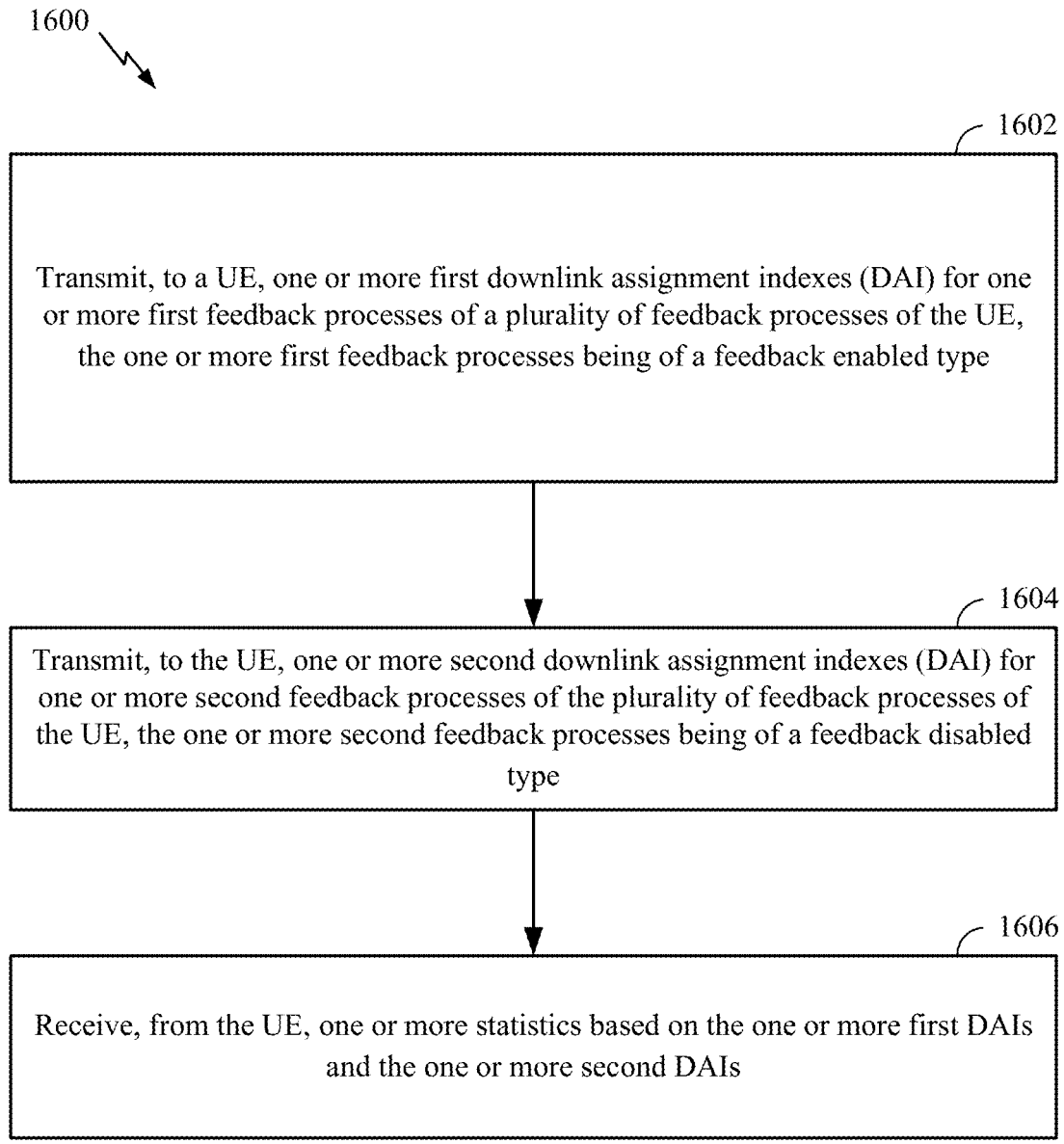
FIG. 16 is a flow diagram illustrating example operations for wireless communication by a network entity, in accordance with certain aspects of the present disclosure.

FIG. 16 is a flow diagram illustrating example operations 1600 for wireless communication, in accordance with certain aspects of the present disclosure. The operations 1600 may be performed, for example, by a BS (e.g., BS 110a in the wireless communication network 100). The operations 1600 may be complimentary to operations performed by a UE (e.g., UE 120a in the wireless communication network 100). The operations 1600 may be implemented as software components that are executed and run on one or more processors (e.g., controller/processor 240 of FIG. 2). Further, the transmission and reception of signals by the BS in the operations 1600 may be enabled, for example, by one or more antennas (e.g., antennas 234 of FIG. 2). In certain aspects, the transmission and/or reception of signals by the BS may be implemented via a bus interface of one or more processors (e.g., controller/processor 240) obtaining and/or outputting signals.

The operations 1600 may begin, at block 1602, where the BS may transmit, to a UE, one or more first downlink assignment indexes (DAIs) for one or more first feedback processes of a plurality of feedback processes of the UE, the one or more first feedback processes being of a feedback enabled type, from a base station (BS), an indication of a maximum number of downlink transmissions on a number of feedback processes of the UE within a time period, wherein feedback is enabled for the number of feedback processes. At block 1604, the BS may transmit, to the UE, one or more second downlink assignment indexes (DAIs) for one or more second feedback processes of the plurality of feedback processes of the UE, the one or more second feedback processes being of a feedback disabled type. At block 1606, the BS may receive, from the UE, one or more statistics based on the one or more first DAIs and the one or more second DAIs.

Figure 17:
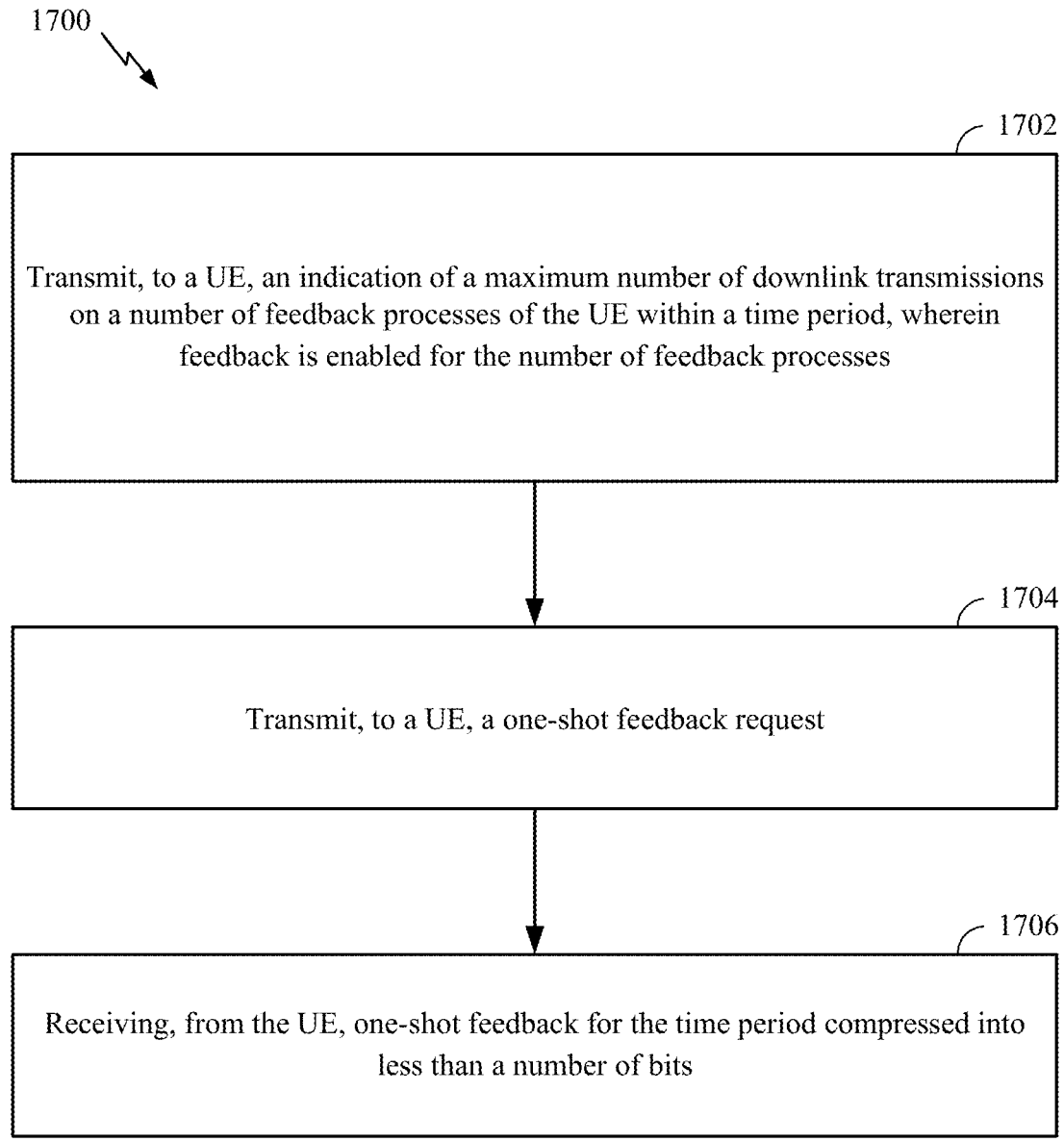
FIG. 17 is a flow diagram illustrating example operations for wireless communication by a network entity, in accordance with certain aspects of the present disclosure.

FIG. 17 is a flow diagram illustrating example operations 1700 for wireless communication, in accordance with certain aspects of the present disclosure. The operations 1700 may be performed, for example, by a BS (e.g., BS 110a in the wireless communication network 100). The operations 1700 may be complimentary to operations performed by a UE (e.g., UE 120a in the wireless communication network 100). The operations 1700 may be implemented as software components that are executed and run on one or more processors (e.g., controller/processor 240 of FIG. 2). Further, the transmission and reception of signals by the BS in the operations 1700 may be enabled, for example, by one or more antennas (e.g., antennas 234 of FIG. 2). In certain aspects, the transmission and/or reception of signals by the BS may be implemented via a bus interface of one or more processors (e.g., controller/processor 240) obtaining and/or outputting signals.

The operations 1700 may begin, at block 1702, where the BS may transmit, to a UE, an indication of a maximum number of downlink transmissions on a number of feedback processes of the UE within a time period, wherein feedback is enabled for the number of feedback processes. At block 1704, the BS may transmit, to a UE, a one-shot feedback request. At block 1706, the BS may receive, from the UE, one-shot feedback for the time period compressed into less than a number of bits.

Figure 18:
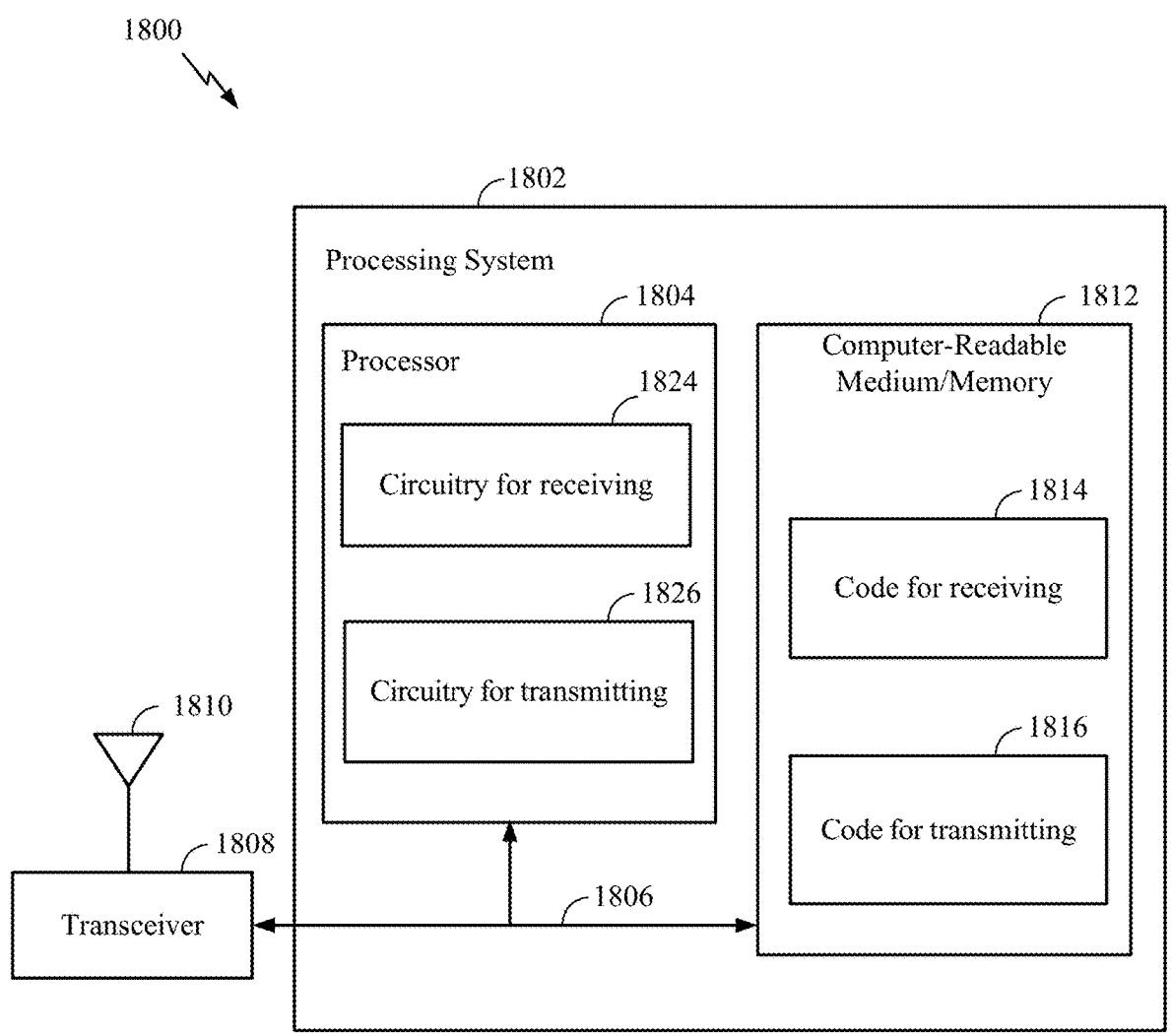
FIG. 18 illustrates a communications device (e.g., a BS) that may include various components configured to perform operations for the techniques disclosed herein in accordance with aspects of the present disclosure.

FIG. 18 illustrates a communications device 1800 (e.g., the BS 110a of FIG. 1) that may include various components (e.g., corresponding to means-plus-function components) configured to perform operations for the techniques disclosed herein, such as the operations illustrated in one or more of FIGS. 13-17. The communications device 1800 includes a processing system 1802 coupled to a transceiver 1808 (e.g., a transmitter and/or a receiver). The transceiver 1808 is configured to transmit and receive signals for the communications device 1800 via an antenna 1810, such as the various signals as described herein. The processing system 1802 may be configured to perform processing functions for the communications device 1800, including processing signals received and/or to be transmitted by the communications device 1800.

The processing system 1802 includes a processor 1804 coupled to a computer-readable medium/memory 1812 via a bus 1806. In certain aspects, the computer-readable medium/memory 1812 is configured to store instructions (e.g., computer-executable code) that when executed by the processor 1804, cause the processor 1804 to perform the operations illustrated in one or more of FIGS. 13-17, or other operations for performing the various techniques discussed herein for HARQ codebook design.

In certain aspects, computer-readable medium/memory 1812 stores code 1814 for receiving feedback selectively provided to the BS from the UE regarding decoding of the one or more first downlink transmissions according to the second feedback process type. Code 1814 may also be for receiving feedback selectively provided to the BS from the UE regarding decoding of the one or more second downlink transmissions according to the default feedback process type. Code 1814 may also be for receiving, from the UE, feedback regarding decoding of the one or more first downlink transmissions based on a decoding outcome of the one or more first downlink transmissions. Code 1814 may also be for receiving, from the UE, feedback regarding decoding of the one or more first downlink transmissions based on a decoding outcome of the one or more first downlink transmissions. Code 1814 may also be for receiving, from the UE, one or more statistics based on the one or more first DAIs and the one or more second DAIs. Code 1814 may also be for receiving, from the UE, one-shot feedback for the time period compressed into less than a number of bits.

In certain aspects, computer-readable medium/memory 1812 stores code 1816 for transmitting, to a UE, an indication of a default feedback process type for providing feedback to the BS for a plurality of feedback processes of the UE. Code 1816 may also be for transmitting, to the UE, an indication of a second feedback process type for providing feedback to the BS for one or more feedback processes of the plurality of feedback processes. Code 1816 may also be for transmitting, to the UE, one or more first downlink transmissions from the BS associated with the one or more feedback processes. Code 1816 may also be for transmitting, to the UE, one or more second downlink transmissions from the BS associated with at least one feedback process of the plurality of feedback processes other than the one or more feedback processes. Code 1816 may also be for transmitting, to a UE, an indication of a subset of time periods of a plurality of time periods that occur periodically for communication of downlink transmissions, the indication of the subset of time periods indicating that feedback processes are enabled for the subset of time periods. Code 1816 may also be for transmitting, to the UE, one or more first downlink transmissions from the BS during at least one of the subset of time periods. Code 1816 may also be for transmitting, to a UE, an indication of a maximum number of downlink transmissions on a number of downlink transmission occasions within a time period, wherein feedback processes are enabled for the number of downlink transmission occasions. Code 1816 may also be for transmitting, to the UE, one or more first downlink transmissions from the BS during at least one of the number of downlink transmission occasions. Code 1816 may also be for transmitting, to a UE, one or more first downlink assignment indexes (DAIs) for one or more first feedback processes of a plurality of feedback processes of the UE, the one or more first feedback processes being of a feedback enabled type. Code 1816 may also be for transmitting, to the UE, one or more second downlink assignment indexes (DAIs) for one or more second feedback processes of the plurality of feedback processes of the UE, the one or more second feedback processes being of a feedback disabled type. Code 1816 may also be for transmitting, to a UE, an indication of a maximum number of downlink transmissions on a number of feedback processes of the UE within a time period, wherein feedback is enabled for the number of feedback processes. Code 1816 may also be for transmitting, to a UE, a one-shot feedback request.

Processor 1804 may include circuitry for performing the processes shown in FIGS. 13-17. For example, processor 1804 may include circuitry 1824 for receiving feedback selectively provided to the BS from the UE regarding decoding of the one or more first downlink transmissions according to the second feedback process type. Circuitry 1824 may also be for receiving feedback selectively provided to the BS from the UE regarding decoding of the one or more second downlink transmissions according to the default feedback process type. Circuitry 1824 may also be for receiving, from the UE, feedback regarding decoding of the one or more first downlink transmissions based on a decoding outcome of the one or more first downlink transmissions. Circuitry 1824 may also be for receiving, from the UE, feedback regarding decoding of the one or more first downlink transmissions based on a decoding outcome of the one or more first downlink transmissions. Circuitry 1824 may also be for receiving, from the UE, one or more statistics based on the one or more first DAIs and the one or more second DAIs. Circuitry 1824 may also be for receiving, from the UE, one-shot feedback for the time period compressed into less than a number of bits Processor 1804 may include circuitry 1826 for transmitting, to a UE, an indication of a default feedback process type for providing feedback to the BS for a plurality of feedback processes of the UE. Circuitry 1826 may also be for transmitting, to the UE, an indication of a second feedback process type for providing feedback to the BS for one or more feedback processes of the plurality of feedback processes. Circuitry 1826 may also be for transmitting, to the UE, one or more first downlink transmissions from the BS associated with the one or more feedback processes. Circuitry 1826 may also be for transmitting, to the UE, one or more second downlink transmissions from the BS associated with at least one feedback process of the plurality of feedback processes other than the one or more feedback processes. Circuitry 1826 may also be for transmitting, to a UE, an indication of a subset of time periods of a plurality of time periods that occur periodically for communication of downlink transmissions, the indication of the subset of time periods indicating that feedback processes are enabled for the subset of time periods. Circuitry 1826 may also be for transmitting, to the UE, one or more first downlink transmissions from the BS during at least one of the subset of time periods. Circuitry 1826 may also be for transmitting, to a UE, an indication of a maximum number of downlink transmissions on a number of downlink transmission occasions within a time period, wherein feedback processes are enabled for the number of downlink transmission occasions. Circuitry 1826 may also be for transmitting, to the UE, one or more first downlink transmissions from the BS during at least one of the number of downlink transmission occasions. Circuitry 1826 may also be for transmitting, to a UE, one or more first downlink assignment indexes (DAIs) for one or more first feedback processes of a plurality of feedback processes of the UE, the one or more first feedback processes being of a feedback enabled type. Circuitry 1826 may also be for transmitting, to the UE, one or more second downlink assignment indexes (DAIs) for one or more second feedback processes of the plurality of feedback processes of the UE, the one or more second feedback processes being of a feedback disabled type. Circuitry 1826 may also be for transmitting, to a UE, an indication of a maximum number of downlink transmissions on a number of feedback processes of the UE within a time period, wherein feedback is enabled for the number of feedback processes. Circuitry 1826 may also be for transmitting, to a UE, a one-shot feedback request.

Various components of communications device 1800 may provide means for performing the methods described herein, including with respect to FIGS. 13-17.

In some examples, means for transmitting or sending (or means for outputting for transmission) may include the transceivers 232 and/or antenna(s) 234 of the BS 110*a* illustrated in FIGS. 1 and 2 and/or transceiver 1808 and antenna 1810 of the communication device 1800 in FIG. 18.

In some examples, means for receiving (or means for obtaining) may include the transceivers 254 and/or antenna(s) 252 of the BS 110*a* illustrated in FIGS. 1 and 2 and/or transceiver 1808 and antenna 1810 of the communication device 1800 in FIG. 18.

In some examples, means for determining, performing, etc., may include various processing system components, such as: the one or more processors 1820 in FIG. 18, or aspects of the BS 110*a* depicted in FIG. 2, including receive processor 238, transmit processor 220, TX MIMO processor 230, and/or controller/processor 240 (including HARQ manager 112).

Notably, FIG. 18 is an example, and many other examples and configurations of communication device 1800 are possible.

Figure 19:
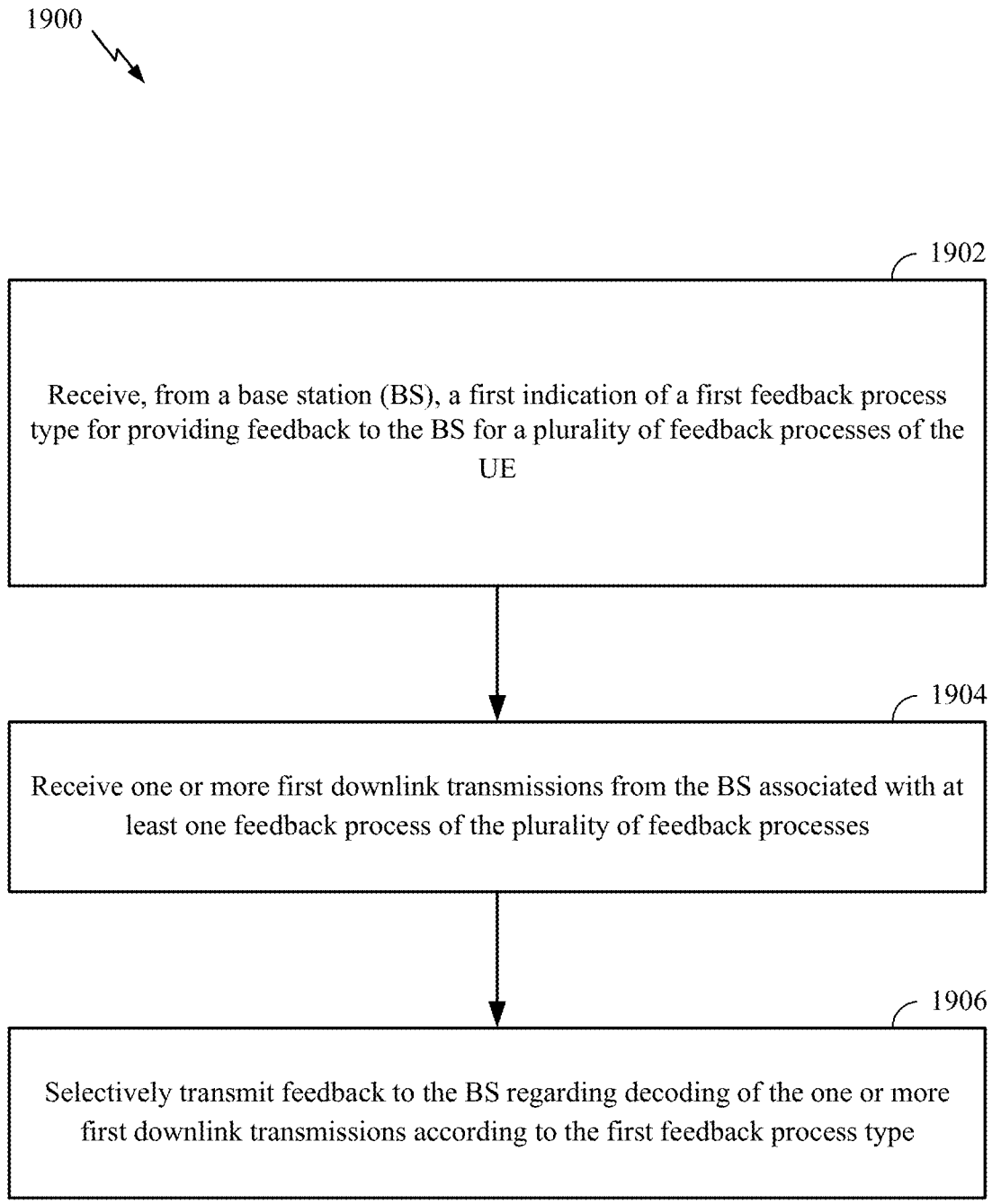
FIG. 19 is a flow diagram illustrating example operations for wireless communication by a network entity, in accordance with certain aspects of the present disclosure.

FIG. 19 is a flow diagram illustrating example operations 1900 for wireless communication, in accordance with certain aspects of the present disclosure. The operations 1900 may be performed, for example, by a UE (e.g., UE 120a in the wireless communication network 100). The operations 1900 may be complimentary to operations performed by a BS (e.g., BS 110a in the wireless communication network 100). The operations 1900 may be implemented as software components that are executed and run on one or more processors (e.g., controller/processor 280 of FIG. 2). Further, the transmission and reception of signals by the UE in the operations 1900 may be enabled, for example, by one or more antennas (e.g., antennas 252 of FIG. 2). In certain aspects, the transmission and/or reception of signals by the UE may be implemented via a bus interface of one or more processors (e.g., controller/processor 280) obtaining and/or outputting signals.

The operations 1900 may begin, at a first block 1902, by receiving, from a base station (BS), a first indication of a first feedback process type for providing feedback to the BS for a plurality of feedback processes of the UE.

At a second block 1904, the operations 1900 may include receiving one or more first downlink transmissions from the BS associated with at least one feedback process of the plurality of feedback processes.

At a third block 1906, the operations 1900 may include selectively transmitting feedback to the BS regarding decoding of the one or more first downlink transmissions according to the first feedback process type.

In certain aspects, the plurality of feedback processes comprise a plurality of hybrid automatic repeat request (HARM) processes.

In certain aspects, the operations 1900 further comprise receiving the first indication of the first feedback process type in one of a radio resource control (RRC) message, a broadcast message, or a system information block (SIB) message.

In certain aspects, the operations 1900 further comprise: receiving, from the BS, a second indication of a second feedback process type for providing feedback to the BS for one or more feedback processes of the plurality of feedback processes other than the at least one feedback process; receiving one or more second downlink transmissions from the BS associated with the one or more feedback processes; and selectively transmitting feedback to the BS regarding decoding of the one or more second downlink transmissions according to the second feedback process type.

In certain aspects, the operations 1900 further comprise receiving the second indication of the second feedback process type in one of a radio resource control (RRC) message, a medium access control (MAC) control element (MAC CE), or a downlink control information (DCI).

In certain aspects, the second indication of the second feedback process type comprises one or more identifiers of the one or more feedback processes.

In certain aspects, the first feedback process type comprises one of a feedback enabled type and a feedback disabled type, and wherein the second feedback process type comprises the other of the feedback enabled type and a feedback disabled type.

In certain aspects, the first feedback process type comprises one of a feedback enabled type and a feedback disabled type.

In certain aspects, the operations 1900 further comprise receiving, from the BS, a second indication of a second feedback process type prior to receiving the first indication of the first feedback process type, the second feedback process type for providing feedback to the BS for a plurality of UEs, wherein the second feedback process type is different than the first feedback process type.

Figure 20:
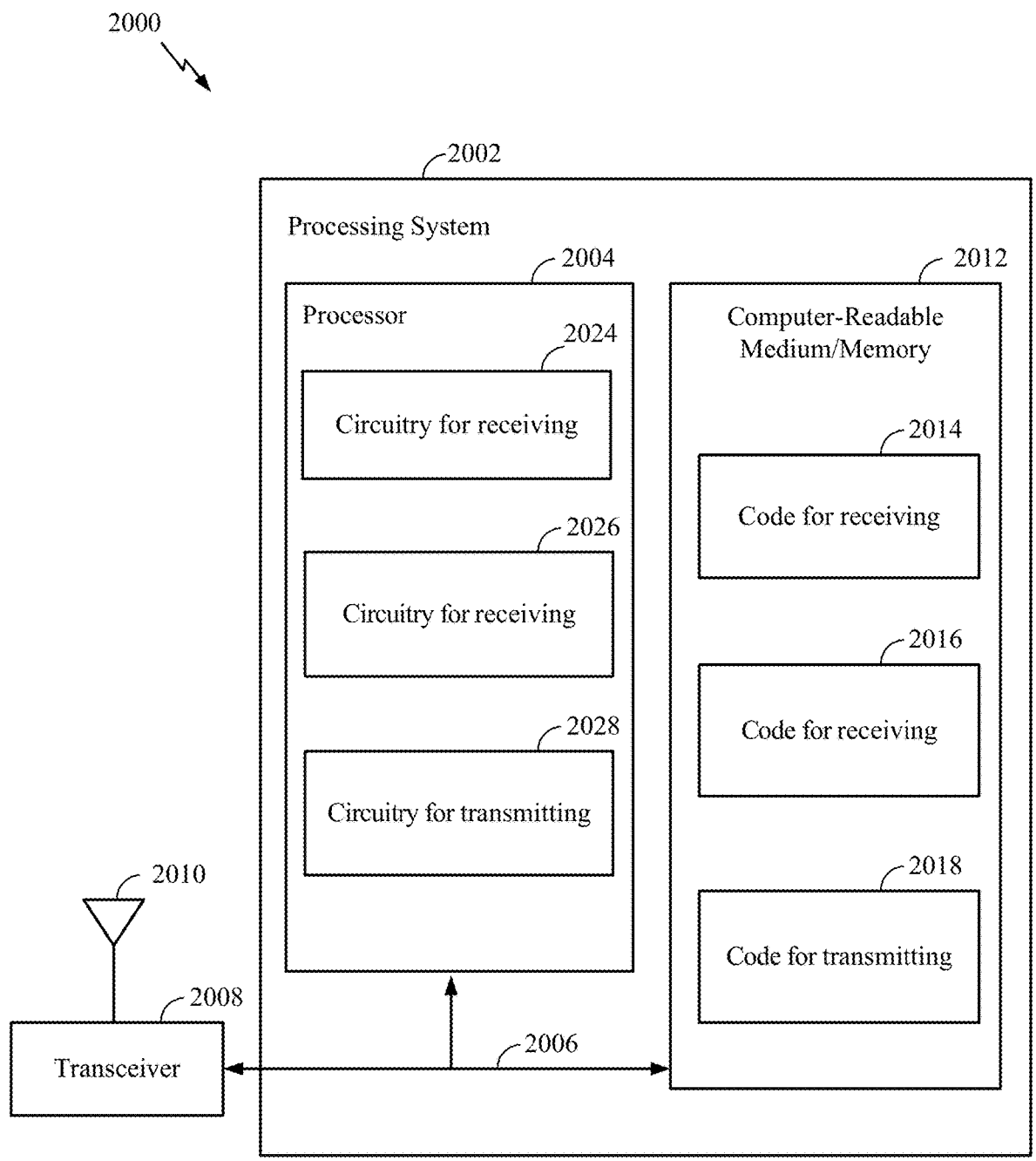
FIG. 20 illustrates a communications device (e.g., a UE) that may include various components configured to perform operations for the techniques disclosed herein in accordance with aspects of the present disclosure.

FIG. 20 illustrates a communications device 2000 (e.g., the UE 120a of FIG. 1) that may include various components (e.g., corresponding to means-plus-function components) configured to perform operations for the techniques disclosed herein, such as the operations illustrated in one or more of FIG. 19. The communications device 2000 includes a processing system 2002 coupled to a transceiver 2008 (e.g., a transmitter and/or a receiver). The transceiver 2008 is configured to transmit and receive signals for the communications device 2000 via an antenna 2010, such as the various signals as described herein. The processing system 2002 may be configured to perform processing functions for the communications device 2000, including processing signals received and/or to be transmitted by the communications device 2000.

The processing system 2002 includes a processor 2004 coupled to a computer-readable medium/memory 2012 via a bus 2006. In certain aspects, the computer-readable medium/memory 2012 is configured to store instructions (e.g., computer-executable code) that when executed by the processor 2004, cause the processor 2004 to perform the operations illustrated in one or more of FIG. 19, or other operations for performing the various techniques discussed herein for HARQ codebook design.

In certain aspects, computer-readable medium/memory 2012 stores code 2014 for receiving, from a base station (BS), a first indication of a first feedback process type for providing feedback to the BS for a plurality of feedback processes of the UE.

In certain aspects, computer-readable medium/memory 2012 stores code 2016 for receiving one or more first downlink transmissions from the BS associated with at least one feedback process of the plurality of feedback processes.

In certain aspects, computer-readable medium/memory 2012 stores code 2018 for selectively transmitting feedback to the BS regarding decoding of the one or more first downlink transmissions according to the first feedback process type.

Processor 2004 may include circuitry for performing the processes shown in FIG. 19. For example, processor 2004 may include circuitry 2024 for receiving, from a base station (BS), a first indication of a first feedback process type for providing feedback to the BS for a plurality of feedback processes of the UE.

Processor 2004 may include circuitry 2026 for receiving one or more first downlink transmissions from the BS associated with at least one feedback process of the plurality of feedback processes.

Processor 2004 may include circuitry 2028 for selectively transmitting feedback to the BS regarding decoding of the one or more first downlink transmissions according to the first feedback process type.

Various components of communications device 2000 may provide means for performing the methods described herein, including with respect to FIG. 19.

In some examples, means for transmitting or sending (or means for outputting for transmission) may include the transceivers 254 and/or antenna(s) 252 of the UE 120a/120b illustrated in FIGS. 1 and 2, and/or transceiver 2008, antenna 2010, and/or circuitry for transmitting 2028 of the communication device 2000 in FIG. 20.

In some examples, means for receiving (or means for obtaining) may include the transceivers 254 and/or antenna(s) 252 of the UE 120a/120b illustrated in FIGS. 1 and 2 and/or transceiver 2008 and antenna 2010 of the communication device 2000 in FIG. 20.

In some examples, means for determining, encoding, decoding, performing, etc., may include various processing system components, such as: the one or more processors 2020 in FIG. 20, or aspects of the UE 120a depicted in FIGS. 1 and 2, including receive processor 258, transmit processor 264, TX MIMO processor 266, and/or controller/processor 280 (including HARQ manager 122).

Notably, FIG. 20 is an example, and many other examples and configurations of communication device 2000 are possible.

Example Aspects

Implementation examples are described in the following numbered aspects:

1: A method for feedback processing performed by a user equipment (UE), includes: receiving, from a base station (BS), an indication of a default feedback process type for providing feedback to the BS for a plurality of feedback processes of the UE; receiving, from the BS, an indication of a second feedback process type for providing feedback to the BS for one or more feedback processes of the plurality of feedback processes; receiving one or more first downlink transmissions from the BS associated with the one or more feedback processes; receiving one or more second downlink transmissions from the BS associated with at least one feedback process of the plurality of feedback processes other than the one or more feedback processes; selectively providing feedback to the BS regarding decoding of the one or more first downlink transmissions according to the second feedback process type; and selectively providing feedback to the BS regarding decoding of the one or more second downlink transmissions according to the default feedback process type.

2: The method of aspect 1, wherein the plurality of feedback processes comprise a plurality of hybrid automatic repeat request (HARM) processes.

3: The method of one or more of aspect 1 and aspect 2, wherein the indication of the default feedback process type is received in one of a radio resource control (RRC) message, a broadcast message, or a system information block (SIB) message.

4: The method of one or more of aspect 1 through aspect 3, wherein the indication of the second feedback process type is received in one of a radio resource control (RRC) message, a medium access control (MAC) control element (MAC CE), or a downlink control information (DCI).

5: The method of one or more of aspect 1 through aspect 4, wherein the indication of the second feedback process type comprises one or more identifiers of the one or more feedback processes.

6: The method of one or more of aspect 1 through aspect 5, wherein the default feedback process type comprises one of a feedback enabled type and a feedback disabled type, and wherein the second feedback process type comprises other of the feedback enabled type and a feedback disabled type.

7: The method of one or more of aspect 1 through aspect 6, wherein the default feedback process type comprises the feedback enabled type, and wherein selectively providing feedback according to the default feedback process type comprises transmitting an acknowledgement (ACK) or a negative acknowledgement (NACK) to the BS based on a decoding outcome of the one or more second downlink transmissions.

8: The method of one or more of aspect 1 through aspect 7, wherein the default feedback process type comprises the feedback disabled type, and wherein selectively providing feedback according to the default feedback process type comprises transmitting an acknowledgement (ACK) or a negative acknowledgement (NACK) to the BS based on a decoding outcome of the one or more second downlink transmissions.

9: The method of one or more of aspect 1 through aspect 8, wherein the default feedback process type comprises the feedback disabled type, and wherein selectively providing feedback according to the default feedback process type comprises transmitting a negative acknowledgement (NACK) to the BS regardless of a decoding outcome of the one or more second downlink transmissions.

10: The method of one or more of aspect 1 through aspect 9, wherein the default feedback process type comprises the feedback disabled type, and wherein selectively providing feedback according to the default feedback process type comprises refraining from providing feedback to the BS regardless of a decoding outcome of the one or more second downlink transmissions.

11: The method of one or more of aspect 1 through aspect 10, further comprising receiving, from the BS, an indication of a second default feedback process type prior to receiving the indication of the default feedback process type, the second default feedback process type for providing feedback to the BS for a plurality of UEs, wherein the second default feedback process type is different than the default feedback process type.

12: A method for feedback processing performed by a user equipment (UE), the method comprising: receiving, from a base station (BS), an indication of a subset of time periods of a plurality of time periods that occur periodically for communication of downlink transmissions, the indication of the subset of time periods indicating that feedback processes are enabled for the subset of time periods; receiving one or more first downlink transmissions from the BS during at least one of the subset of time periods; and providing feedback to the BS regarding decoding of the one or more first downlink transmissions based on a decoding outcome of the one or more first downlink transmissions.

13: The method of aspect 1, wherein each of the plurality of time periods comprises a slot.

14: The method of one or more of aspect 12 and aspect 13, further comprising enabling the feedback processes for the subset of time periods for a time window.

15: The method of one or more of aspect 12 through aspect 14, further comprising enabling the feedback processes for the subset of time periods until the UE receives an indication of an updated subset of time periods of the plurality of time periods.

16: The method of one or more of aspect 12 through aspect 15, further comprising: receiving one or more second downlink transmissions from the BS during at least one of the time periods of the plurality of time periods other than the subset of time periods; and refraining from providing feedback to the BS regarding decoding of the one or more second downlink transmissions regardless of a decoding outcome of the one or more second downlink transmissions.

17: The method of one or more of aspect 12 through aspect 16, further comprising: receiving one or more second downlink transmissions from the BS during at least one of the time periods of the plurality of time periods other than the subset of time periods; and providing feedback to the BS regarding decoding of the one or more second downlink transmissions based on a decoding outcome of the one or more second downlink transmissions.

18: The method of one or more of aspect 12 through aspect 17, further comprising: receiving one or more second downlink transmissions from the BS during at least one of the time periods of the plurality of time periods other than the subset of time periods; and providing a negative acknowledgement (NACK) to the BS regarding decoding of the one or more second downlink transmissions regardless of a decoding outcome of the one or more second downlink transmissions.

19: A method for feedback processing performed by a user equipment (UE), the method comprising: receiving, from a base station (BS), an indication of a maximum number of downlink transmissions on a number of downlink transmission occasions within a time period, wherein feedback processes are enabled for the number of downlink transmission occasions; receiving one or more first downlink transmissions from the BS during at least one of the number of downlink transmission occasions; and providing feedback to the BS regarding decoding of the one or more first downlink transmissions based on a decoding outcome of the one or more first downlink transmissions.

20: The method of aspect 19, wherein the time period is based on a downlink transmission to feedback timing indicator.

21: The method of one or more of aspect 19 and aspect 20, wherein the feedback is encoded into a number of bits less than the number of downlink transmission occasions.

22: The method of one or more of aspect 19 through aspect 21, wherein encoding the feedback comprises: generating a list of all possible feedback vectors for the maximum number of downlink transmissions on the number of downlink transmission occasions within the time period; and mapping all of the possible feedback vectors to bit sequences of a length less than the number of downlink transmission occasions.

23: The method of one or more of aspect 19 through aspect 22, further comprising receiving one or more second downlink transmissions from the BS during at least one downlink transmission occasion within the time period other than the number of downlink transmission occasions; and refraining from providing feedback to the BS regarding decoding of the one or more second downlink transmissions regardless of a decoding outcome of the one or more second downlink transmissions.

24: The method of one or more of aspect 19 through aspect 23, further comprising: receiving one or more second downlink transmissions from the BS during at least one downlink transmission occasion within the time period other than the number of downlink transmission occasions; and providing feedback to the BS regarding decoding of the one or more second downlink transmissions based on a decoding outcome of the one or more second downlink transmissions.

25: The method of one or more of aspect 19 through aspect 24, further comprising: receiving one or more second downlink transmissions from the BS during at least one downlink transmission occasion within the time period other than the number of downlink transmission occasions; and providing a negative acknowledgement (NACK) to the BS regarding decoding of the one or more second downlink transmissions regardless of a decoding outcome of the one or more second downlink transmissions.

26: A method for feedback processing performed by a user equipment (UE), the method comprising: receiving one or more first downlink assignment indexes (DAIs) for one or more first feedback processes of a plurality of feedback processes of the UE, the one or more first feedback processes being of a feedback enabled type; receiving one or more second downlink assignment indexes (DAIs) for one or more second feedback processes of the plurality of feedback processes of the UE, the one or more second feedback processes being of a feedback disabled type; and transmitting one or more statistics to a base station (BS) based on the one or more first DAIs and the one or more second DAIs.

27: The method of aspect 26, wherein a first set of the one or more first DAIs are received in a first downlink monitoring occasion from one or more serving cells, each of the first set of the one or more first DAIs indicating a first corresponding counter value of a downlink transmission associated with the one or more first feedback processes during the first downlink monitoring occasion and a total number of downlink transmissions in the first downlink monitoring occasion associated with the one or more first feedback processes and any other downlink monitoring occasions associated with the one or more first feedback processes in a time period.

28: The method of one or more of aspect 26 and aspect 27, wherein a second set of the one or more second DAIs are received in the first downlink monitoring occasion from one or more serving cells, each of the second set of the one or more second DAIs indicating a second corresponding counter value of a downlink transmission associated with the one or more second feedback processes during the first downlink monitoring occasion and the total number of downlink transmissions in the first downlink monitoring occasion associated with the one or more second feedback processes and any other downlink monitoring occasions associated with the one or more second feedback processes in the time period.

29: The method of one or more of aspect 26 through aspect 28, wherein the one or more statistics comprise a loss rate of downlink transmissions at the UE.

30: A method for feedback processing performed by a user equipment (UE), the method comprising: receiving, from a base station (BS), an indication of a maximum number of downlink transmissions on a number of feedback processes of the UE within a time period, wherein feedback is enabled for the number of feedback processes; receiving a one-shot feedback request from the BS; and providing one-shot feedback to the BS for the time period compressed into less than a number of bits.

31: The method of aspect 30, wherein the indication is received in one of a radio resource control (RRC) message, a medium access control (MAC) control element (MAC CE), or a downlink control information (DCI).

32: The method of one or more of aspect 30 and aspect 31, wherein the time period is based on a difference between two consecutively received one-shot feedback requests from the BS.

33: The method of one or more of aspect 30 through aspect 32, wherein the time period is indicated in the indication.

34: The method of one or more of aspect 30 through aspect 33, wherein the number of bits is a maximum number of combination of code block groups, transport blocks, feedback processes, and cells for which feedback is provided in the one shot feedback.

35: The method of one or more of aspect 30 through aspect 34, wherein encoding the one-shot feedback comprises: generating a list of all possible feedback vectors for the maximum number of combination of code block groups, transport blocks, feedback processes, and cells for which feedback is provided in the one shot feedback; and mapping all of the possible feedback vectors to bit sequences of a length less than the number of bits.

36: A method for a base station to perform a method complimentary to one or more of the methods of aspect 1 through aspect 35.

37: A base station comprising means for performing a method complimentary to one or more of the methods of aspect 1 through aspect 35.

38: A base station for wireless communications, comprising a memory and a processor coupled to the memory, the memory and the processor configured to perform a method complimentary to one or more of the methods of aspect 1 through aspect 35.

39: A computer-readable medium, the computer-readable medium including instructions that, when executed by at least one processor of a base station, cause the at least one processor to perform a method complimentary to one or more of the methods of aspect 1 through aspect 35.

40. A user equipment (UE) configured for feedback processing, comprising: a memory; and a processor coupled to the memory, the processor and the memory configured to: receive, from a base station (BS), a first indication of a first feedback process type for providing feedback to the BS for a plurality of feedback processes of the UE; receive one or more first downlink transmissions from the BS associated with at least one feedback process of the plurality of feedback processes; and transmit feedback or withhold transmission of feedback to the BS regarding decoding of the one or more first downlink transmissions according to the first feedback process type.

41. The UE of aspect 40, wherein the plurality of feedback processes comprise a plurality of hybrid automatic repeat request (HARM) processes.

42. The UE of one or more of aspect 40 and aspect 41, wherein the processor and the memory are further configured to receive, from the BS, a second indication of a second feedback process type for providing feedback to the BS for one or more feedback processes of the plurality of feedback processes other than the at least one feedback process; receive one or more second downlink transmissions from the BS associated with the one or more feedback processes; and transmit feedback or withhold transmission of feedback to the BS regarding decoding of the one or more second downlink transmissions according to the second feedback process type.

43. The UE of one or more of aspect 40 through aspect 42, wherein the processor and the memory are further configured to: receive the first indication of the first feedback process type in one of a radio resource control (RRC) message, a broadcast message, or a system information block (SIB) message; and receive the second indication of the second feedback process type in one of a RRC message, a medium access control (MAC) control element (MAC CE), or a downlink control information (DCI).

44. The UE of one or more of aspect 40 through aspect 43, wherein the second indication of the second feedback process type comprises one or more identifiers of the one or more feedback processes.

45. The UE of one or more of aspect 40 through aspect 44, wherein the first feedback process type comprises one of a feedback enabled type and a feedback disabled type, and wherein the second feedback process type comprises the other of the feedback enabled type and a feedback disabled type.

46. The UE of one or more of aspect 40 through aspect 45, wherein the first feedback process type comprises one of a feedback enabled type and a feedback disabled type.

47. The UE of one or more of aspect 40 through aspect 46, wherein the first feedback process type comprises the feedback enabled type, and wherein the processor and the memory, being configured to transmit feedback or withhold transmission of feedback according to the first feedback process type, are configured to transmit an acknowledgement (ACK) or a negative acknowledgement (NACK) to the BS based on a decoding outcome of the one or more first downlink transmissions.

48. The UE of one or more of aspect 40 through aspect 47, wherein the first feedback process type comprises the feedback disabled type, and wherein the processor and the memory, being configured to transmit feedback or withhold transmission of feedback according to the first feedback process type, are configured to transmit an acknowledgement (ACK) or a negative acknowledgement (NACK) to the BS based on a decoding outcome of the one or more first downlink transmissions.

49. The UE of one or more of aspect 40 through aspect 48, wherein the first feedback process type comprises the feedback disabled type, and wherein the processor and the memory, being configured to transmit feedback or withhold transmission of feedback according to the first feedback process type, are configured to transmit a negative acknowledgement (NACK) to the BS regardless of a decoding outcome of the one or more first downlink transmissions.

50. The UE of one or more of aspect 40 through aspect 49, wherein the first feedback process type comprises the feedback disabled type, and wherein the processor and the memory, being configured to transmit feedback or withhold transmission of feedback according to the first feedback process type, are configured to refrain from transmitting feedback to the BS regardless of a decoding outcome of the one or more first downlink transmissions.

51. The UE of one or more of aspect 40 through aspect 50, wherein the processor and the memory are further configured to receive, from the BS, a second indication of a second feedback process type prior to receiving the first indication of the first feedback process type, the second feedback process type for providing feedback to the BS for a plurality of UEs, wherein the second feedback process type is different than the first feedback process type.

52. A user equipment (UE) configured for feedback processing, the UE comprising: a memory; and a processor coupled to the memory, the processor and the memory configured to: receive, from a base station (BS), a first indication of a subset of time periods of a plurality of time periods that occur periodically for communication of downlink transmissions, the first indication of the subset of time periods indicating that feedback processes are enabled for the subset of time periods; receive one or more first downlink transmissions from the BS during at least one of the subset of time periods; and transmit feedback to the BS regarding decoding of the one or more first downlink transmissions based on a decoding outcome of the one or more first downlink transmissions.

53. The UE of aspect 52, wherein each of the plurality of time periods comprises a slot.

54. The UE of one or more of aspect 52 and aspect 53, wherein the processor and the memory are further configured to enable the feedback processes for the subset of time periods for a time window.

55. The UE of one or more of aspect 52 through aspect 54, wherein the processor and the memory are further configured to enable the feedback processes for the subset of time periods until the UE receives a second indication of an updated subset of time periods of the plurality of time periods.

56. The UE of one or more of aspect 52 through aspect 55, wherein the processor and the memory are further configured to: receive one or more second downlink transmissions from the BS during at least one of the time periods of the plurality of time periods other than the subset of time periods; and refrain from transmitting feedback to the BS regarding decoding of the one or more second downlink transmissions regardless of a decoding outcome of the one or more second downlink transmissions.

57. The UE of one or more of aspect 52 through aspect 56, wherein the processor and the memory are further configured to: receive one or more second downlink transmissions from the BS during at least one of the time periods of the plurality of time periods other than the subset of time periods; and transmit feedback to the BS regarding decoding of the one or more second downlink transmissions based on a decoding outcome of the one or more second downlink transmissions.

58. The UE of one or more of aspect 52 through aspect 57, wherein the processor and the memory are further configured to: receive one or more second downlink transmissions from the BS during at least one of the time periods of the plurality of time periods other than the subset of time periods; and transmit a negative acknowledgement (NACK) to the BS regarding decoding of the one or more second downlink transmissions regardless of a decoding outcome of the one or more second downlink transmissions.

59. A user equipment (UE) configured for feedback processing, comprising: a memory; and a processor coupled to the memory, the processor and the memory configured to: receive, from a base station (BS), an indication of a maximum number of downlink transmissions on a number of downlink transmission occasions within a time period, wherein feedback processes for the number of downlink transmission occasions are feedback enabled type processes; receive one or more first downlink transmissions from the BS during at least one of the number of downlink transmission occasions; and transmit feedback to the BS regarding decoding of the one or more first downlink transmissions based on a decoding outcome of the one or more first downlink transmissions.

60. The UE of aspect 59, wherein the time period is based on a downlink transmission to feedback timing indicator.

61. The UE of one or more of aspect 59 and aspect 60, wherein the feedback is encoded into a number of bits less than the number of downlink transmission occasions.

62. The UE of one or more of aspect 59 through aspect 61, wherein the processor and the memory, being configured to encode the feedback, are further configured to: generate a list of all possible feedback vectors for the maximum number of downlink transmissions on the number of downlink transmission occasions within the time period; and map all of the possible feedback vectors to bit sequences of a length less than the number of downlink transmission occasions.

63. The UE of one or more of aspect 59 through aspect 62, wherein the processor and the memory are further configured to: receive one or more second downlink transmissions from the BS during at least one downlink transmission occasion within the time period other than the number of downlink transmission occasions; and refrain from transmitting feedback to the BS regarding decoding of the one or more second downlink transmissions regardless of a decoding outcome of the one or more second downlink transmissions.

64. The UE of one or more of aspect 59 through aspect 63, wherein the processor and the memory are further configured to: receive one or more second downlink transmissions from the BS during at least one downlink transmission occasion within the time period other than the number of downlink transmission occasions; and transmit feedback to the BS regarding decoding of the one or more second downlink transmissions based on a decoding outcome of the one or more second downlink transmissions.

65. The UE of one or more of aspect 59 through aspect 64, wherein the processor and the memory are further configured to: receive one or more second downlink transmissions from the BS during at least one downlink transmission occasion within the time period other than the number of downlink transmission occasions; and transmit a negative acknowledgement (NACK) to the BS regarding decoding of the one or more second downlink transmissions regardless of a decoding outcome of the one or more second downlink transmissions.

66. A user equipment (UE) configured for feedback processing, comprising: a memory; and a processor coupled to the memory, the processor and the memory configured to: receive one or more first downlink assignment indexes (DAIs) for one or more first feedback processes of a plurality of feedback processes of the UE, the one or more first feedback processes being of a feedback enabled type; receive one or more second downlink assignment indexes (DAIs) for one or more second feedback processes of the plurality of feedback processes of the UE, the one or more second feedback processes being of a feedback disabled type; and transmit one or more statistics to a base station (BS) based on the one or more first DAIs and the one or more second DAIs.

67. The UE of aspect 66, wherein a first set of the one or more first DAIs are received in a first downlink monitoring occasion from one or more serving cells, each of the first set of the one or more first DAIs indicating a first corresponding counter value of a downlink transmission associated with the one or more first feedback processes during the first downlink monitoring occasion and a total number of downlink transmissions in the first downlink monitoring occasion associated with the one or more first feedback processes and any other downlink monitoring occasions associated with the one or more first feedback processes in a time period.

68. The UE of one or more of aspect 66 and aspect 67, wherein a second set of the one or more second DAIs are received in the first downlink monitoring occasion from one or more serving cells, each of the second set of the one or more second DAIs indicating a second corresponding counter value of a downlink transmission associated with the one or more second feedback processes during the first downlink monitoring occasion and the total number of downlink transmissions in the first downlink monitoring occasion associated with the one or more second feedback processes and any other downlink monitoring occasions associated with the one or more second feedback processes in the time period.

69. The UE of one or more of aspect 66 through aspect 68, wherein the one or more statistics comprise a loss rate of downlink transmissions at the UE.

70. A method for wireless communication by a user equipment (UE), comprising: receiving, from a base station (BS), a first indication of a first feedback process type for providing feedback to the BS for a plurality of feedback processes of the UE; receiving one or more first downlink transmissions from the BS associated with at least one feedback process of the plurality of feedback processes; and selectively transmitting feedback to the BS regarding decoding of the one or more first downlink transmissions according to the first feedback process type.

71. The method of aspect 70, wherein the plurality of feedback processes comprise a plurality of hybrid automatic repeat request (HARD) processes.

72. The method of one or more of aspect 70 and aspect 71, further comprising: receiving, from the BS, a second indication of a second feedback process type for providing feedback to the BS for one or more feedback processes of the plurality of feedback processes other than the at least one feedback process; receiving one or more second downlink transmissions from the BS associated with the one or more feedback processes; and selectively transmitting feedback to the BS regarding decoding of the one or more second downlink transmissions according to the second feedback process type.

73. The method of one or more of aspect 70 through aspect 72, further comprising: receiving the first indication of the first feedback process type in one of a radio resource control (RRC) message, a broadcast message, or a system information block (SIB) message; and receiving the second indication of the second feedback process type in one of a RRC message, a medium access control (MAC) control element (MAC CE), or a downlink control information (DCI).

74. The method of one or more of aspect 70 through aspect 73, wherein the second indication of the second feedback process type comprises one or more identifiers of the one or more feedback processes.

75. The method of one or more of aspect 70 through aspect 74, wherein the first feedback process type comprises one of a feedback enabled type and a feedback disabled type, and wherein the second feedback process type comprises the other of the feedback enabled type and a feedback disabled type.

76. The method of one or more of aspect 70 through aspect 75, wherein the first feedback process type comprises one of a feedback enabled type and a feedback disabled type.

77. The method of one or more of aspect 70 through aspect 76, wherein the first feedback process type comprises the feedback enabled type, and wherein the method further comprises transmitting an acknowledgement (ACK) or a negative acknowledgement (NACK) to the BS based on a decoding outcome of the one or more first downlink transmissions.

78. The method of one or more of aspect 70 through aspect 77, wherein the first feedback process type comprises the feedback disabled type, and wherein the method further comprises transmitting an acknowledgement (ACK) or a negative acknowledgement (NACK) to the BS based on a decoding outcome of the one or more first downlink transmissions.

79. The method of one or more of aspect 70 through aspect 78, wherein the first feedback process type comprises the feedback disabled type, and wherein the method further comprises transmitting a negative acknowledgement (NACK) to the BS regardless of a decoding outcome of the one or more first downlink transmissions.

80. The method of one or more of aspect 70 through aspect 79, wherein the first feedback process type comprises the feedback disabled type, and wherein the method further comprises refraining from transmitting feedback to the BS regardless of a decoding outcome of the one or more first downlink transmissions.

81. The method of one or more of aspect 70 through aspect 80, wherein method further comprises receiving, from the BS, a second indication of a second feedback process type prior to receiving the first indication of the first feedback process type, the second feedback process type for providing feedback to the BS for a plurality of UEs, wherein the second feedback process type is different than the first feedback process type.

82. A user equipment (UE) comprising: a memory; and a processor coupled to the memory, the processor and memory being configured to perform the method of any of claims 70-81.

83. A user equipment (UE) comprising: one or more means for performing the method of any of claims 70-81.

84. A non-transitory computer-readable storage medium having instructions stored thereon for performing the method of any of claims 70-81 for wireless communication by a user equipment (UE).

85. A method for feedback processing performed by a user equipment (UE), the method comprising: receiving, from a base station (BS), a first indication of a subset of time periods of a plurality of time periods that occur periodically for communication of downlink transmissions, the first indication of the subset of time periods indicating that feedback processes are enabled for the subset of time periods; receiving one or more first downlink transmissions from the BS during at least one of the subset of time periods; and transmitting feedback to the BS regarding decoding of the one or more first downlink transmissions based on a decoding outcome of the one or more first downlink transmissions.

86. The method of aspect 85, wherein each of the plurality of time periods comprises a slot.

87. The method of one or more of aspect 85 and aspect 86, further comprising enabling the feedback processes for the subset of time periods for a time window.

88. The method of one or more of aspect 85 through aspect 87, further comprising enabling the feedback processes for the subset of time periods until the UE receives a second indication of an updated subset of time periods of the plurality of time periods.

89. The method of one or more of aspect 85 through aspect 88, further comprising: receiving one or more second downlink transmissions from the BS during at least one of the time periods of the plurality of time periods other than the subset of time periods; and refraining from transmitting feedback to the BS regarding decoding of the one or more second downlink transmissions regardless of a decoding outcome of the one or more second downlink transmissions.

90. The method of one or more of aspect 85 through aspect 89, further comprising: receiving one or more second downlink transmissions from the BS during at least one of the time periods of the plurality of time periods other than the subset of time periods; and transmitting feedback to the BS regarding decoding of the one or more second downlink transmissions based on a decoding outcome of the one or more second downlink transmissions.

91. The method of one or more of aspect 85 through aspect 90, further comprising: receiving one or more second downlink transmissions from the BS during at least one of the time periods of the plurality of time periods other than the subset of time periods; and transmitting a negative acknowledgement (NACK) to the BS regarding decoding of the one or more second downlink transmissions regardless of a decoding outcome of the one or more second downlink transmissions.

92. A user equipment (UE) comprising: a memory; and a processor coupled to the memory, the processor and memory being configured to perform the method of any of aspects 85 through 91.

93. A user equipment (UE) comprising: one or more means for performing the method of any of aspects 85 through 91.

94. A non-transitory computer-readable storage medium having instructions stored thereon for performing the method of any of aspects 85-91 for wireless communication by a user equipment (UE).

95. A method for feedback processing performed by a user equipment (UE), the method comprising: receiving, from a base station (BS), an indication of a maximum number of downlink transmissions on a number of downlink transmission occasions within a time period, wherein feedback processes for the number of downlink transmission occasions are feedback enabled type processes; receiving one or more first downlink transmissions from the BS during at least one of the number of downlink transmission occasions; and transmitting feedback to the BS regarding decoding of the one or more first downlink transmissions based on a decoding outcome of the one or more first downlink transmissions.

96. The method of aspect 95, wherein the time period is based on a downlink transmission to feedback timing indicator.

97. The method of one or more of aspects 95 and 96, wherein the feedback is encoded into a number of bits less than the number of downlink transmission occasions.

98. The method of one or more of aspects 95 through 97, further comprising: generating a list of all possible feedback vectors for the maximum number of downlink transmissions on the number of downlink transmission occasions within the time period; and mapping all of the possible feedback vectors to bit sequences of a length less than the number of downlink transmission occasions.

99. The method of one or more of aspects 95 through 98, further comprising: receiving one or more second downlink transmissions from the BS during at least one downlink transmission occasion within the time period other than the number of downlink transmission occasions; and refraining from transmitting feedback to the BS regarding decoding of the one or more second downlink transmissions regardless of a decoding outcome of the one or more second downlink transmissions.

100. The method of one or more of aspects 95 through 99, further comprising: receiving one or more second downlink transmissions from the BS during at least one downlink transmission occasion within the time period other than the number of downlink transmission occasions; and transmitting feedback to the BS regarding decoding of the one or more second downlink transmissions based on a decoding outcome of the one or more second downlink transmissions.

101. The method of one or more of aspects 95 through 100, further comprising: receiving one or more second downlink transmissions from the BS during at least one downlink transmission occasion within the time period other than the number of downlink transmission occasions; and transmitting a negative acknowledgement (NACK) to the BS regarding decoding of the one or more second downlink transmissions regardless of a decoding outcome of the one or more second downlink transmissions.

102. A user equipment (UE) comprising: a memory; and a processor coupled to the memory, the processor and memory being configured to perform the method of any of aspects 95-101.

103. A user equipment (UE) comprising: one or more means for performing the method of any of aspects 95-101.

104. A non-transitory computer-readable storage medium having instructions stored thereon for performing the method of any of aspects 95-101 for wireless communication by a user equipment (UE).

105. A method for feedback processing performed by a user equipment (UE), the method comprising: receiving one or more first downlink assignment indexes (DAIs) for one or more first feedback processes of a plurality of feedback processes of the UE, the one or more first feedback processes being of a feedback enabled type; receiving one or more second downlink assignment indexes (DAIs) for one or more second feedback processes of the plurality of feedback processes of the UE, the one or more second feedback processes being of a feedback disabled type; and transmitting one or more statistics to a base station (BS) based on the one or more first DAIs and the one or more second DAIs.

106. The method of aspect 105, wherein a first set of the one or more first DAIs are received in a first downlink monitoring occasion from one or more serving cells, each of the first set of the one or more first DAIs indicating a first corresponding counter value of a downlink transmission associated with the one or more first feedback processes during the first downlink monitoring occasion and a total number of downlink transmissions in the first downlink monitoring occasion associated with the one or more first feedback processes and any other downlink monitoring occasions associated with the one or more first feedback processes in a time period.

107. The method of one or more of aspects 105 and 106, wherein a second set of the one or more second DAIs are received in the first downlink monitoring occasion from one or more serving cells, each of the second set of the one or more second DAIs indicating a second corresponding counter value of a downlink transmission associated with the one or more second feedback processes during the first downlink monitoring occasion and the total number of downlink transmissions in the first downlink monitoring occasion associated with the one or more second feedback processes and any other downlink monitoring occasions associated with the one or more second feedback processes in the time period.

108. The method of one or more of aspects 105 through 107, wherein the one or more statistics comprise a loss rate of downlink transmissions at the UE.

109. A user equipment (UE) comprising: a memory; and a processor coupled to the memory, the processor and memory being configured to perform the method of any of aspects 105-108.

110. A user equipment (UE) comprising one or more means for performing the method of any of aspects 105-108.

111. A non-transitory computer-readable storage medium having instructions stored thereon for performing the method of any of aspects 105-108 for wireless communication by a user equipment (UE).

112: A method for a base station to perform a method complimentary to one or more of the methods of aspects 70-81, 85-91, 95-101, and 105-108.

113: A base station comprising means for performing a method complimentary to one or more of the methods of aspects 70-81, 85-91, 95-101, and 105-108.

114: A base station for wireless communications, comprising a memory and a processor coupled to the memory, the memory and the processor configured to perform a method complimentary to one or more of the methods of aspects 70-81, 85-91, 95-101, and 105-108.

115: A computer-readable medium, the computer-readable medium including instructions that, when executed by at least one processor of a base station, cause the at least one processor to perform a method complimentary to one or more of the methods of aspects 70-81, 85-91, 95-101, and 105-108.

Additional Considerations

The techniques described herein may be used for various wireless communication technologies, such as NR (e.g., 5G NR), 3GPP Long Term Evolution (LTE), LTE-Advanced (LTE-A), code division multiple access (CDMA), time division multiple access (TDMA), frequency division multiple access (FDMA), orthogonal frequency division multiple access (OFDMA), single-carrier frequency division multiple access (SC-FDMA), time division synchronous code division multiple access (TD-SCDMA), and other networks. The terms "network" and "system" are often used interchangeably. A CDMA network may implement a radio technology such as Universal Terrestrial Radio Access (UTRA), cdma2000, etc. UTRA includes Wideband CDMA (WCDMA) and other variants of CDMA. cdma2000 covers IS-2000, IS-95 and IS-856 standards. A TDMA network may implement a radio technology such as Global System for Mobile Communications (GSM). An OFDMA network may implement a radio technology such as NR (e.g. 5G RA), Evolved UTRA (E-UTRA), Ultra Mobile Broadband (UMB), IEEE 802.11 (Wi-Fi), IEEE 802.16 (WiMAX), IEEE 802.20, Flash-OFDMA, etc. UTRA and E-UTRA are part of Universal Mobile Telecommunication System (UMTS). LTE and LTE-A are releases of UMTS that use E-UTRA. UTRA, E-UTRA, UMTS, LTE, LTE-A and GSM are described in documents from an organization named "3rd Generation Partnership Project" (3GPP). cdma2000 and UMB are described in documents from an organization named "3rd Generation Partnership Project 2" (3GPP2). NR is an emerging wireless communications technology under development.

In 3GPP, the term "cell" can refer to a coverage area of a Node B (NB) and/or a NB subsystem serving this coverage area, depending on the context in which the term is used. In NR systems, the term "cell" and BS, next generation NodeB (gNB or gNodeB), access point (AP), distributed unit (DU), carrier, or transmission reception point (TRP) may be used interchangeably. A BS may provide communication coverage for a macro cell, a pico cell, a femto cell, and/or other types of cells. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having an association with the femto cell (e.g., UEs in a Closed Subscriber Group (CSG), UEs for users in the home, etc.). A BS for a macro cell may be referred to as a macro BS. A BS for a pico cell may be referred to as a pico BS. A BS for a femto cell may be referred to as a femto BS or a home BS.

A UE may also be referred to as a mobile station, a terminal, an access terminal, a subscriber unit, a station, a Customer Premises Equipment (CPE), a cellular phone, a smart phone, a personal digital assistant (PDA), a wireless modem, a wireless communication device, a handheld device, a laptop computer, a cordless phone, a wireless local loop (WLL) station, a tablet computer, a camera, a gaming device, a netbook, a smartbook, an ultrabook, an appliance, a medical device or medical equipment, a biometric sensor/device, a wearable device such as a smart watch, smart clothing, smart glasses, a smart wrist band, smart jewelry (e.g., a smart ring, a smart bracelet, etc.), an entertainment device (e.g., a music device, a video device, a satellite radio, etc.), a vehicular component or sensor, a smart meter/sensor, industrial manufacturing equipment, a global positioning system device, or any other suitable device that is configured to communicate via a wireless or wired medium. Some UEs may be considered machine-type communication (MTC) devices or evolved MTC (eMTC) devices. MTC and eMTC UEs include, for example, robots, drones, remote devices, sensors, meters, monitors, location tags, etc., that may communicate with a BS, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, which may be narrowband IoT (NB-IoT) devices.

In some examples, access to the air interface may be scheduled. A scheduling entity (e.g., a BS) allocates resources for communication among some or all devices and equipment within its service area or cell. The scheduling entity may be responsible for scheduling, assigning, reconfiguring, and releasing resources for one or more subordinate entities. That is, for scheduled communication, subordinate entities utilize resources allocated by the scheduling entity. Base stations are not the only entities that may function as a scheduling entity. In some examples, a UE may function as a scheduling entity and may schedule resources for one or more subordinate entities (e.g., one or more other UEs), and the other UEs may utilize the resources scheduled by the UE for wireless communication. In some examples, a UE may function as a scheduling entity in a peer-to-peer (P2P) network, and/or in a mesh network. In a mesh network example, UEs may communicate directly with one another in addition to communicating with a scheduling entity.

The methods disclosed herein comprise one or more steps or actions for achieving the methods. The method steps and/or actions may be interchanged with one another without departing from the scope of the claims. In other words, unless a specific order of steps or actions is specified, the order and/or use of specific steps and/or actions may be modified without departing from the scope of the claims.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing, and the like.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language of the claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f) unless the element is expressly recited using the phrase "means for" or, in the case of a method claim, the element is recited using the phrase "step for."

The various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering.

The various illustrative logical blocks, modules and circuits described in connection with the present disclosure may be implemented or performed with a general purpose processor, a digital signal processor (DSP), an application specific integrated circuit (ASIC), a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

If implemented in hardware, an example hardware configuration may comprise a processing system in a wireless node. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement the signal processing functions of the PHY layer. In the case of a user terminal (see FIG. 1), a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further. The processor may be implemented with one or more general-purpose and/or special-purpose processors. Examples include microprocessors, microcontrollers, DSP processors, and other circuitry that can execute software. Those skilled in the art will recognize how best to implement the described functionality for the processing system depending on the particular application and the overall design constraints imposed on the overall system.

If implemented in software, the functions may be stored or transmitted over as one or more instructions or code on a computer-readable medium. Software shall be construed broadly to mean instructions, data, or any combination thereof, whether referred to as software, firmware, middleware, microcode, hardware description language, or otherwise. Computer-readable media include both computer storage media and communication media including any medium that facilitates transfer of a computer program from one place to another. The processor may be responsible for managing the bus and general processing, including the execution of software modules stored on the machine-readable storage media. A computer-readable storage medium may be coupled to a processor such that the processor can read information from, and write information to, the storage medium. In the alternative, the storage medium may be integral to the processor. By way of example, the machine-readable media may include a transmission line, a carrier wave modulated by data, and/or a computer-readable storage medium with instructions stored thereon separate from the wireless node, all of which may be accessed by the processor through the bus interface. Alternatively, or in addition, the machine-readable media, or any portion thereof, may be integrated into the processor, such as the case may be with cache and/or general register files. Examples of machine-readable storage media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product.

A software module may comprise a single instruction, or many instructions, and may be distributed over several different code segments, among different programs, and across multiple storage media. The computer-readable media may comprise a number of software modules. The software modules include instructions that, when executed by an apparatus such as a processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module.

Also, any connection is properly termed a computer-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Blu-ray® disc where disks usually reproduce data magnetically, while discs reproduce data optically with lasers. Thus, in some aspects computer-readable media may comprise non-transitory computer-readable media (e.g., tangible media). In addition, for other aspects computer-readable media may comprise transitory computer-readable media (e.g., a signal). Combinations of the above should also be included within the scope of computer-readable media.

Thus, certain aspects may comprise a computer program product for performing the operations presented herein. For example, such a computer program product may comprise a computer-readable medium having instructions stored (and/or encoded) thereon, the instructions being executable by one or more processors to perform the operations described herein, for example, instructions for performing the operations described herein and illustrated in FIGS. 7-11 and 19.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation, and details of the methods and apparatus described above without departing from the scope of the claims.

The invention claimed is:

1. An apparatus for wireless communication, the apparatus comprising:
memory storing computer executable code; and
one or more processors coupled to the memory and configured to, individually or collectively, execute the computer executable code and cause the apparatus to:
obtain one or more first downlink assignment indexes (DAIs) for one or more first hybrid automatic repeat request (HARQ) feedback processes associated with a plurality of HARQ feedback processes associated with the apparatus, the one or more first HARQ feedback processes being of a HARQ feedback enabled type;
obtain one or more second DAIs for one or more second HARQ feedback processes of the plurality of HARQ feedback processes associated with the apparatus, the one or more second HARQ feedback processes being of a HARQ feedback disabled type; and
output one or more statistics, wherein the one or more statistics are based on the one or more first DAIs and the one or more second DAIs.

2. The apparatus of claim 1, wherein:
a first set of the one or more first DAIs are obtained in a first downlink monitoring occasion from one or more serving cells;
each DAI of the first set indicates a corresponding first counter value, wherein first counter values are incremented for each downlink transmission associated with the one or more first HARQ feedback processes during the first downlink monitoring occasion; and
each DAI of the first set further indicates a second counter value corresponding to a first total quantity of downlink transmissions in first one or more downlink monitoring occasions occurring before the first downlink monitoring occasions in a time period and including the first downlink monitoring occasion, wherein the one or more downlink monitoring occasions are associated with the one or more first HARQ feedback processes in the time period.

3. The apparatus of claim 2, wherein:
a second set of the one or more second DAIs are obtained in the first downlink monitoring occasion from one or more serving cells;
each DAI of the second set indicates a corresponding third counter value, wherein third counter values are incremented for each downlink transmission associated with the one or more second HARQ feedback processes during the first downlink monitoring occasion; and
each DAI of the second set further indicates a fourth counter value corresponding to a second total quantity of downlink transmissions in second one or more downlink monitoring occasions occurring before the first downlink monitoring occasion in the time period and including the first downlink monitoring occasion, wherein the second one or more downlink monitoring occasions are associated with the one or more second HARQ feedback processes in the time period.

4. The apparatus of claim 3, wherein the one or more statistics comprise a first loss rate of downlink transmissions associated with the one or more first HARQ feedback processes and a second loss rate at the apparatus of downlink transmissions associated with the one or more second HARQ feedback processes, wherein the first loss rate is based on the first total quantity and the second loss rate is based on the second total quantity, and wherein the first loss rate and the second loss rate are experienced by the apparatus.

5. The apparatus of claim 4, wherein at least one of:
the first loss rate is based on a first quantity of lost downlink transmissions of the downlink transmissions associated with the one or more first HARQ feedback processes the first total quantity of downlink transmissions indicated by the first set of the one or more first DAIs; or
the second loss rate is based on a second quantity of lost downlink transmissions of the downlink transmissions associated with the one or more second HARQ feedback processes the second total quantity of downlink transmissions indicated by the second set of the one or more second DAIs.

6. The apparatus of claim 5, wherein at least one of:
the first quantity of lost downlink transmissions is based on a first total quantity of detected gaps between the counter values; or
the second quantity of lost downlink transmissions is based on a second total quantity of detected gaps between the fourth counter values.

7. The apparatus of claim 3, wherein at least one of:
the one or more first HARQ feedback processes of the HARQ feedback enabled type comprises HARQ processes for which the apparatus is configured to report HARQ acknowledgment (ACK) feedback; or
the one or more processors are configured to cause the apparatus to output for transmission HARQ ACK feedback regarding decoding of one or more downlink transmissions associated with the one or more first HARQ feedback processes.

8. The apparatus of claim 3, wherein at least one of:
the one or more second HARQ feedback processes of the HARQ feedback disabled type comprises HARQ processes for which the apparatus is configured to not report HARQ acknowledgment (ACK) feedback; or
the one or more processors are configured to cause the apparatus to withhold HARQ ACK feedback regarding decoding of one or more downlink transmissions associated with the one or more second HARQ feedback processes.

9. The apparatus of claim 8, wherein the one or more processors are further configured to cause the apparatus to at least one of:
wirelessly couple to a non-terrestrial network (NTN); or
configure the apparatus with stop-and-wait HARQ operation.

10. The apparatus of claim 1, wherein the one or more processors are configured to cause the apparatus to obtain a configuration of the HARQ feedback enabled type or of the HARQ feedback disabled type, the HARQ feedback enabled type or the HARQ feedback disabled type being a default HARQ feedback type.

11. The apparatus of claim 10, wherein the one or more processors are configured to cause the apparatus to obtain signaling indicating to use a HARQ feedback type for one or more HARQ feedback processes different than the default HARQ feedback type.

12. The apparatus of claim 1, further comprising a transceiver configured to at least one of:
receive the one or more first DAIs;
receive the one or more second DAIs; or
transmit the one or more statistics,
wherein the apparatus is configured as a user equipment (UE).

13. An apparatus for wireless communication, the apparatus comprising:
memory storing computer executable code; and
one or more processors coupled to the memory configured to, individually or collectively, execute the computer executable code and cause the apparatus to:
output for transmission one or more first downlink assignment indexes (DAIs) for one or more first hybrid automatic repeat request (HARQ) feedback processes associated with a plurality of HARQ feedback processes associated with a user equipment (UE), the one or more first HARQ feedback processes being of a HARQ feedback enabled type;
output for transmission one or more second DAIs for one or more second HARQ feedback processes of the plurality of HARQ feedback processes associated with the UE, the one or more second HARQ feedback processes being of a HARQ feedback disabled type; and
obtain one or more statistics from the UE.

14. The apparatus of claim 13, wherein:
a first set of the one or more first DAIs are output in a first downlink monitoring occasion from one or more serving cells;
each DAI of the first set indicates a corresponding first counter value, wherein first counter values are incremented for each downlink transmission associated with the one or more first HARQ feedback processes during the first downlink monitoring occasion; and
each DAI of the first set further indicates a second counter value corresponding to a first total quantity of downlink transmissions in first one or more downlink monitoring occasions occurring before the first downlink monitoring occasion in a time period and including the first downlink monitoring occasion, wherein the one or more downlink monitoring occasions are associated with the one or more first HARQ feedback processes in the time period.

15. The apparatus of claim 14, wherein:
a second set of the one or more second DAIs are output in the first downlink monitoring occasion from one or more serving cells;
each DAI of the second set indicates a corresponding third counter value, wherein third counter values are incremented for each downlink transmission associated with the one or more second HARQ feedback processes during the first downlink monitoring occasion; and
each DAI of the second set further indicates a fourth counter value corresponding to a second total quantity of downlink transmissions in second one or more downlink monitoring occasions occurring before the first downlink monitoring occasion in the time period and including the first downlink monitoring occasion, wherein the second one or more downlink monitoring occasions are associated with the one or more second HARQ feedback processes in the time period.

16. The apparatus of claim 15, wherein the one or more statistics comprise a first loss rate at the UE of downlink transmissions associated with the one or more first HARQ feedback processes and a second loss rate at the UE of downlink transmissions associated with the one or more second HARQ feedback processes, wherein the first loss rate is based on the first total quantity and the second loss rate is based on the second total quantity, and wherein the first loss rate and the second loss rate are experienced by the UE.

17. The apparatus of claim 15, wherein at least one of:
the one or more first HARQ feedback processes of the HARQ feedback enabled type comprises HARQ processes for which the UE is configured to report HARQ acknowledgment (ACK) feedback; or
the one or more processors are configured to cause the apparatus to obtain HARQ ACK feedback from the UE regarding decoding of one or more downlink transmissions associated with the one or more first HARQ feedback processes.

18. The apparatus of claim 15, wherein the one or more second HARQ feedback processes of the HARQ feedback disabled type comprises HARQ processes for which the UE is configured to not report HARQ acknowledgment (ACK) feedback.

19. The apparatus of claim 13, wherein the apparatus is in a non-terrestrial network (NTN).

20. The apparatus of claim 13, wherein the one or more processors are configured to cause the apparatus to configure the UE with the HARQ feedback enabled type or the HARQ feedback disabled type, the HARQ feedback enabled type or the HARQ feedback disabled type being a default HARQ feedback type.

21. The apparatus of claim 20, wherein the one or more processors are configured to cause the apparatus to output signaling to the UE indicating to use a HARQ feedback type for one or more HARQ feedback processes different than the default HARQ feedback type.

22. The apparatus of claim 13, further comprising a transceiver configured to at least one of:
transmit the one or more first DAIs;
transmit the one or more second DAIs; or
receive the one or more statistics,
wherein the apparatus is configured as a network entity.

23. A method for wireless communication at a user equipment (UE), the method comprising:
obtaining one or more first downlink assignment indexes (DAIs) for one or more first hybrid automatic repeat request (HARQ) feedback processes associated with a plurality of HARQ feedback processes associated with the UE, the one or more first HARQ feedback processes being of a HARQ feedback enabled type;
obtaining one or more second DAIs for one or more second HARQ feedback processes of the plurality of HARQ feedback processes associated with the UE, the one or more second HARQ feedback processes being of a feedback disabled type; and
outputting for transmission one or more statistics, wherein the one or more statistics are based on the one or more first DAIs and the one or more second DAIs.

24. The method of claim 23, wherein:
a first set of the one or more first DAIs are obtained in a first downlink monitoring occasion from one or more serving cells;
each DAI of the first set indicates a corresponding first counter value, wherein first counter values are incremented for each downlink transmission associated with the one or more first HARQ feedback processes during the first downlink monitoring occasion; and
each DAI of the first set further indicates a second counter value corresponding to a first total quantity of downlink transmissions in first one or more downlink monitoring occasions occurring before the first downlink monitoring occasions in a time period and including the first downlink monitoring occasion, wherein the one or more downlink monitoring occasions are associated with the one or more first HARQ feedback processes in the time period.

25. The method of claim 24, wherein:
a second set of the one or more second DAIs are obtained in the first downlink monitoring occasion from one or more serving cells;
each DAI of the second set indicates a corresponding third counter value, wherein third counter values are incremented for each downlink transmission associated with the one or more second HARQ feedback processes during the first downlink monitoring occasion; and
each DAI of the second set further indicates a fourth counter value corresponding to a second total quantity of downlink transmissions in second one or more downlink monitoring occasions occurring before the first downlink monitoring occasion in the time period and including the first downlink monitoring occasion, wherein the second one or more downlink monitoring occasions are associated with the one or more second HARQ feedback processes in the time period.

26. The method of claim 25, wherein the one or more statistics comprise a first loss rate of downlink transmissions associated with the one or more first HARQ feedback processes and a second loss rate at the UE of downlink transmissions associated with the one or more second HARQ feedback processes, wherein the first loss rate is based on the first total quantity and the second loss rate is based on the second total quantity, and wherein the first loss rate and the second loss rate are experienced by the UE.

27. The method of claim 26, wherein at least one of:
the first loss rate is based on a first quantity of lost downlink transmissions of the downlink transmissions associated with the one or more first HARQ feedback processes the first total quantity of downlink transmissions indicated by the first set of the one or more first DAIs; or
the second loss rate is based on a second quantity of lost downlink transmissions of the downlink transmissions associated with the one or more second HARQ feedback processes the second total quantity of downlink transmissions indicated by the second set of the one or more second DAIs.

28. The method of claim 27, wherein at least one of:
the first quantity of lost downlink transmissions is based on a first total quantity of detected gaps between the counter values; and
the second quantity of lost downlink transmissions is based on a second total quantity of detected gaps between the fourth counter values.

29. The method of claim 25, wherein the one or more first HARQ feedback processes of the HARQ feedback enabled type comprises HARQ processes for which the UE is configured to report HARQ acknowledgment (ACK) feedback, and further comprising outputting for transmission HARQ ACK feedback regarding decoding of one or more downlink transmissions associated with the one or more first HARQ feedback processes.

30. A method for wireless communication at a network entity, the method comprising:
outputting one or more first downlink assignment indexes (DAIs) for one or more first hybrid automatic repeat request (HARQ) feedback processes associated with a plurality of HARQ feedback processes associated with a user equipment (UE), the one or more first HARQ feedback processes being of a HARQ feedback enabled type;
outputting one or more second DAIs for one or more second HARQ feedback processes of the plurality of HARQ feedback processes associated with the UE, the one or more second HARQ feedback processes being of a HARQ feedback disabled type; and
obtaining one or more statistics from the UE.

* * * * *